US012671760B2

(12) United States Patent
Zhou et al.

(10) Patent No.: US 12,671,760 B2
(45) Date of Patent: Jun. 30, 2026

(54) WINDOW DISPLAY METHOD AND DEVICE

(71) Applicant: Huawei Technologies Co., Ltd.,
Shenzhen (CN)

(72) Inventors: Xingchen Zhou, Nanjing (CN);
Fengkai Liu, Nanjing (CN); **Haijun
Wang, Nanjing (CN); Liang Xu**,
Nanjing (CN); Ning Ding, Nanjing
(CN); Wanyi Yang, Nanjing (CN); **Xi
Wei**, Shenzhen (CN)

(73) Assignee: **HUAWEI TECHNOLGOIES CO.,
LTD.**, Shenzhen (CN)

( * ) Notice: Subject to any disclaimer, the term of this
patent is extended or adjusted under 35
U.S.C. 154(b) by 451 days.

(21) Appl. No.: 18/246,971

(22) PCT Filed: Sep. 8, 2021

(86) PCT No.: PCT/CN2021/117120
§ 371 (c)(1),
(2) Date: Mar. 28, 2023

(87) PCT Pub. No.: WO2022/062898
PCT Pub. Date: Mar. 31, 2022

(65) Prior Publication Data
US 2023/0362294 A1      Nov. 9, 2023

(30) Foreign Application Priority Data
Sep. 28, 2020    (CN) .......................... 202011045760.6

(51) Int. Cl.
*H04M 1/72427*      (2021.01)
(52) U.S. Cl.
CPC .... *H04M 1/72427* (2021.01); *H04M 2201/42*
(2013.01)

(58) Field of Classification Search
CPC ......... H04M 1/72427; H04M 2201/42; H04M
1/72436; G06F 2203/04806;
(Continued)

(56) References Cited

U.S. PATENT DOCUMENTS 6,211,879 B1      4/2001   Soohoo
6,331,840 B1      12/2001  Nielson et al.
(Continued)

FOREIGN PATENT DOCUMENTS

CN        101354639 A      1/2009
CN        101794448 A      8/2010
(Continued)

OTHER PUBLICATIONS

Wang Changhong, "Try the remote projection function," Computer
Knowledge and Technology (Experience Skills), Issue 11, 2018,
with an English translation, 6 pages.
(Continued)

*Primary Examiner* — Zhitong Chen
(74) *Attorney, Agent, or Firm* — Conley Rose, P.C.

(57)      ABSTRACT

A terminal displays an application window of a first application on a display screen of the terminal. The application window includes a plurality of elements. After receiving a first operation, the terminal displays an animation in which the application window moves. When determining that the application window moves to a specified area of the display screen of the terminal, the terminal displays a live window on the display screen of the terminal. The live window includes some elements in the application window.

22 Claims, 74 Drawing Sheets

(58) Field of Classification Search
CPC ......... G06F 2203/04808; G06F 3/0481; G06F
3/04817; G06F 3/0482; G06F 3/04845;
G06F 3/0485; G06F 3/0486; G06F
3/0488; G06Q 30/0641; G06Q 10/10
See application file for complete search history.

(56) References Cited

U.S. PATENT DOCUMENTS

| | | | |
|---|---|---|---|
| 7,730,425 B2 | 6/2010 | De Los Reyes et al. |
| 8,531,519 B1 | 9/2013 | Peng et al. |
| 8,607,150 B2 | 12/2013 | Tsai |
| 8,806,364 B2 | 8/2014 | Hwang |
| 9,696,825 B2 | 7/2017 | Lin et al. |
| 10,168,868 B2 | 1/2019 | Lee et al. |
| 10,234,953 B1 | 3/2019 | Li et al. |
| 11,029,838 B2 | 6/2021 | Lemay et al. |
| 11,036,310 B2 | 6/2021 | Seo et al. |
| 11,196,933 B2 | 12/2021 | Misawa et al. |
| 11,599,322 B1 | 3/2023 | Johnson et al. |
| 2001/0012025 A1 | 8/2001 | Wojaczynski et al. |
| 2006/0038741 A1 | 2/2006 | Mori et al. |
| 2006/0136828 A1 | 6/2006 | Asano |
| 2007/0055941 A1 | 3/2007 | Bhakta et al. |
| 2007/0288599 A1 | 12/2007 | Saul et al. |
| 2009/0027302 A1 | 1/2009 | Li |
| 2010/0041442 A1 | 2/2010 | Hong |
| 2010/0070899 A1 | 3/2010 | Hunt et al. |
| 2010/0281363 A1 | 11/2010 | Inaba |
| 2011/0080356 A1 | 4/2011 | Kang et al. |
| 2011/0083099 A1 | 4/2011 | Eun |
| 2011/0209103 A1 | 8/2011 | Hinckley et al. |
| 2012/0046071 A1 | 2/2012 | Brandis et al. |
| 2012/0096396 A1 | 4/2012 | Ording et al. |
| 2012/0216126 A1 | 8/2012 | Trivedi et al. |
| 2012/0297341 A1 | 11/2012 | Glazer et al. |
| 2013/0009887 A1 | 1/2013 | Huang et al. |
| 2013/0050277 A1 | 2/2013 | Wang et al. |
| 2013/0080143 A1 | 3/2013 | Reeves et al. |
| 2013/0135309 A1 | 5/2013 | King et al. |
| 2013/0145290 A1 | 6/2013 | Weber et al. |
| 2013/0162538 A1 | 6/2013 | Ichieda |
| 2013/0204945 A1 | 8/2013 | Li et al. |
| 2013/0318451 A1 | 11/2013 | Wu et al. |
| 2013/0321340 A1 | 12/2013 | Seo et al. |
| 2013/0332872 A1 | 12/2013 | Grinberg |
| 2013/0342482 A1 | 12/2013 | Kim et al. |
| 2014/0009394 A1 | 1/2014 | Lee et al. |
| 2014/0019874 A1 | 1/2014 | Li et al. |
| 2014/0082519 A1 | 3/2014 | Wang et al. |
| 2014/0136986 A1 | 5/2014 | Martin et al. |
| 2014/0222663 A1 | 8/2014 | Park et al. |
| 2014/0292720 A1 | 10/2014 | Liang |
| 2014/0365957 A1 | 12/2014 | Louch |
| 2015/0012831 A1 | 1/2015 | Boggess |
| 2015/0020013 A1 | 1/2015 | Kim et al. |
| 2015/0160914 A1 | 6/2015 | Oitaira |
| 2015/0180912 A1 | 6/2015 | Dufour |
| 2015/0195607 A1 | 7/2015 | Kim et al. |
| 2015/0293741 A1 | 10/2015 | Glazer |
| 2015/0312458 A1 | 10/2015 | Chen et al. |
| 2015/0356949 A1 | 12/2015 | Kim |
| 2016/0050476 A1 | 2/2016 | Patil |
| 2016/0092154 A1 | 3/2016 | Bourlier et al. |
| 2016/0117141 A1 | 4/2016 | Ro et al. |
| 2016/0119464 A1 | 4/2016 | Kim |
| 2016/0139776 A1 | 5/2016 | Donahue et al. |
| 2016/0162243 A1 | 6/2016 | Neisler et al. |
| 2016/0188275 A1 | 6/2016 | Huang |
| 2016/0216782 A1 | 7/2016 | Lin et al. |
| 2016/0239110 A1 | 8/2016 | Chen et al. |
| 2016/0320937 A1 | 11/2016 | Zhou |
| 2016/0342319 A1 | 11/2016 | Wang et al. |
| 2016/0343350 A1 | 11/2016 | Khoury et al. |
| 2017/0017454 A1 | 1/2017 | Kim |
| 2017/0031582 A1 | 2/2017 | Palandro et al. |

| | | | |
|---|---|---|---|
| 2017/0052685 A1 | 2/2017 | Kov cs et al. |
| 2017/0199715 A1 | 7/2017 | Manchinasetti et al. |
| 2017/0228207 A1 | 8/2017 | Szeto et al. |
| 2017/0277381 A1 | 9/2017 | Allyn |
| 2017/0315702 A1 | 11/2017 | Tsao et al. |
| 2017/0351472 A1 | 12/2017 | Passeri et al. |
| 2018/0070122 A1 | 3/2018 | Baek et al. |
| 2018/0077547 A1 | 3/2018 | Sanchez Barajas et al. |
| 2018/0095623 A1 | 4/2018 | Haggar et al. |
| 2018/0098018 A1 | 4/2018 | Cho et al. |
| 2018/0107358 A1 | 4/2018 | Chodakowski et al. |
| 2018/0129364 A1 | 5/2018 | Louch et al. |
| 2018/0189972 A1 | 7/2018 | Humbert et al. |
| 2018/0253207 A1 | 9/2018 | Wang et al. |
| 2018/0324567 A1 | 11/2018 | Mao |
| 2019/0098204 A1 | 3/2019 | Chen et al. |
| 2019/0110100 A1 | 4/2019 | Gao et al. |
| 2019/0196707 A1 | 6/2019 | Szeto et al. |
| 2019/0200203 A1 | 6/2019 | Jiang |
| 2019/0222631 A1 | 7/2019 | Li et al. |
| 2019/0265941 A1 | 8/2019 | Baba |
| 2019/0286032 A1 | 9/2019 | Suzuki |
| 2019/0295498 A1 | 9/2019 | Lee et al. |
| 2019/0303088 A1 | 10/2019 | Yuan |
| 2019/0346986 A1* | 11/2019 | Nilo ...................... G06F 3/0486 |
| 2019/0371003 A1 | 12/2019 | Lin et al. |
| 2020/0004394 A1 | 1/2020 | Li et al. |
| 2020/0019367 A1* | 1/2020 | Sun ..................... G06F 3/04883 |
| 2020/0045235 A1 | 2/2020 | Ono |
| 2020/0053417 A1 | 2/2020 | Choi et al. |
| 2020/0192564 A1 | 6/2020 | Zhu et al. |
| 2020/0257425 A1 | 8/2020 | Ye |
| 2020/0388051 A1 | 12/2020 | Lin et al. |
| 2020/0409541 A1 | 12/2020 | Luo et al. |
| 2021/0004220 A1 | 1/2021 | Hao et al. |
| 2021/0027742 A1 | 1/2021 | Li |
| 2021/0064191 A1 | 3/2021 | Liao et al. |
| 2021/0181939 A1 | 6/2021 | Lee et al. |
| 2021/0182948 A1 | 6/2021 | Du et al. |
| 2021/0240332 A1* | 8/2021 | Walkin .................. G06F 3/0485 |
| 2021/0263642 A1 | 8/2021 | Li |
| 2022/0147228 A1 | 5/2022 | Yi et al. |
| 2022/0164091 A1 | 5/2022 | Kang et al. |
| 2022/0224968 A1 | 7/2022 | Wang et al. |
| 2022/0229624 A1 | 7/2022 | Xiong et al. |
| 2022/0229708 A1 | 7/2022 | Hu |
| 2022/0253187 A1 | 8/2022 | Wang |
| 2022/0279062 A1 | 9/2022 | Ye |
| 2022/0291892 A1 | 9/2022 | Gu |
| 2022/0300153 A1 | 9/2022 | Gu |
| 2022/0334855 A1 | 10/2022 | Meng |
| 2022/0342850 A1 | 10/2022 | Cao et al. |
| 2022/0391158 A1 | 12/2022 | Lemmens et al. |
| 2022/0413671 A1 | 12/2022 | Liu |
| 2023/0041287 A1 | 2/2023 | Tian et al. |
| 2023/0153274 A1 | 5/2023 | Liu |
| 2023/0176705 A1 | 6/2023 | Kwon et al. |
| 2023/0205393 A1 | 6/2023 | Yamada et al. |
| 2023/0244373 A1 | 8/2023 | Pan et al. |

FOREIGN PATENT DOCUMENTS

| | | | |
|---|---|---|---|
| CN | 101865656 A | 10/2010 |
| CN | 102333152 A | 1/2012 |
| CN | 102419689 A | 4/2012 |
| CN | 102523346 A | 6/2012 |
| CN | 102620713 A | 8/2012 |
| CN | 102646117 A | 8/2012 |
| CN | 102687117 A | 9/2012 |
| CN | 102945131 A | 2/2013 |
| CN | 103245337 A | 8/2013 |
| CN | 103279288 A | 9/2013 |
| CN | 103425408 A | 12/2013 |
| CN | 103873637 A | 6/2014 |
| CN | 103973979 A | 8/2014 |
| CN | 104137048 A | 11/2014 |
| CN | 104268251 A | 1/2015 |
| CN | 104349110 A | 2/2015 |
| CN | 104484144 A | 4/2015 |

(56)     References Cited

FOREIGN PATENT DOCUMENTS

| | | | |
|---|---|---|---|
| CN | 104811793 | A | 7/2015 |
| CN | 105183343 | A | 12/2015 |
| CN | 105512086 | A | 4/2016 |
| CN | 105516754 | A | 4/2016 |
| CN | 105549869 | A | 5/2016 |
| CN | 105549870 | A | 5/2016 |
| CN | 105556451 | A | 5/2016 |
| CN | 105635948 | A | 6/2016 |
| CN | 105681441 | A | 6/2016 |
| CN | 105843470 | A | 8/2016 |
| CN | 105892851 | A | 8/2016 |
| CN | 105955689 | A | 9/2016 |
| CN | 105979148 | A | 9/2016 |
| CN | 106055202 | A | 10/2016 |
| CN | 106095237 | A | 11/2016 |
| CN | 106354451 | A | 1/2017 |
| CN | 106406127 | A | 2/2017 |
| CN | 106507439 | A | 3/2017 |
| CN | 106657651 | A | 5/2017 |
| CN | 106844063 | A | 6/2017 |
| CN | 106850165 | A | 6/2017 |
| CN | 107085508 | A | 8/2017 |
| CN | 107124690 | A | 9/2017 |
| CN | 107222936 | A | 9/2017 |
| CN | 107329927 | A | 11/2017 |
| CN | 107425942 | A | 12/2017 |
| CN | 107479784 | A | 12/2017 |
| CN | 107491469 | A | 12/2017 |
| CN | 107506039 | A | 12/2017 |
| CN | 107846617 | A | 3/2018 |
| CN | 107908489 | A | 4/2018 |
| CN | 107943439 | A | 4/2018 |
| CN | 108037972 | A | 5/2018 |
| CN | 108123826 | A | 6/2018 |
| CN | 108154538 | A | 6/2018 |
| CN | 108228020 | A | 6/2018 |
| CN | 108268640 | A | 7/2018 |
| CN | 108399529 | A | 8/2018 |
| CN | 108447097 | A | 8/2018 |
| CN | 108616561 | A | 10/2018 |
| CN | 108647062 | A | 10/2018 |
| CN | 108702414 | A | 10/2018 |
| CN | 108717714 | A | 10/2018 |
| CN | 108718439 | A | 10/2018 |
| CN | 104618793 | B | 11/2018 |
| CN | 108734736 | A | 11/2018 |
| CN | 108762619 | A | 11/2018 |
| CN | 108765498 | A | 11/2018 |
| CN | 108781235 | A | 11/2018 |
| CN | 108829323 | A | 11/2018 |
| CN | 108874713 | A | 11/2018 |
| CN | 108900764 | A | 11/2018 |
| CN | 108958684 | A | 12/2018 |
| CN | 108984137 | A | 12/2018 |
| CN | 109099888 | A | 12/2018 |
| CN | 109120970 | A | 1/2019 |
| CN | 109164964 | A | 1/2019 |
| CN | 109462692 | A | 3/2019 |
| CN | 109525697 | A | 3/2019 |
| CN | 109644263 | A | 4/2019 |
| CN | 109669747 | A | 4/2019 |
| CN | 109690967 | A | 4/2019 |
| CN | 109739450 | A | 5/2019 |
| CN | 109753215 | A | 5/2019 |
| CN | 109803126 | A | 5/2019 |
| CN | 208849986 | U | 5/2019 |
| CN | 109889885 | A | 6/2019 |
| CN | 109922205 | A | 6/2019 |
| CN | 110109636 | A | 8/2019 |
| CN | 110113538 | A | 8/2019 |
| CN | 110221798 | A | 9/2019 |
| CN | 110243386 | A | 9/2019 |
| CN | 110267073 | A | 9/2019 |
| CN | 110278338 | A | 9/2019 |
| CN | 110321093 | A | 10/2019 |
| CN | 110333814 | A | 10/2019 |
| CN | 110363819 | A | 10/2019 |
| CN | 110417992 | A | 11/2019 |
| CN | 110443853 | A | 11/2019 |
| CN | 110471639 | A | 11/2019 |
| CN | 110473262 | A | 11/2019 |
| CN | 110489042 | A | 11/2019 |
| CN | 110515576 | A | 11/2019 |
| CN | 110515579 | A | 11/2019 |
| CN | 110515580 | A | 11/2019 |
| CN | 110557674 | A | 12/2019 |
| CN | 110574359 | A | 12/2019 |
| CN | 110597473 | A | 12/2019 |
| CN | 110602805 | A | 12/2019 |
| CN | 110618970 | A | 12/2019 |
| CN | 110673782 | A | 1/2020 |
| CN | 110703966 | A | 1/2020 |
| CN | 107925694 | B | 2/2020 |
| CN | 110750197 | A | 2/2020 |
| CN | 110806831 | A | 2/2020 |
| CN | 110908625 | A | 3/2020 |
| CN | 111062778 | A | 4/2020 |
| CN | 111079550 | A | 4/2020 |
| CN | 111107222 | A | 5/2020 |
| CN | 111125526 | A | 5/2020 |
| CN | 111158540 | A | 5/2020 |
| CN | 111190559 | A | 5/2020 |
| CN | 111221491 | A | 6/2020 |
| CN | 111240547 | A | 6/2020 |
| CN | 111240575 | A | 6/2020 |
| CN | 111290675 | A | 6/2020 |
| CN | 111314768 | A | 6/2020 |
| CN | 111324327 | A | 6/2020 |
| CN | 111327769 | A | 6/2020 |
| CN | 111399789 | A | 7/2020 |
| CN | 111399959 | A | 7/2020 |
| CN | 111443884 | A | 7/2020 |
| CN | 111666055 | A | 9/2020 |
| CN | 111782427 | A | 10/2020 |
| CN | 111858522 | A | 10/2020 |
| CN | 111949350 | A | 11/2020 |
| CN | 112083867 | A | 12/2020 |
| CN | 112148182 | A | 12/2020 |
| CN | 112527221 | A | 3/2021 |
| CN | 111666055 | B | 12/2021 |
| CN | 114356198 | A | 4/2022 |
| EP | 2632188 | A1 | 8/2013 |
| EP | 4080345 | A1 | 10/2022 |
| EP | 4095671 | A1 | 11/2022 |
| EP | 4177725 | A1 | 5/2023 |
| JP | 2012063865 | A | 3/2012 |
| JP | 2018097880 | A | 6/2018 |
| KR | 20110076153 | A | 7/2011 |
| KR | 20180042643 | A | 4/2018 |
| WO | 0203186 | A2 | 1/2002 |
| WO | 2015197908 | A1 | 12/2015 |
| WO | 2018120884 | A1 | 7/2018 |
| WO | 2019071872 | A1 | 4/2019 |
| WO | 2022256681 | A2 | 12/2022 |

OTHER PUBLICATIONS

Marquardt Nicolai et al: "Gradual engagement facilitating information exchange between digital devices as a function of proximity," Proceedings of the Third ACM Conference on Data and Application Security and Privacy, CODASPY''13, ACM Press, New York, New York, USA, Nov. 11, 2012, pp. 31-40, XP058985017, 10 pages total.

Han Yumin, Classification of Interaction Modes and Its Significance, CD Technology, Editorial Department Mailbox, Issue 02, 1997, with the English Abstract, 5 pages.

Yang Bowen et al, Camera Calibration Technique of Wide-Area Vision Measurement, Acta Optica Sinica, vol. 32, No. 9, with the English Abstract, 9 pages.

* cited by examiner

404

Turn right 92 meters ahead

2001

TO

CONT.
FROM

TO

2002

CONT. FROM FIG. 20A(b)

2003

TO

2005

CONT.
FROM

2006

TO

CONT. FROM FIG. 20B(a)

CONT. FROM FIG. 20B(b)

2008

TO

2401

2402

2403

TO

2507

2508

CONT.
FROM

CONT.
FROM

CONT.
FROM

2802

WINDOW DISPLAY METHOD AND DEVICE

CROSS-REFERENCE TO RELATED APPLICATIONS

This is a National Stage of International Patent Application No. PCT/CN2021/117120 filed on Sep. 8, 2021, which claims priority to Chinese Patent Application No. 202011045760.6 filed Sep. 28, 2020. Both of the aforementioned applications are hereby incorporated by reference in their entireties.

TECHNICAL FIELD

This application relates to the field of electronic devices, and in particular, to a window display method and a device.

BACKGROUND

Currently, terminals such as mobile phones have become electronic devices frequently used in daily life and work of people. For example, a user may use a mobile phone to browse news information, watch a video, or perform online shopping. When the user uses the mobile phone, if key information such as a video or navigation information in a current interface is moved out of a screen of the mobile phone, the user cannot continue to view the information.

SUMMARY

Embodiments of this application provide a window display method and a device. The window may be referred to as a live window. After a live window trigger condition is met, a terminal may extract a key element in a display interface of the terminal, and display the key element in a live window form on a terminal screen. The live window supports page-level, application-level, and system-level presentation. In addition, content presented in the live window is a key element recommended by a system or customized by a third-party application. This does not affect user experience due to display of excessive content, and can meet a processing requirement of a user.

To achieve the foregoing objective, the following technical solutions are used in this application.

According to a first aspect of this application, a window display method is provided. The method may be applied to a terminal, and the method may include: The terminal displays an application window of a first application on a display screen of the terminal. The application window of the first application includes a plurality of elements. After receiving a first operation, the terminal displays a first window on the display screen of the terminal. The first window includes some elements in the application window of the first application. The first window may be referred to as a live window, and may be displayed on the terminal screen in a floating manner.

According to the foregoing technical solution, the terminal may extract a key element in a display interface of the terminal, and display the key element in a window, for example, referred to as a live window, form on the terminal screen. Key content in the application window is displayed by using a limited small-window display resource, which does not affect user experience due to display of excessive content, and can meet a processing requirement of a user. For example, the user can be helped to obtain and quickly process multi-task information by using the window.

In a possible implementation, the first operation may include a drag operation on the application window of the first application in a multi-task interface. The displaying an application window of a first application on a display screen of the terminal includes: After receiving a second operation, the terminal displays the multi-task interface. The multi-task interface includes the application window of the first application. The displaying a first window on the display screen of the terminal may include: The terminal displays an animation in which the application window of the first application moves, and when determining that the application window of the first application moves to a specified area of the display screen of the terminal, the terminal displays the first window on the display screen of the terminal. Display of the window is triggered by using a system-level interaction gesture of sliding the application window upward in the multi-task interface, so that display of the window can be more flexibly triggered with a simpler operation.

In another possible implementation, the application window of the first application may be a freeform window. The first operation may be a drag operation on the application window of the first application, that is, the freeform window of the first application. The displaying a first window on the display screen of the terminal may include: The terminal displays an animation in which the application window, that is, the freeform window, of the first application moves. When determining that the application window, that is, the freeform window, of the first application moves to a specified area of the display screen of the terminal, the terminal displays the first window on the display screen of the terminal.

In another possible implementation, the first operation may be an operation that triggers the first application to switch to background.

In another possible implementation, after the terminal displays the application window of the first application on the display screen, the method may further include: The terminal displays a notification message on the display screen of the terminal. The first operation is a selection operation on the notification message.

It may be understood based on the foregoing implementations that, in embodiments, display of the first window (or referred to as a live window) may be triggered in a plurality of manners, so that the user can wake up the first window in any interface, thereby meeting a processing requirement on a small window during multi-task processing.

In another possible implementation, before the displaying a first window on the display screen of the terminal, the method may further include: The terminal extracts the some elements from the plurality of elements of the application window of the first application. After triggering live window display, the terminal may extract a key element in a currently displayed application window, and continue to present the key element in a live window form to the user.

In another possible implementation, the some elements may be predetermined. For example, the some elements may be a video element.

In another possible implementation, that the terminal extracts the some elements from the plurality of elements of the application window of the first application may include: The terminal obtains a first identifier, and obtains, from stored configuration files corresponding to different identifiers, a configuration file corresponding to the first identifier. The configuration file corresponding to the first identifier includes identifiers of the some elements. The terminal extracts the some elements from the plurality of elements of the application window of the first application based on the configuration file corresponding to the first identifier. The first identifier may include an identifier of the first application, or the first identifier may include an identifier of the first application and an identifier of an interface in the application window. An application developer may define which elements in a corresponding application or an interface of the application are displayed as key elements in a live window.

In another possible implementation, that the terminal extracts the some elements from the plurality of elements of the application window of the first application may include: The terminal obtains a type of the first application, and obtains, from stored recommendation models corresponding to different types of applications, a recommendation model corresponding to the type of the first application. The recommendation model has a function of extracting, based on a type corresponding to an application, an element that needs to be displayed in the first window. The terminal extracts the some elements from the plurality of elements in the application window of the first application based on the recommendation model corresponding to the type of the first application. A key element to be displayed in a live window may be recommended by a system.

In another possible implementation, a layout of the some elements in the first window is different from a layout, in the application window, of elements corresponding to the some elements. In embodiments, a re-layout of an element in a live window is further supported.

It can be learned from above that content and a layout effect that are presented in the first window, that is, the live window, support automatic recommendation by the system based on different application types or customization by a third-party application developer, so that the user can more flexibly complete multi-task processing, and requirements for flexible display and layout of the live window can be met.

In another possible implementation, the layout of the some elements in the first window is predetermined.

In another possible implementation, before the displaying a first window on the display screen of the terminal, the method may further include: The terminal obtains, from a stored layout file based on the first identifier, a layout file corresponding to the first identifier, and the terminal lays the some extracted elements based on the obtained layout file. The first identifier may include the identifier of the first application, or the first identifier may include the identifier of the first application and the identifier of the interface in the application window.

In another possible implementation, before the displaying a first window on the display screen of the terminal, the method may further include: The terminal obtains, from a stored layout file based on the type of the first application, a layout file corresponding to the type of the first application, and the terminal lays the some extracted elements based on the obtained layout file.

In another possible implementation, after the displaying a first window on the display screen of the terminal, the method may further include: After receiving a third operation on the first window, the terminal changes the first window to a second window and displays the second window on the display screen of the terminal. The second window includes some elements in the application window of the first application, and the second window includes more elements than the first window. The window supports a change from a small window form to a medium window form. The window in the medium window form, that is, the second window, may include more elements than the first window. For example, the first window includes only some presentation-type elements in the application window of the first application, while the second window may include the presentation-type elements, and may further include some manipulation-type elements in the application window of the first application.

In another possible implementation, the second window includes a video element. After the terminal displays the second window, after the terminal receives a first sliding operation (for example, a sliding operation from top to bottom) on the second window, the terminal decreases volume of the terminal. After the terminal receives a second sliding operation (for example, a sliding operation from bottom to top) on the second window, the terminal increases the volume of the terminal. After the terminal receives a third sliding operation (for example, a sliding operation from right to left) on the second window, the terminal performs a rewind operation on a video in the video element. After the terminal receives a fourth sliding operation (for example, a sliding operation from left to right) on the second window, the terminal performs a fast-forward operation on the video in the video element.

An element in the second window, that is, the window in the medium window form, may be extracted by the terminal from the plurality of elements in the application window of the first application.

For example, an element that needs to be presented in the window in the medium window form may be predetermined.

For another example, the terminal may obtain, based on the first identifier and from stored configuration files corresponding to different identifiers (the configuration files are configuration files for the window in the medium window form), a configuration file corresponding to the first identifier, and then may extract, based on the obtained configuration file and from the plurality of elements in the application window of the first application, an element that needs to be presented in the window in the medium window form.

For another example, the terminal may obtain, based on the type of the first application and from stored recommendation models corresponding to different identifiers (the recommendation models are recommendation models for the window in the medium window form), a recommendation model corresponding to the type of the first application, and then may extract, based on the obtained recommendation model and from the plurality of elements in the application window of the first application, an element that needs to be presented in the window in the medium window form.

A layout, in the window in the medium window form, of the extracted element that needs to be presented in the window in the medium window form may be different from a layout of a corresponding element in the application window of the first application. For example, the terminal may re-lay, based on a corresponding layout file, the extracted element that needs to be presented in the window in the medium window form.

In another possible implementation, the second window further includes a close button and an enlarge button. The method may further include: After the terminal receives an operation on the close button, the terminal skips displaying the second window. After the terminal receives an operation on the enlarge button, the terminal displays the application window of the first application, and skips displaying the second window.

In another possible implementation, after the terminal changes the first window to the second window and displays the second window on the display screen of the terminal, the method may further include: After determining that no user operation is received within a preset time period or receiving a fourth operation on the second window, the terminal changes the second window to the first window and displays the first window on the display screen of the terminal. The live window may further support a change from the medium window form to the small window form, which can meet a plurality of processing requirements of the user, thereby improving user experience.

In another possible implementation, the displaying a first window on the display screen of the terminal may include: The terminal displays a desktop on the display screen of the terminal, and displays the first window on the desktop. The desktop may include an icon of a second application. After the displaying a first window on the display screen of the terminal, the method may further include: After receiving an operation of dragging the first window, the terminal displays an animation in which the first window moves. When the first window is dragged to a position of the icon of the second application, the terminal displays an application window of the second application on the display screen of the terminal. When the user drags the first window so that the first window hovers over an icon of an application, the mobile phone may be triggered to display an application window of the application.

In another possible implementation, after the terminal displays the first window, the method may further include: After receiving the second operation, the terminal displays the multi-task interface. The multi-task interface includes the application window of the second application. After receiving an operation of dragging the first window, the terminal displays an animation in which the first window moves. When the first window is dragged to a position of the application window of the second application, the terminal displays the application window of the second application on the display screen of the terminal.

In another possible implementation, after receiving a drag release operation, the terminal converts the first window into a resource file and inserts the resource file into the application window of the second application. In addition, after the user stops dragging the window, the window may be converted into a resource file and inserted into the application window. For example, content of the first window is converted into a resource file and stored locally or sent to another device, and an insertion result is displayed in the application window of the second application.

In another possible implementation, the terminal is connected to a second terminal. After the displaying a first window on the display screen of the terminal, the method may further include: After receiving an operation of dragging the first window, the terminal displays an animation in which the first window moves. After determining that a drag intent of the user is to perform a cross-device drag, the terminal sends data of the first window to the second terminal. The data of the first window is used by the second terminal to display the first window on a display screen of the second terminal. The live window supports the cross-device drag, which improves use efficiency in multi-terminal collaboration.

The foregoing is described by using an example in which the window in the small window form, that is, the first window, is dragged. The window in the medium window form, that is, the second window, may also be dragged.

According to a second aspect of this application, a display apparatus is provided. The apparatus may be applied to a terminal, and the apparatus may include: a display unit, configured to display an application window of a first application on a display screen of the terminal, where the application window of the first application includes a plurality of elements; and an input unit, configured to receive a first operation. The display unit is further configured to: after the first operation is received, display a first window on the display screen of the terminal. The first window includes some elements in the application window of the first application.

In a possible implementation, the first operation may include a drag operation on the application window of the first application in a multi-task interface. The display unit is specifically configured to: after a second operation is received, display the multi-task interface. The multi-task interface includes the application window of the first application. The display unit is specifically configured to: display an animation in which the application window of the first application moves; and when it is determined that the application window of the first application moves to a specified area of the display screen of the terminal, display the first window on the display screen of the terminal.

In another possible implementation, the application window of the first application may be a freeform window. The first operation may be a drag operation on the application window of the first application, that is, the freeform window of the first application. The display unit is specifically configured to: display an animation in which the application window, that is, the freeform window, of the first application moves; and when it is determined that the application window, that is, the freeform window, of the first application moves to a specified area of the display screen of the terminal, display the first window on the display screen of the terminal.

In another possible implementation, the first operation may be an operation that triggers the first application to switch to background.

In another possible implementation, the display unit is further configured to display a notification message on the display screen of the terminal. The first operation is a selection operation on the notification message.

In another possible implementation, the apparatus may further include: an obtaining unit, configured to extract the some elements from the plurality of elements of the application window of the first application.

In another possible implementation, the some elements may be predetermined. For example, the some elements may be a video element.

In another possible implementation, the obtaining unit is specifically configured to: obtain a first identifier, and obtain, from stored configuration files corresponding to different identifiers, a configuration file corresponding to the first identifier, where the configuration file corresponding to the first identifier includes identifiers of the some elements; and extract the some elements from the plurality of elements of the application window of the first application based on the configuration file corresponding to the first identifier. The first identifier may include an identifier of the first application, or the first identifier may include an identifier of the first application and an identifier of an interface in the application window.

In another possible implementation, the obtaining unit is specifically configured to: obtain a type of the first application, and obtain, from stored recommendation models corresponding to different types of applications, a recommendation model corresponding to the type of the first application, where the recommendation model has a function of extracting, based on a type corresponding to an application, an element that needs to be displayed in the first window; and extract the some elements from the plurality of elements in the application window of the first application based on the recommendation model corresponding to the type of the first application.

In another possible implementation, a layout of the some elements in the first window is different from a layout, in the application window, of elements corresponding to the some elements.

In another possible implementation, the layout of the some elements in the first window is predetermined.

In another possible implementation, the obtaining unit is further configured to obtain, from a stored layout file based on the first identifier, a layout file corresponding to the first identifier, and lay the some extracted elements based on the obtained layout file. The first identifier may include the identifier of the first application, or the first identifier may include the identifier of the first application and the identifier of the interface in the application window.

In another possible implementation, the obtaining unit is further configured to obtain, from a stored layout file based on the type of the first application, a layout file correspond- ing to the type of the first application, and lay the some extracted elements based on the obtained layout file.

In another possible implementation, the input unit is further configured to receive a third operation on the first window. The display unit is further configured to: after the third operation on the first window is received, change the first window to a second window and display the second window on the display screen of the terminal. The second window includes some elements in the application window of the first application, and the second window includes more elements than the first window.

An element in the second window, that is, a window in a medium window form, may be extracted by the terminal from the plurality of elements in the application window of the first application. That is, the obtaining unit is further configured to extract, from the plurality of elements in the application window of the first application, an element that needs to be presented in the second window.

For example, the element that needs to be presented in the second window may be predetermined.

For another example, the obtaining unit is specifically configured to obtain, based on the first identifier and from stored configuration files corresponding to different identi- fiers (the configuration files are configuration files for the second window), a configuration file corresponding to the first identifier, and then extract, based on the obtained configuration file and from the plurality of elements in the application window of the first application, the element that needs to be presented in the second window.

For another example, the obtaining unit is specifically configured to obtain, based on the type of the first applica- tion and from stored recommendation models corresponding to different types of applications (the recommendation mod- els are recommendation models for the second window), a recommendation model corresponding to the type of the first application, and then extract, based on the obtained recom- mendation model and from the plurality of elements in the application window of the first application, the element that needs to be presented in the second window.

A layout, in the window in the medium window form, of the extracted element that needs to be presented in the window in the medium window form may be different from a layout of a corresponding element in the application window of the first application.

In another possible implementation, the second window further includes a close button and an enlarge button. The input unit is further configured to receive an operation on the close button. The display unit is further configured to: after the operation on the close button is received, skip displaying the second window. The input unit is further configured to receive an operation on the enlarge button. The display unit is further configured to: after the operation on the enlarge button is received, display the application window of the first application, and skip displaying the second window.

In another possible implementation, the display unit is further configured to: after it is determined that no user operation is received within a preset time period or a fourth operation on the second window is received, change the second window to the first window and display the first window on the display screen of the terminal.

In another possible implementation, that the display unit displays a first window may include: displaying a desktop on the display screen of the terminal, and displaying the first window on the desktop. The desktop may include an icon of a second application. The input unit is further configured to receive an operation of dragging the first window. The display unit is further configured to: after the operation of dragging the first window is received, display an animation in which the first window moves; and when the first window is dragged to a position of the icon of the second application, display an application window of the second application on the display screen of the terminal.

In another possible implementation, the display unit is further configured to: after the second operation is received, display the multi-task interface, where the multi-task inter- face includes the application window of the second appli- cation; after an operation of dragging the first window is received, display an animation in which the first window moves; and when the first window is dragged to a position of the application window of the second application, display the application window of the second application on the display screen of the terminal.

In another possible implementation, the input unit is further configured to receive a drag release operation. The apparatus may further include: a storage unit, configured to: after the drag release operation is received, convert the first window into a resource file and store the resource file. Alternatively, the apparatus further includes: a sending unit, configured to: after the drag release operation is received, convert the first window into a resource file, and send the resource file to another device by using the second applica- tion.

In another possible implementation, the terminal is con- nected to a second terminal. The input unit is further configured to receive an operation of dragging the first window. The display unit is further configured to: after the operation of dragging the first window is received, display an animation in which the first window moves. The appa- ratus may further include: a sending unit, configured to: after it is determined that a drag intent of a user is to perform a cross-device drag, send data of the first window to the second terminal. The data of the first window is used by the second terminal to display the first window on a display screen of the second terminal.

According to a third aspect of this application, a display apparatus is provided. The apparatus may include a proces- sor and a memory configured to store instructions executable by the processor. When the processor is configured to execute the instructions, the display apparatus is enabled to implement the method according to any one of the first aspect or the possible implementations of the first aspect.

According to a fourth aspect of this application, a com- puter-readable storage medium is provided. The computer- readable storage medium stores computer program instructions, and when the computer program instructions are executed by an electronic device, the electronic device is enabled to implement the method according to any one of the first aspect or the possible implementations of the first aspect.

According to a fifth aspect of this application, an electronic device (for example, the foregoing terminal) is provided. The electronic device includes a display screen, one or more processors, and a memory. The display screen, the processor, and the memory are coupled. The memory is configured to store computer program code, the computer program code includes computer instructions, and when the computer instructions are executed by the electronic device, the electronic device is enabled to perform the method according to any one of the first aspect or the possible implementations of the first aspect.

According to a sixth aspect of this application, a computer program product is provided, including computer-readable code, or a non-volatile computer-readable storage medium carrying computer-readable code. When the computer-readable code runs in an electronic device (for example, the foregoing terminal), a processor in the electronic device performs the method according to any one of the first aspect or the possible implementations of the first aspect.

It may be understood that for beneficial effects that can be achieved by the display apparatus according to any one of the second aspect and the possible implementations of the second aspect, the display apparatus according to the third aspect, the computer-readable storage medium according to the fourth aspect, the electronic device according to the fifth aspect, and the computer program product according to the sixth aspect, refer to beneficial effects in any one of the first aspect and the possible implementations of the first aspect. Details are not described herein again.

DESCRIPTION OF EMBODIMENTS

Currently, a user may use a mobile phone to browse news information, watch a video, perform online shopping, or the like. When using the mobile phone, if key information in a current interface is moved out of a screen of the mobile phone, the user cannot continue to view the key information.

Figure 1A:
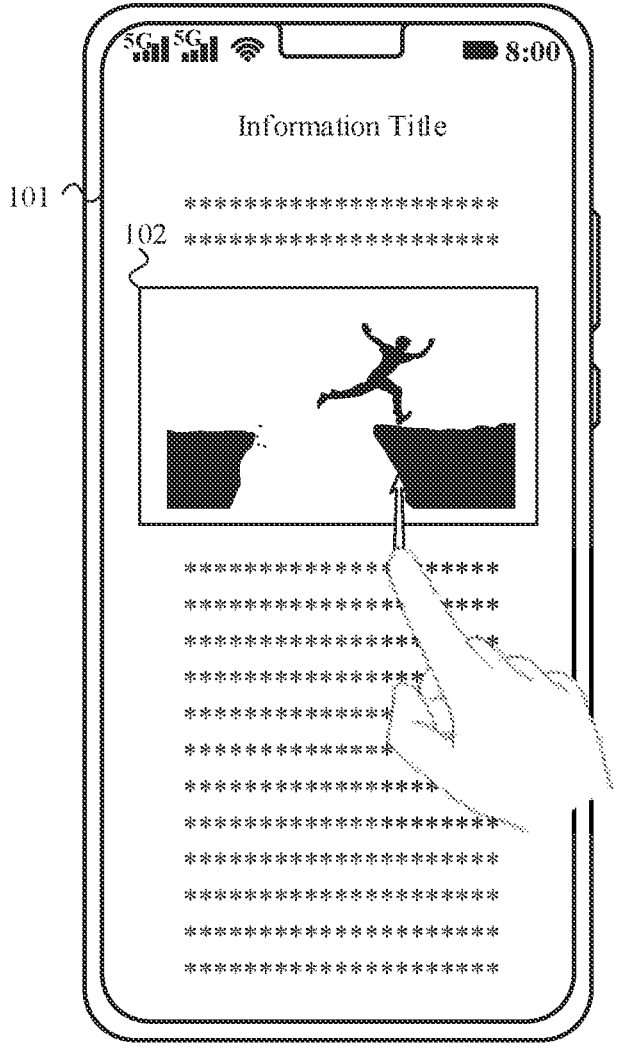
FIG. 1(a) and FIG. 1(b) are schematic diagrams of a display interface in a related technology according to an embodiment of this application.
Figure 1B:
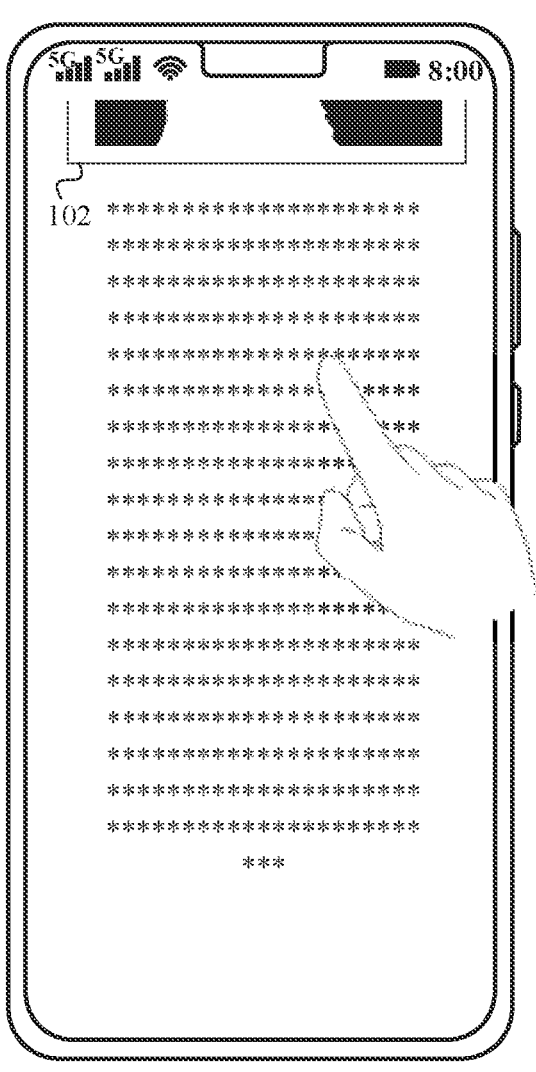

For example, with reference to FIG. 1(a) and FIG. 1(b), the user uses the mobile phone to browse information in Weibo®, Toutiao®, or a WeChat® official account. For example, as shown in FIG. 1(a), the user currently browsers an interface 101, and the interface 101 includes a video element 102. After the user opens the interface 101 or performs a tap operation on a play button in the video element 102, the mobile phone may start to play a corresponding video. After moved out of the screen of the mobile phone, the video element 102 cannot be watched. For example, as shown in FIG. 1(a), the user performs an upward sliding operation on the screen of the mobile phone. As shown in FIG. 1(b), as a user finger moves, the video element 102 may be moved out of the screen of the mobile phone. After the video element 102 is moved out of the screen of the mobile phone, the video in the video element 102 stops playing and is not displayed.

In current technologies, a floating window function is provided to resolve the foregoing problem.

In a first related technology, a third-party application developer may customize a floating window function. The first related technology includes the following technology 1 to technology 3.

Technology 1: A third-party application developer may customize a page-level or application-level floating window function for an application.

Figure 2A:
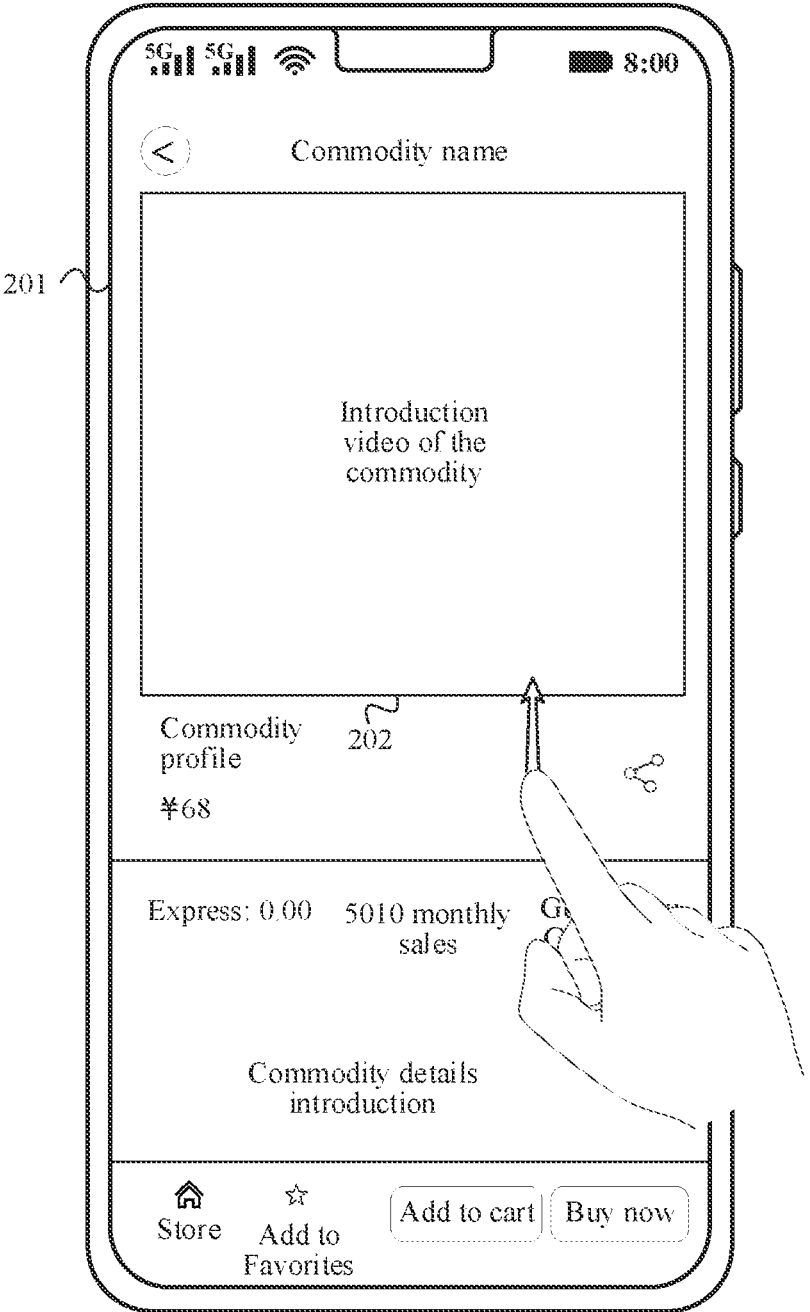
FIG. 2(a) and FIG. 2(b) are schematic diagrams of a display interface in another related technology according to an embodiment of this application.
Figure 2B:
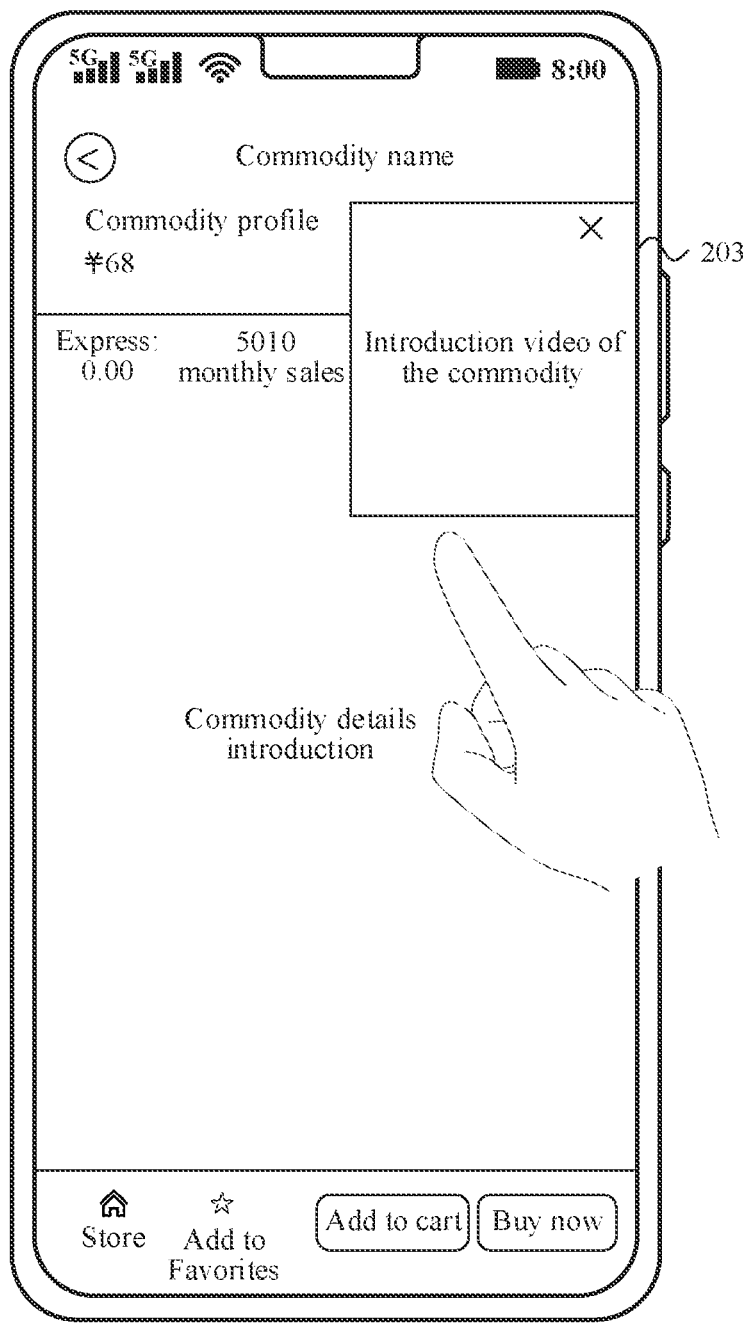

For example, with reference to FIG. 2(a) and FIG. 2(b), Taobao® customizes a page-level floating window function. As shown in FIG. 2(a), the user currently browses a details page 201 of a commodity, and the details page 201 includes a video element 202. The user taps a play button of the video element 202, and the mobile phone may start to play an introduction video of the commodity. As shown in FIG. 2(a), the user's finger slides upward on the screen of the mobile phone. As the user finger moves, the video element 202 may be moved out of the screen of the mobile phone. After the video element 202 is moved out of the screen of the mobile phone, as shown in FIG. 2(b), the mobile phone may display a floating window 203, and continue to play the introduction video of the commodity in the floating window 203. However, after the user switches to another page, for example, returns to a previous page or jumps to a details page of another commodity, the floating window is not displayed, and the video playing stops.

For another example, YouTube® customizes an application-level floating window function. When the user watches a video on YouTube®, if the user switches to another page on YouTube®, the video is moved into a floating window and video playing continues. However, after the user exits YouTube®, the floating window is not displayed and the video playing stops.

Technology 2: A third-party application developer may customize a system-level floating window function for an application.

For example, a video application such as Youku®, Tencent®, or iQIYI®, or Bilibili® customizes a picture-in-picture function. When the video application plays a video, the user may input a corresponding operation to trigger moving the video from a video component of a page to a picture-in-picture (the picture-in-picture may also be considered as a floating window) for playing. Then, after the user switches to another page or exits the video application, the video can still be played in the picture-in-picture for the user to watch. However, applications and application types (mainly video applications) supported by the picture-in-picture, which may be referred to as a system-level floating window, are limited.

Figure 3A:
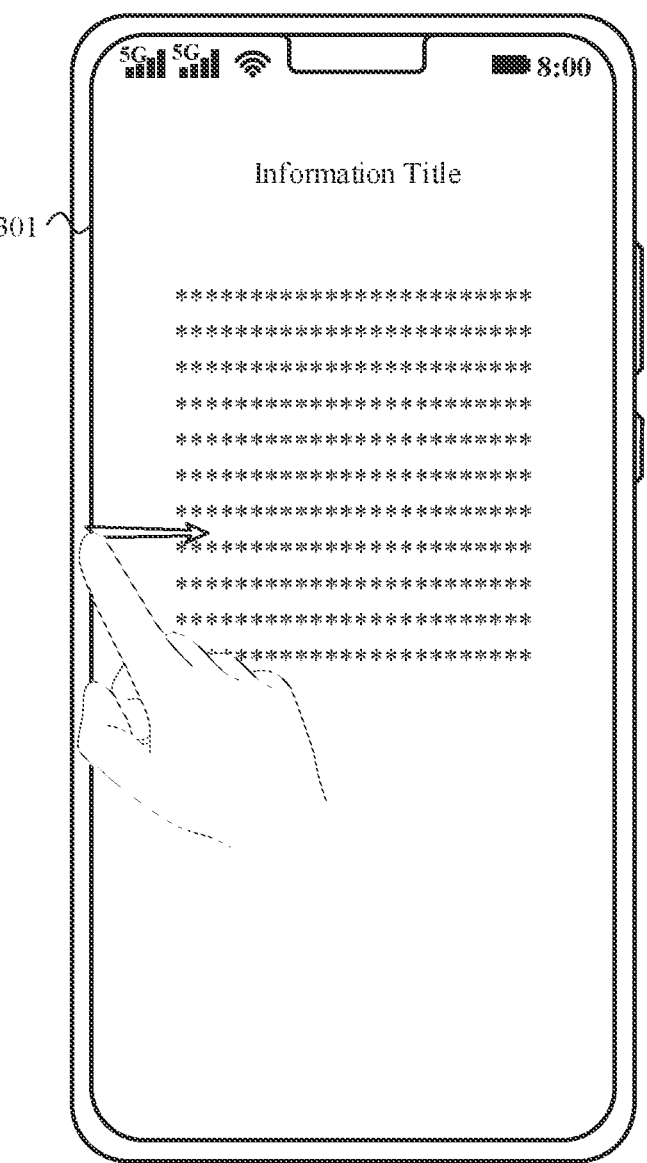
FIG. 3(a) to FIG. 3(c) are schematic diagrams of a display interface in still another related technology according to an embodiment of this application.
Figure 3B:
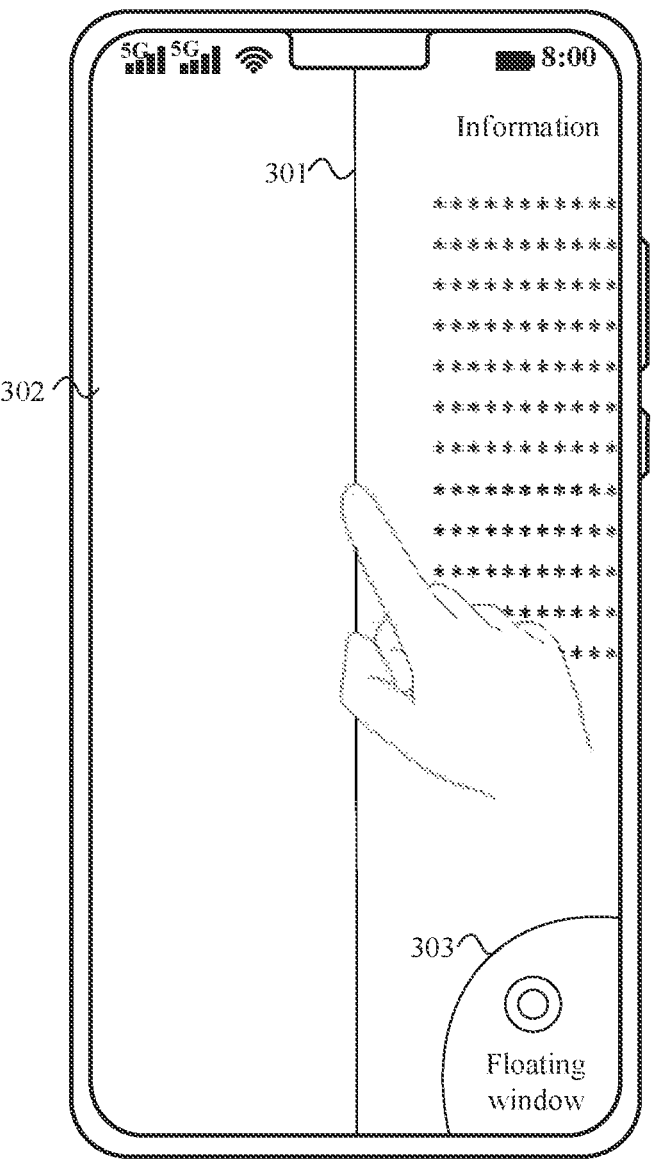
Figure 3C:
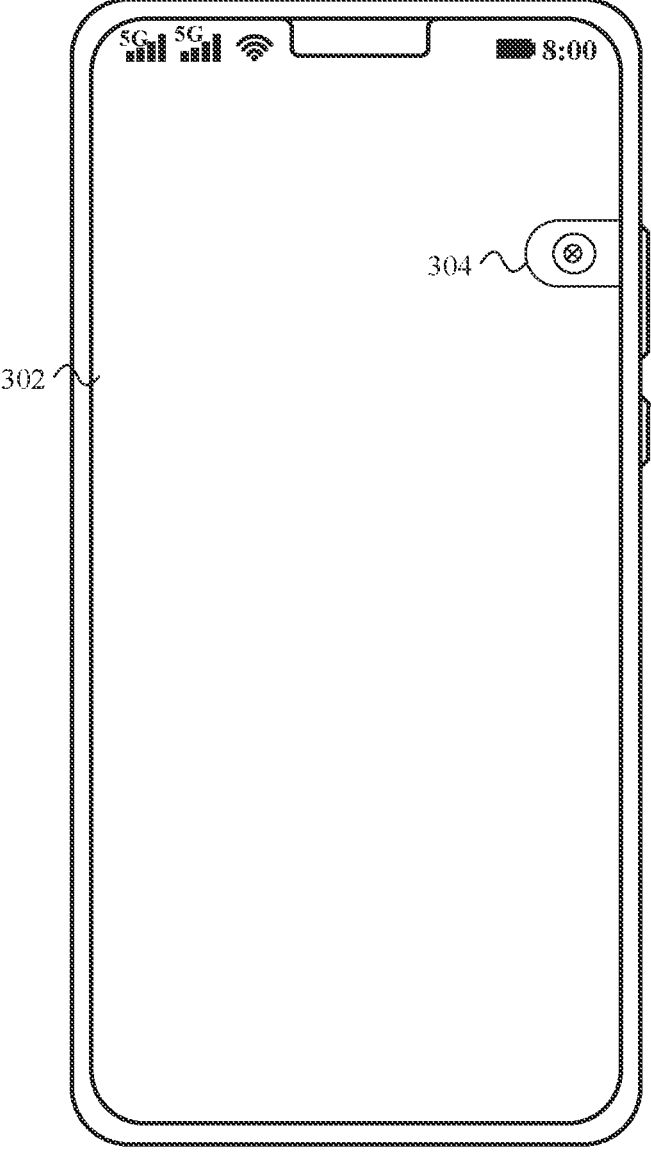

Technology 3: A WeChat® developer defines a floating window function for WeChat®. The floating window is a temporary entry to a mini program or an article link. For example, refer to FIG. 3(a). As shown in FIG. 3(a), the user browses an information page 301 of an official account in WeChat®. The user may perform a sliding operation from left to right of the screen of the mobile phone, to trigger the mobile phone to return to an upper-level page of the information page 301. As shown in FIG. 3(b), as the user's finger slides, the mobile phone may display a partial area of the information page 301 and a partial area 302 of the upper-level page of the information page 301. In response to the sliding operation of the user, the mobile phone may further display a floating window indication area 303 in a lower right corner of the screen of the mobile phone. After the user's finger slides into the floating window indication area 303, as shown in FIG. 3(c), the mobile phone may display a floating window 304. The floating window 304 is a link entry to the information page 301. Then, when the user switches between pages in WeChat®, the floating window 304 keeps displayed. After the user exits WeChat®, the floating window 304 is not displayed. As described above, the floating window 304 is a temporary entry to a link, and corresponding information, for example, the information page 301, is displayed on the mobile phone only after the user performs a tap operation on the floating window 304.

Figure 4A:
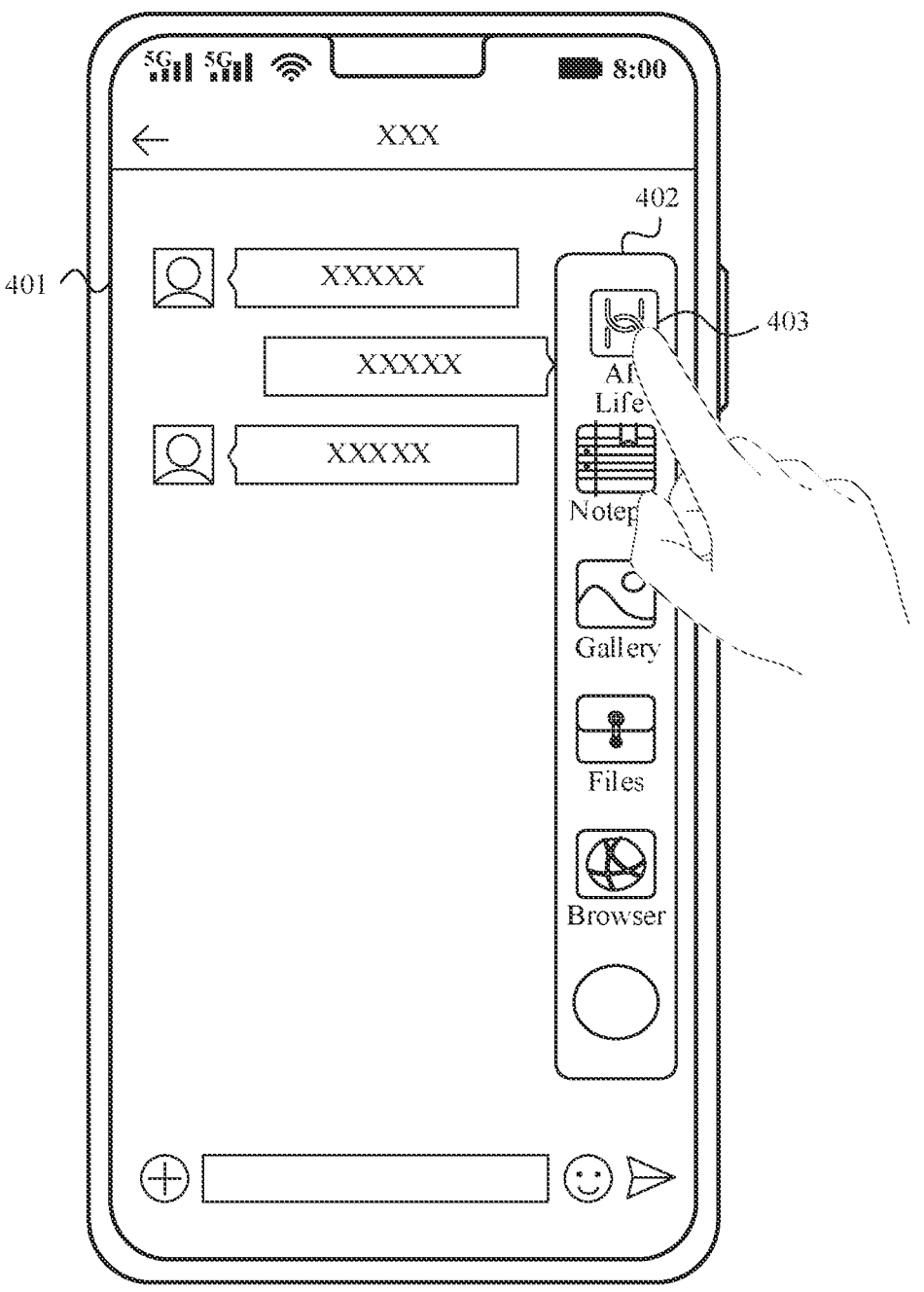
FIG. 4(a) and FIG. 4(b) are schematic diagrams of a display interface in still another related technology according to an embodiment of this application.
Figure 4B:
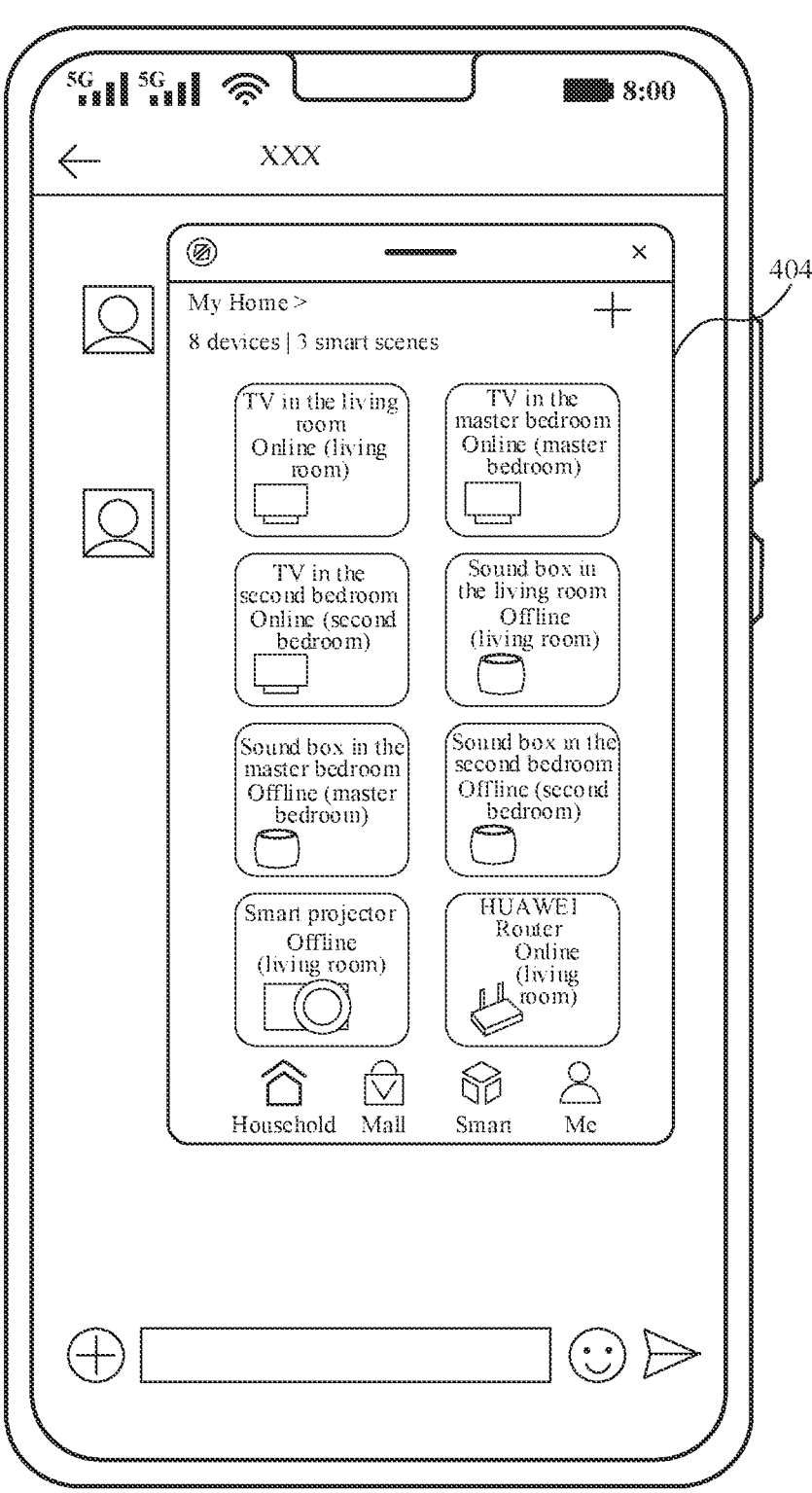

In a second related technology, Huawei customizes a freeform (freeform) window function. The freeform window may be considered as a system-level floating window. This function enables an entire application window to be displayed in a freeform window form. When the user switches between pages, opens another application, or jumps to a desktop, the freeform window keeps displayed on top. For example, refer to FIG. 4(a). As shown in FIG. 4(a), the mobile phone displays a chat interface 401. The user may perform, on the screen of the mobile phone, a leftward sliding operation starting from a right edge of the screen. In response to the sliding operation, the mobile phone may display a dock bar 402. The dock bar 402 includes one or more application icons, for example, an icon 403 of AI Life. After the user performs an operation, for example, a tap operation, on the icon 403 of AI Life in the dock bar 402, as shown in FIG. 4(b), the mobile phone may display an interface of AI Life in a form of a freeform window 404. Then, when the user switches between pages in the chat application or opens another application, the interface of AI Life may be displayed on top in the freeform window form on the screen of the mobile phone. However, the freeform window includes all content in the application window, and much information is redundant, which affects obtaining of key information and use experience.

It can be learned that in the related technologies, the floating window function mainly works for a single application or page, or supported applications and application types are limited. Although the freeform window is a global system-level small window, the freeform window includes all content of an application window, and is crowded with excessive content displayed, affecting final user experience.

An embodiment of this application provides a live window (live window) display method. The method may be applied to a terminal. According to the method provided in this embodiment, after a live window trigger condition is met, the terminal may extract a key element in a display interface of the terminal, and display the key element in a live window form on a terminal screen. The live window can be page-level, application-level, and system-level, that is, when a user switches between pages or exits an application, the live window stays on the terminal screen. In addition, content presented in the live window is a key element recommended by a system or customized by a third-party application. This does not affect user experience due to display of excessive content, and can meet a processing requirement of the user.

It should be noted that the live window in this embodiment may also be referred to as a floating window or a local small window, which is not limited in this embodiment.

For example, the terminal in this embodiment of this application may be a mobile phone, a tablet computer, a handheld computer, a PC, a cellular phone, a personal digital assistant (personal digital assistant, PDA), a wearable device (for example, a smartwatch), an in-vehicle computer, a game console, and an augmented reality (augmented reality. AR)/virtual reality (virtual reality, VR) device. A specific form of the terminal is not specially limited in this embodiment. In addition, in addition to the terminal (or referred to as a mobile terminal), the technical solution provided in this embodiment may be applied to another electronic device, for example, a smart household device (for example, a television set).

The following describes implementations of this embodiment of this application in detail with reference to accompanying drawings.

Figure 5:
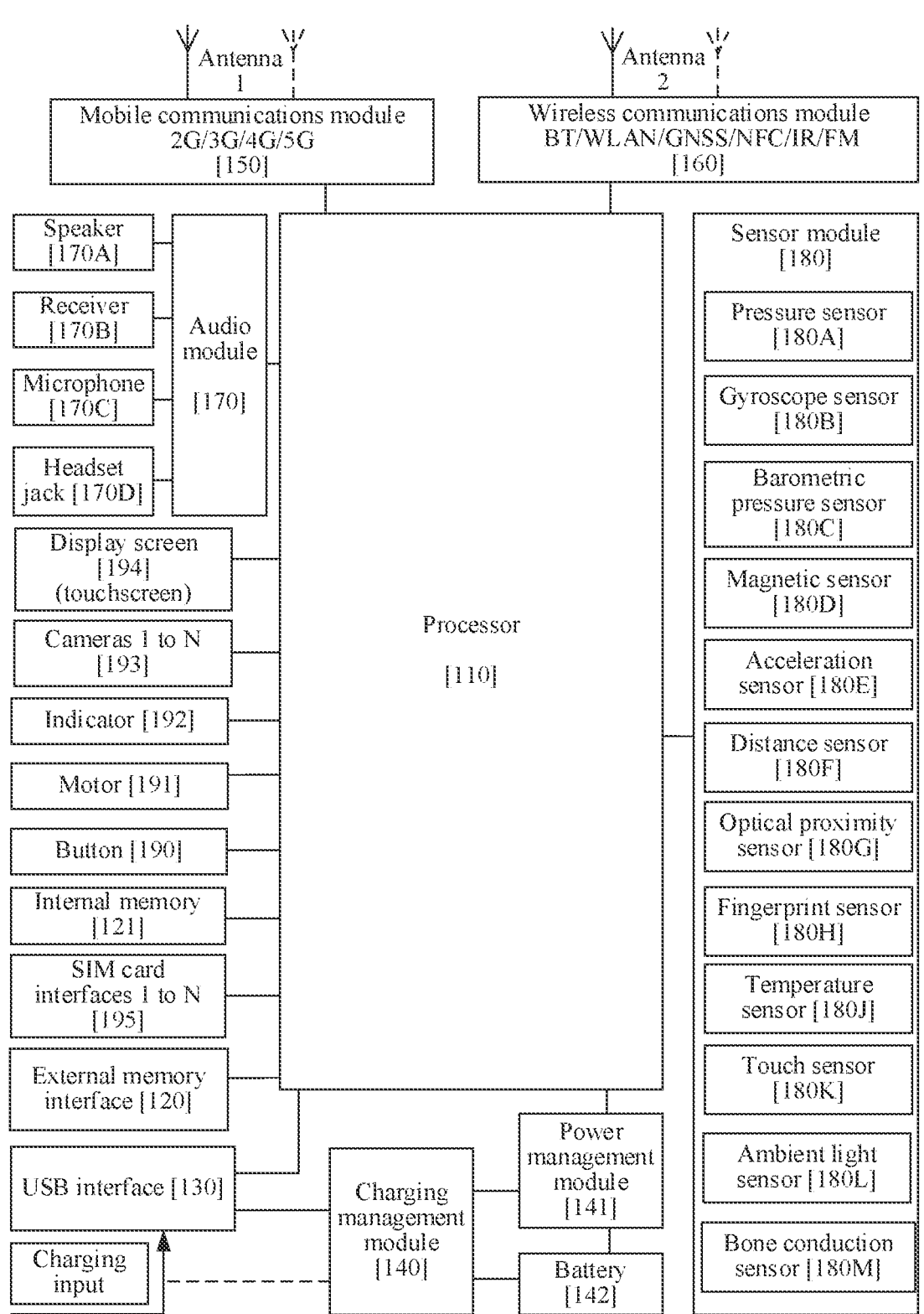
FIG. 5 is a schematic diagram of a structure of a mobile phone according to an embodiment of this application.

In this embodiment, for example, the terminal is a mobile phone. FIG. 5 is a schematic diagram of a structure of a mobile phone according to an embodiment of this application. Methods in the following embodiments may be implemented in a mobile phone having the foregoing hardware structure.

As shown in FIG. 5, the mobile phone may include a processor 110, an external memory interface 120, an internal memory 121, a universal serial bus (universal serial bus, USB) interface 130, a charging management module 140, a power management module 141, a battery 142, an antenna 1, an antenna 2, a wireless communications module 160, an audio module 170, a speaker 170A, a receiver 170B, a microphone 170C, a headset jacket 170D, a sensor module 180, a button 190, a motor 191, an indicator 192, a camera 193, a display screen 194, and the like. Optionally, the mobile phone may further include a mobile communications module 150, a subscriber identity module (subscriber identity module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the schematic structure in this embodiment does not constitute a specific limitation on the mobile phone. In some other embodiments, the mobile phone may include more or fewer components than those shown in the figure, or have some components combined, or have some components split, or have a different component arrangement. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the mobile phone. The controller may generate an operation control signal based on instruction operation code and a timing signal, to control instruction fetching and execution.

A memory may be further disposed in the processor 110, to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface, MIPI), a general-purpose input/output (general-purpose input/output, GPIO) interface, a SIM interface, a USB interface, and/or the like.

The charging management module 140 is configured to receive a charging input from a charger. When charging the battery 142, the charging management module 140 may further supply power to the mobile phone by using the power management module 141. The power management module 141 is configured to connect the battery 142, the charging management module 140, and the processor 110. The power management module 141 may also receive an input of the battery 142 to supply power to the mobile phone.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone may be configured to cover one or more communications bands. Different antennas may be further multiplexed, to improve antenna utilization. For example, the antenna 1 may be multiplexed as a diversity antenna of a wireless local area network. In some other embodiments, the antenna may be used in combination with a tuning switch.

When the mobile phone includes the mobile communications module 150, the mobile communications module 150 may provide a wireless communications solution that is applied to the mobile phone and that includes 2G/3G/4G/5G and the like. The mobile communications module 150 may include at least one filter, switch, power amplifier, low noise amplifier (low noise amplifier, LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation from the antenna 1. In some embodiments, at least some function modules of the mobile communications module 150 may be configured in the processor 110. In some embodiments, at least some function modules in the mobile communications module 150 may be disposed in a same component as at least some modules in the processor 110.

The modem processor may include a modulator and a demodulator. The modulator is configured to modulate a to-be-sent low-frequency baseband signal into an intermediate/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communications solution that is applied to the mobile phone and that includes a wireless local area network (wireless local area network, WLAN) (for example, a Wi-Fi network). Bluetooth (Bluetooth, BT), a global navigation satellite system (global navigation satellite system, GNSS), frequency modulation (frequency modulation, FM), NFC, an infrared (infrared, IR) technology, and the like. The wireless communications module 160 may be one or more components integrating at least one communications processor module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation from the antenna 2.

In some embodiments, the antenna 1 of the mobile phone is coupled to the mobile communications module 150, and the antenna 2 is coupled to the wireless communications module 160, so that the mobile phone may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR, and/or other technologies. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based enhancement system (satellite-based augmentation system, SBAS).

The mobile phone implements a display function by using the GPU, the display screen 194, the application processor, and the like. The GPU is a microprocessor for image processing, and is connected to the display screen 194 and the application processor. The processor 110 may include one or more GPUs that execute a program instruction to generate or change display information.

The display screen 194 is configured to display an image, a video, and the like. The display screen 194 includes a display panel. The display panel may use a liquid crystal display (liquid crystal display. LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the mobile phone may include one or N display screens 194. N is a positive integer greater than 1.

The mobile phone may implement a photographing function by using the ISP, the camera 193, the video codec, the GPU, the display screen 194, the application processor, and the like. In some embodiments, the mobile phone may include one or N cameras 193. N is a positive integer greater than 1.

The external memory interface 120 may be configured to connect to an external memory card, for example, a microSD card, to expand a storage capability of the mobile phone. The external memory card communicates with the processor 110 by using the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to execute various function applications and data processing of the mobile phone. The internal memory 121 may include a program storage area and a data storage area. The program storage area may store an operating system, an application required by at least one function (for example, a voice playing function or an image playing function), and the like. The data storage area may store data (such as audio data and an address book) created during use of the mobile phone, and the like. In addition, the internal memory 121 may include a high-speed random access memory, or may include a non-volatile memory, for example, at least one magnetic disk storage, a flash memory, or a universal flash storage (universal flash storage, UFS).

The mobile phone may use the audio module 170, the speaker 170A, the receiver 170B, the microphone 170C, the headset jack 170D, the application processor, and the like to implement an audio function, for example, music playing or recording.

The pressure sensor 180A is configured to sense a pressure signal, and may convert the pressure signal into an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. When a touch operation is applied to the display screen 194, the mobile phone detects intensity of the touch operation based on the pressure sensor 180A. The mobile phone may also calculate a touch position based on a signal detected by the pressure sensor 180A.

The gyroscope sensor 180B may be configured to determine a motion posture of the mobile phone. The barometric pressure sensor 180C is configured to measure barometric pressure. The magnetic sensor 180D includes a Hall sensor. The mobile phone may detect, by using the magnetic sensor 180D, whether a flip leather case is opened or closed. The acceleration sensor 180E may detect accelerations in various directions (usually on three axes) of the mobile phone. The distance sensor 180F is configured to measure a distance. The mobile phone may detect, by using the optical proximity sensor 180G, that the user holds the mobile phone close to an ear to make/answer a call, to automatically turn off the screen for power saving. The optical proximity sensor 180G may also be configured to automatically unlock or lock the screen in a leather case mode or a pocket mode. The ambient light sensor 180L is configured to sense intensity of ambient light. The fingerprint sensor 180H is configured to collect a fingerprint. The mobile phone may implement fingerprint unlocking, application access locking, fingerprint photographing, fingerprint call answering, and the like by using a feature of the collected fingerprint. The temperature sensor 1803 is configured to detect a temperature.

The touch sensor 180K is also referred to as a "touch panel". The touch sensor 180K may be disposed on the display screen 194. The touch sensor 180K and the display screen 194 constitute a touchscreen, also referred to as a "touch control screen". The touch sensor 180K is configured to detect a touch operation performed on or near the touch sensor. The touch sensor may transmit the detected touch operation to the application processor to determine a touch event type. A visual output related to the touch operation may be provided by using the display screen 194. In some other embodiments, the touch sensor 180K may alternatively be disposed on a surface of the mobile phone at a position different from that of the display screen 194.

The bone conduction sensor 180M may obtain a vibration signal. The button 190 includes a power button, a volume button, and the like. The button 190 may be a mechanical button, or may be a touch button. The motor 191 may generate a vibration prompt. The motor 191 may be configured to generate an incoming call vibration prompt and a touch vibration feedback. The indicator 192 may be an indicator light, and may be configured to indicate a charging status and a battery level change, and may also be configured to indicate a message, a missed call, a notification, and the like.

When the mobile phone includes the SIM card interface 195, the SIM card interface 195 is configured to connect to a SIM card. The SIM card may be inserted into the SIM card interface 195 and removed from the SIM card interface 195, to contact and separate from the mobile phone. The mobile phone may support one or N SIM card interfaces. N is a positive integer greater than 1. The mobile phone interacts with a network by using the SIM card, to implement call, data communication, and other functions. In some embodiments, the mobile phone uses an eSIM, that is, an embedded SIM card. The eSIM card can be embedded in the mobile phone and cannot be separated from the mobile phone.

Figure 6:
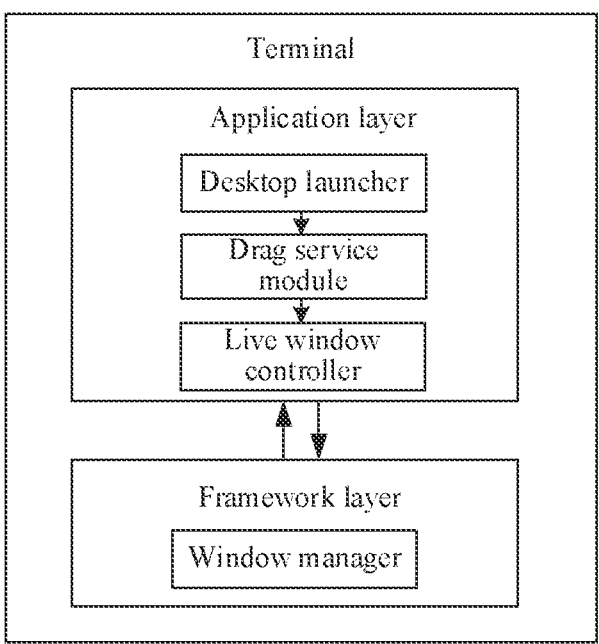
FIG. 6 is a schematic diagram of composition of a software architecture of a terminal according to an embodiment of this application.

In this embodiment of this application, an example in which a software system of the terminal is an Android system is used to illustrate a software structure of the terminal. FIG. 6 is a schematic diagram of composition of a software architecture of a terminal according to an embodiment of this application.

A software system of the terminal may use a layered architecture, an event-driven architecture, a microkernel architecture, a microservice architecture, or a cloud architecture. For example, the software system of the terminal is a layered architecture. In the layered architecture, software is divided into several layers, and each layer has a clear role and task. The layers communicate with each other by using a software interface.

In some embodiments, as shown in FIG. 6, the terminal may include an application layer and a framework layer (framework, FWK). The application layer may include a series of application packages. For example, the application package may include Settings. Calculator, Camera, Navigation, Shopping, Messaging, Video, Music, or other applications. The application included in the application layer may be a system application of the terminal, or may be a third-party application. This is not specifically limited in this embodiment of this application. The application layer may further include a drag service module and a live window controller (live window controller). The application layer may further include a desktop launcher (launcher). The live window controller may also be referred to as a live window manager, which is not specifically limited in this embodiment.

The framework layer is mainly configured to provide an application programming interface (application programming interface, API) and a programming framework for the application at the application layer. The framework layer may include a window manager (window manager, WM) and the like. The window manager may also be referred to as a window management module, which is not specifically limited in this embodiment.

Certainly, the terminal may further include another layer, for example, a kernel layer (not shown in FIG. 6). The kernel layer is a layer between hardware and software. The kernel layer may include at least a display driver, a camera driver, an audio driver, a sensor driver, and the like.

In this embodiment of this application, based on the foregoing software architecture, when the terminal currently displays an interface, for example, referred to as an interface 1, of an application, after a live window trigger condition is met, for example, an operation performed by the user to trigger live window display is received, or page content changes, or the user jumps to another application, the terminal may extract a key element in the interface 1 displayed on the terminal, add the key element to a live window, and display the live window on the terminal screen for the user to continue browsing.

Figure 7:
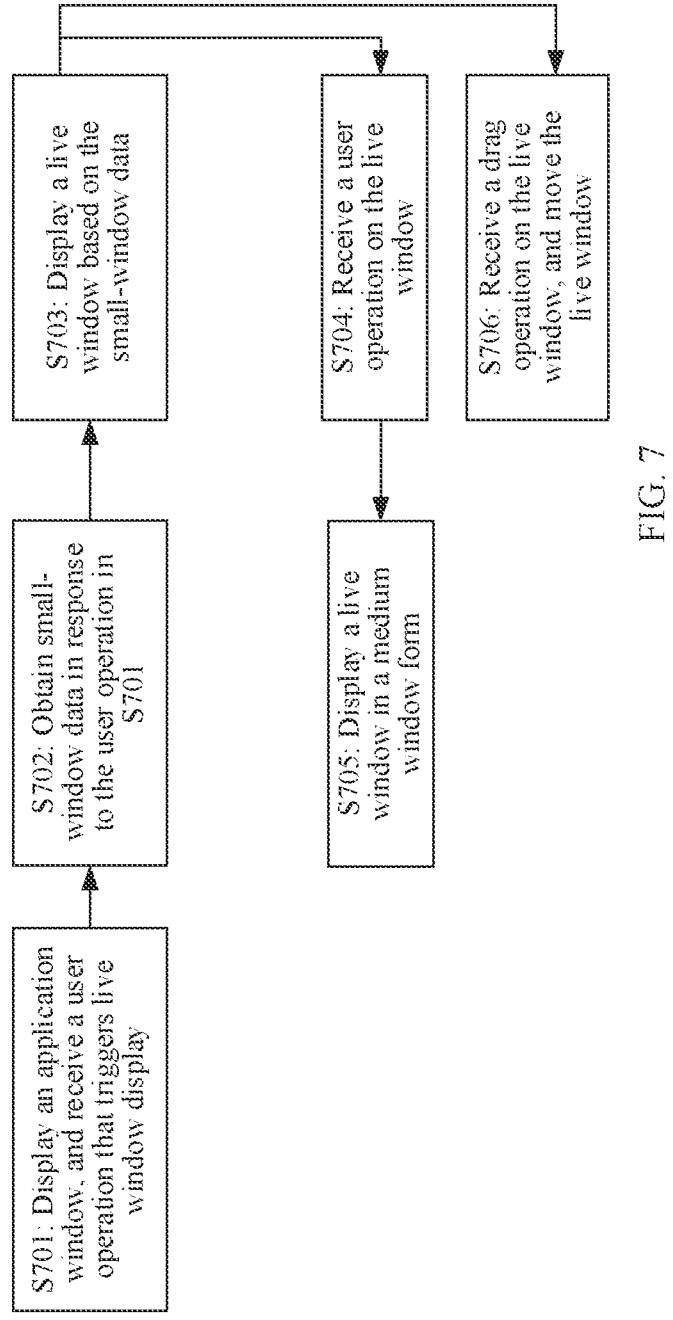
FIG. 7 is a schematic flowchart of a window display method according to an embodiment of this application.

With reference to FIG. 6, the following describes, in detail with reference to accompanying drawings by using an example in which the terminal is a mobile phone, the window display method provided in this embodiment of this application. FIG. 7 is a schematic flowchart of a window display method according to an embodiment of this application. As shown in FIG. 7, the method includes the following steps.

S701: The mobile phone displays an application window, and receives a user operation that triggers live window display.

The window is the most important part of a user interface (user interface, UI), and is a rectangular area that is on a display screen and that corresponds to an application, and a visual interface between a user and an application that generates the window. Generally, after the mobile phone receives an operation performed by the user to start an application, the application may create a window and display the window in a full-screen large window form. The window may be referred to as an application window. When the user operates a control of an interface in the application window, the application may respond correspondingly.

The live window (live window) in this embodiment may be a window that is on the display screen and that is configured to present a key element of an application, and is displayed as a small window floating on a large window of the display screen. When content on the display screen changes, for example, when an application window is switched or an interface is switched in an application window, the live window may continue to be displayed. The live window in this embodiment may also be referred to as a floating window, a local small window, or the like. In addition, the application may be any one of applications installed on the mobile phone. The application may be a system application, or may be a third-party application. This is not specifically limited in this embodiment.

In this embodiment, when the mobile phone displays an application window (the application window may be an application window of a first application in embodiments of this application), the user may perform a corresponding user operation, to trigger the mobile phone to display, in a live window form on the display screen of the mobile phone, a key element included in an interface in the application window. The user operation may include one or more operations.

In a possible implementation, the user operation may include an operation that triggers display of a multi-task interface (the operation may be a second operation in embodiments of this application) and an operation of dragging the application window in the multi-task interface to a specified area (the operation may be a first operation in embodiments of this application, or referred to as a drag operation). Alternatively, the user operation may include the operation that triggers display of the multi-task interface and an operation (for example, a tap operation) on a small-window button corresponding to the application window in the multi-task interface.

The operation that triggers display of the multi-task interface may be a touchscreen gesture operation, or may be a mid-air gesture operation. For example, the touchscreen gesture operation may be a sliding operation on the display screen of the mobile phone, for example, a sliding operation starting from a lower edge of the display screen of the mobile phone and pointing to an upper edge of the display screen of the mobile phone with a finger or a stylus temporarily not lifted after the sliding. The mid-air gesture operation may be a static mid-air gesture operation, or may be a dynamic mid-air gesture operation. The static mid-air gesture operation refers to a hand posture at a moment, for example, bending or folding of a finger, such as an OK gesture, a V gesture, or a gesture of stretching five fingers. The dynamic mid-air gesture operation refers to a hand motion status within a period of time, including a motion direction, a speed, a hand posture change, and the like, such as a swipe gesture, a pan gesture, a fist gesture, or a press gesture. A mid-air gesture operation that triggers display of the multi-task interface may be either the static mid-air gesture operation or the dynamic mid-air gesture operation.

The operation of dragging the application window in the multi-task interface to the specified area may be a touchscreen gesture operation. For example, the touchscreen gesture operation may be an operation of pressing and moving the application window in the multi-task interface. The operation of dragging the application window in the multi-task interface to the specified area may alternatively be a mid-air gesture operation. For example, the mid-air gesture operation may be a press gesture and a pan gesture on the application window in the multi-task interface. For another example, the mid-air gesture operation may be a fist gesture and a pan gesture on the application window in the multi-task interface. For still another example, the mid-air gesture operation may be the foregoing static mid-air gesture operation and pan gesture on the application window in the multi-task interface.

In another possible implementation, the user operation may include an operation that triggers the application window to be dragged up and an operation of dragging the dragged-up application window to a specified area.

The operation that triggers the application window to be dragged up may be a touchscreen gesture operation. For example, the touchscreen gesture operation that triggers the application window to be dragged up may be any one of the following predetermined gesture operations: a sliding operation on the display screen (for example, a sliding operation starting from the lower edge of the mobile phone and pointing to the upper edge of the mobile phone), a gesture operation (for example, a touch and hold operation or a double-tap operation) on a title bar of the application window, a gesture operation (for example, a touch and hold operation with a single finger, a double-tap operation with a single finger, or a touch and hold operation with a plurality of fingers) on the application window, a 3D touch (3D touch) operation on the application window, a palm operation (for example, a touch and hold operation with a palm or a tap operation with a palm) on the application window, and the like when the mobile phone displays the application window. The operation that triggers the application window to be dragged up may alternatively be the foregoing mid-air gesture operation.

The operation of dragging the dragged-up application window to the specified area may be a touchscreen gesture operation, or may be a mid-air gesture operation. The operation of dragging the dragged-up application window to the specified area is similar to the foregoing operation of dragging the application window in the multi-task interface to the specified area, and details are not described herein again.

The specified area in the foregoing implementation may be an area that is on the display screen of the mobile phone and that is a predetermined distance away from an edge of the display screen. The predetermined distance may be predefined, or may be set by the user in a provided setting interface. This is not limited in this embodiment. For example, the specified area may be an area that is on the display screen of the mobile phone and that is ⅓ or ½ away from the upper edge of the display screen.

For example, in the foregoing implementation, in the multi-task interface or when the application window is dragged up, the user may perform a corresponding operation, to drag the application window. With reference to FIG. 6, when the application window is dragged, the mobile phone, for example, the launcher at the application layer of the mobile phone, may perform drag listening, to determine whether the application window is dragged to the specified area. In this embodiment, the specified area may also be referred to as a dock (dock) area.

In some embodiments, a transparent view (view) control may be set in the specified area. When the application window is dragged to the specified area, the view control set in the specified area may detect that the application window is dragged to the specified area. In other words, when the view control detects that the application window is dragged to the specified area, the mobile phone (for example, the launcher at the application layer of the mobile phone) may determine that the application window is dragged to the specified area.

Figure 8A:
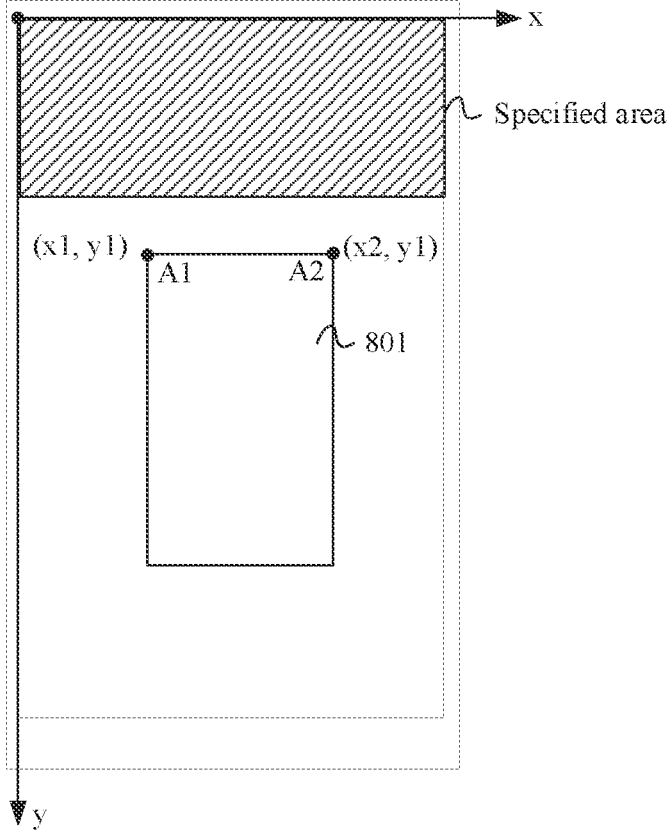
FIG. 8A is a schematic diagram of a display coordinate system according to an embodiment of this application.

In some other embodiments, the mobile phone (for example, the launcher at the application layer of the mobile phone) may determine a distance between the application window and an edge of the display screen, to determine whether the application window is dragged to the specified area. For example, the specified area is an area ⅓ away from the upper edge of the display screen. When determining that a distance between an upper left corner or an upper right corner of the application window and the upper edge of the display screen is less than a predetermined distance, for example, the predetermined distance is ⅓*L (L is a length of the display screen of the mobile phone), the launcher at the application layer of the mobile phone may determine that the application window is dragged to the specified area. For example, FIG. 8A is a schematic diagram of a display coordinate system according to this embodiment. As shown in FIG. 8A, an origin of coordinates of the display coordinate system is an upper left corner of the display screen of the mobile phone, an x-axis points from the origin of coordinates to a right edge of the display screen of the mobile phone, and a y-axis points from the origin of coordinates to the lower edge of the display screen of the mobile phone. A coordinate of the upper edge of the display screen on the y-axis in the display coordinate system is 0. When the application window, for example, an application window 801 shown in FIG. 8A, is dragged on the display screen of the mobile phone by the user, the mobile phone may monitor, in real time, an upper left corner and an upper right corner of the application window 801, for example, coordinates of A1 and A2 that are shown in FIG. 8A in the display coordinate system. For example, the coordinates of the upper left corner A1 in the display coordinate system are (x1, y1), and the coordinates of the upper right corner A2 in the display coordinate system are (x2, y1). Based on the coordinates of the two corners of the application window 801 and the coordinate of the upper edge of the display screen of the mobile phone, when determining that a distance between one of the two corners and the upper edge of the display screen is less than ⅓*L, the mobile phone may determine that the application window 801 is dragged to a specified area. For example, if the mobile phone determines, based on the coordinate y1 of the upper left corner A1 or the upper right corner A2 on the y-axis, that a distance (for example, y1) between the upper left corner A1 or the upper right corner A2 and the upper edge of the display screen is less than ⅓*L, the mobile phone may determine that the application window 801 is dragged to the specified area.

Figure 8B:
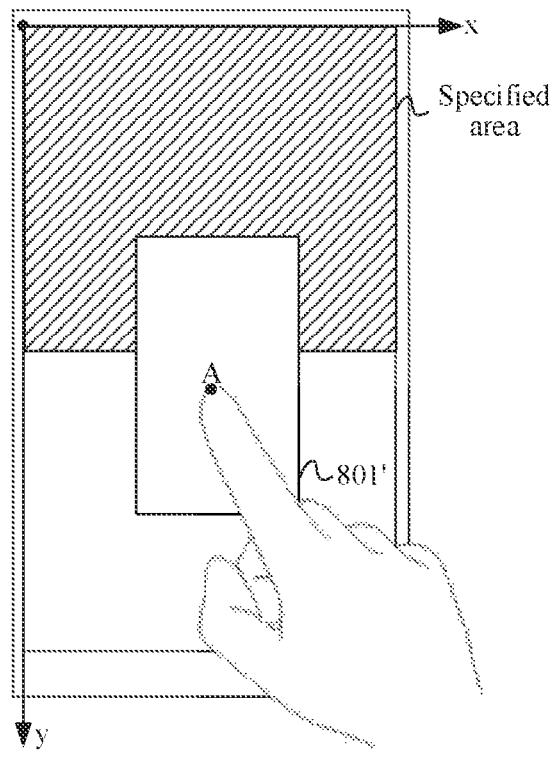
FIG. 8B is a schematic diagram of another display coordinate system according to an embodiment of this application.

In some other embodiments, the mobile phone (for example, the launcher at the application layer of the mobile phone) may determine a distance between a pressing point of the finger and an edge of the display screen when the user presses and drags the application window, to determine whether the application window is dragged to the specified area. For example, the specified area is an area ½ away from the upper edge of the display screen. When determining that a distance between the pressing point of the user finger and the upper edge of the display screen is less than a predetermined distance, for example, the predetermined distance is ½*L (L is a length of the display screen of the mobile phone), and the finger continues to slide in a same direction, the launcher at the application layer of the mobile phone may determine that the application window is dragged to the specified area. For example, FIG. 8B is a schematic diagram of a display coordinate system according to this embodiment. As shown in FIG. 8B, an origin of coordinates of the display coordinate system is the upper left corner of the display screen of the mobile phone, an x-axis points from the origin of coordinates to the right edge of the display screen of the mobile phone, and a y-axis points from the origin of coordinates to the lower edge of the display screen of the mobile phone. When the application window, for example, an application window 801' shown in FIG. 8B, is dragged on the display screen of the mobile phone by the user, the mobile phone may monitor, in real time, a pressing point of the user finger, for example, coordinates of a point A in the display coordinate system. Based on the coordinates of the pressing point of the user finger, that is, the point A, in the display coordinate system, when determining that a distance between the user finger and the upper edge of the display screen is less than ½*L, and the finger continues to slide in a same direction, the mobile phone may determine that the application window 801' is dragged to a specified area.

After the mobile phone determines that the application window is dragged to the specified area, it indicates that the user wants to use a live window function of the mobile phone, and the following S702 may be performed.

In still another possible implementation, the user operation may be an operation of switching to another page in the application window. The operation may be a touchscreen gesture operation, or may be a mid-air gesture operation. For example, the touchscreen gesture operation may be a sliding operation on the display screen of the mobile phone, for example, a sliding operation starting from the left edge of the display screen of the mobile phone and pointing to the right edge of the display screen of the mobile phone. Alternatively, the touchscreen gesture operation may be a tap operation on a button that is on a current page of the application window and that is configured to return to a previous page. The mid-air gesture operation may be either of the static mid-air gesture operation or the dynamic mid-air gesture operation in the foregoing implementation.

Alternatively, the user operation may be a sliding operation on the current page of the application window. The sliding operation may be a touchscreen gesture operation, for example, is specifically a sliding operation from bottom to top or from top to bottom on the display screen of the mobile phone. The sliding operation may trigger the current page of the application window to slide downward or slide upward. Alternatively, the user operation may be a sliding operation that is in the application window and that starts from the right edge of the display screen of the mobile phone and points to the left edge of the display screen of the mobile phone.

In still another possible implementation, the user operation may be an operation of switching an application currently started on the mobile phone to background. The operation may be a touchscreen gesture operation, or may be a mid-air gesture operation. For example, the touchscreen gesture operation may be a sliding operation on the display screen of the mobile phone, for example, a sliding operation starting from the lower edge of the display screen of the mobile phone and pointing to the upper edge of the display screen of the mobile phone. The mid-air gesture operation may be either of the static mid-air gesture operation or the dynamic mid-air gesture operation in the foregoing implementation.

In still another possible implementation, when the mobile phone displays the application window, if the mobile phone receives a notification message of another application, the user operation may be a selection operation on the notification message. The selection operation may be a touch-screen gesture operation, for example, a tap operation on the notification message.

In still another possible implementation, the application window may be displayed on the display screen of the mobile phone in a full-screen floating window (for example, a freeform window) form. When the mobile phone displays a full-screen floating window, for example, a freeform window, the user may perform a corresponding user operation, to trigger the mobile phone to display, in a live window form on the display screen of the mobile phone, a key element included in the application window in the freeform window. The user operation may include one or more operations. For example, the user operation (the user operation may be a first operation in this application) may include an operation of dragging the freeform window to a specified area. The operation may be a touchscreen gesture operation, or may be a mid-air gesture operation. It should be noted that the operation of dragging the freeform window to the specified area is similar to the foregoing operation of dragging the application window in the multi-task interface to the specified area, and details are not described herein again. In addition, an explanation of the specified area and an implementation of determining whether the freeform window is dragged to the specified area are similar to the explanation of the specified area and the description of determining whether the application window is dragged to the specified area in the foregoing embodiment, and details are not described herein again. Alternatively, the user operation may be an operation (for example, a tap operation) on a small-window button in the freeform window. The small-window button is configured to trigger display, in the live window form on the display screen of the mobile phone, of the key element included in the application window in the freeform window. For a specific implementation of triggering the mobile phone to display the application window in the freeform window form, refer to the implementation of the example shown in FIGS. 4(*a*) and (*b*).

It should be noted that the touchscreen gesture operation may be performed by the user by using a hand, or may be performed by using a stylus, which is not limited in this embodiment. In addition, the pressing described in this embodiment may also be described as pressing and holding, and refers to an operation that the user presses the screen by using a finger and does not lift the finger (or presses the screen by using a stylus and does not lift the stylus).

For example, with reference to FIG. 9(*a*) to FIG. 9(*c*), the application window is a window of an application 1, and the user operation in S701 includes an operation that triggers display of a multi-task interface and an operation of dragging the application window in the multi-task interface to a specified area. As shown in FIG. 9(*a*), an application window 901 of the application 1 is displayed on the display screen of the mobile phone. The application window 901 includes an information details page, and the information details page includes a video element 902. When the user wants to display, in the live window form, a key element in the application window 901, the user may perform an operation that triggers display of a multi-task interface, for example, perform a sliding operation starting from the lower edge of the display screen of the mobile phone and pointing to the upper edge of the display screen of the mobile phone with the finger temporarily not lifted after the sliding. As shown in FIG. 9(*b*), the mobile phone displays a multi-task interface 903 in response to the operation. The multi-task interface 903 includes application windows (or application window thumbnails) of all applications running on background in the mobile phone, for example, includes an application window thumbnail 904 of the application 1. Then, the user presses the application window thumbnail 904 and moves the finger, so that the application window thumbnail 904 may be dragged to a specified area on the display screen of the mobile phone. For example, a pressing point of the finger moves to an area ½ away from the upper edge of the display screen, and the finger continues to slide upward. For example, as shown in FIG. 9(*c*), the user may use the finger to perform a pressing operation on the application window thumbnail 904, and move the finger upward. As the user finger moves, the mobile phone may draw an animation in which the application window thumbnail 904 moves with the user finger, and display the animation on the display screen of the mobile phone. After the mobile phone determines that the application window thumbnail 904 is dragged to a specified area 905, it indicates that the user wants to use the live window function of the mobile phone, and the following S702 and S703 may be performed. Alternatively, as shown in FIG. 9(*b*), the mobile phone displays the multi-task interface 903. If an application window supports the live window function, the multi-task interface 903 may further include a small-window button corresponding to the application window. For example, the application window 901 of the application 1 supports live window function. Then, as shown in FIG. 9(*b*), the multi-task interface 903 further includes a button 906 corresponding to the application window thumbnail 904 of the application 1. If the mobile phone receives an operation, for example, a tap operation, performed by the user on the button 906, it indicates that the user wants to use the live window function of the mobile phone, and the following S702 and S703 may be performed.

Figure 10A:
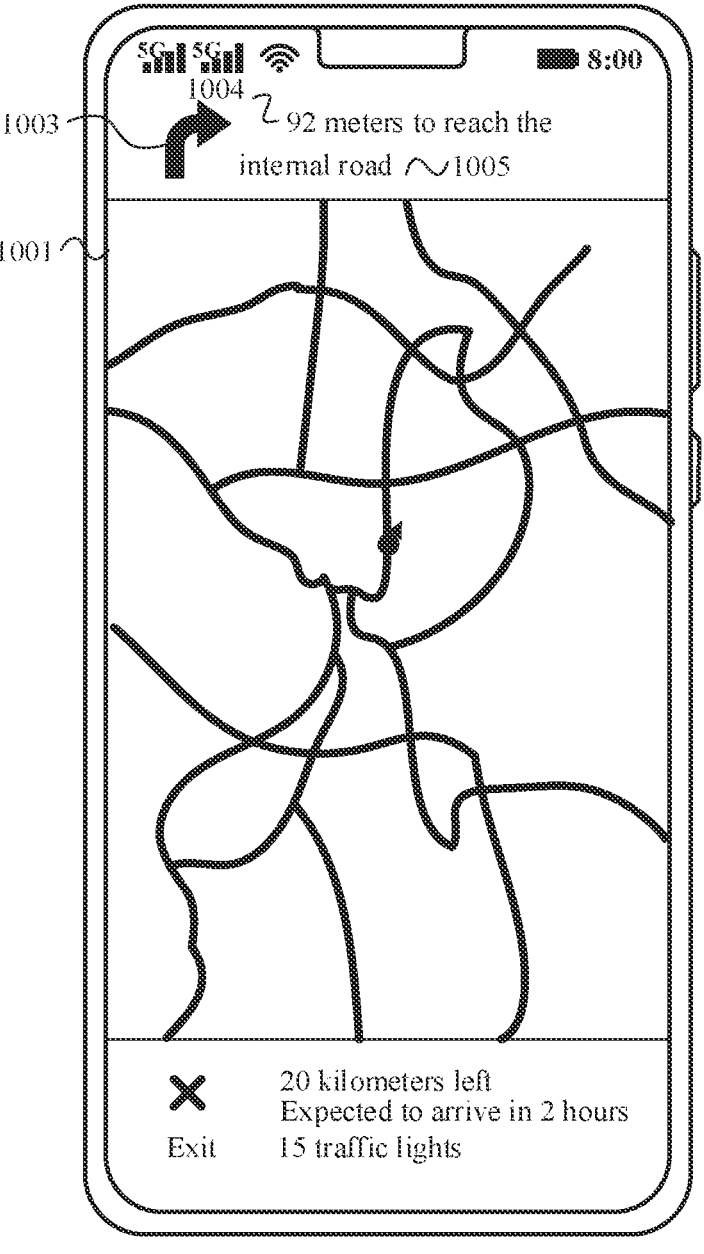
FIG. 10A(a) and FIG. 10A(b) are schematic diagrams of another display interface according to an embodiment of this application.
Figure 10A:
Figure 10A:
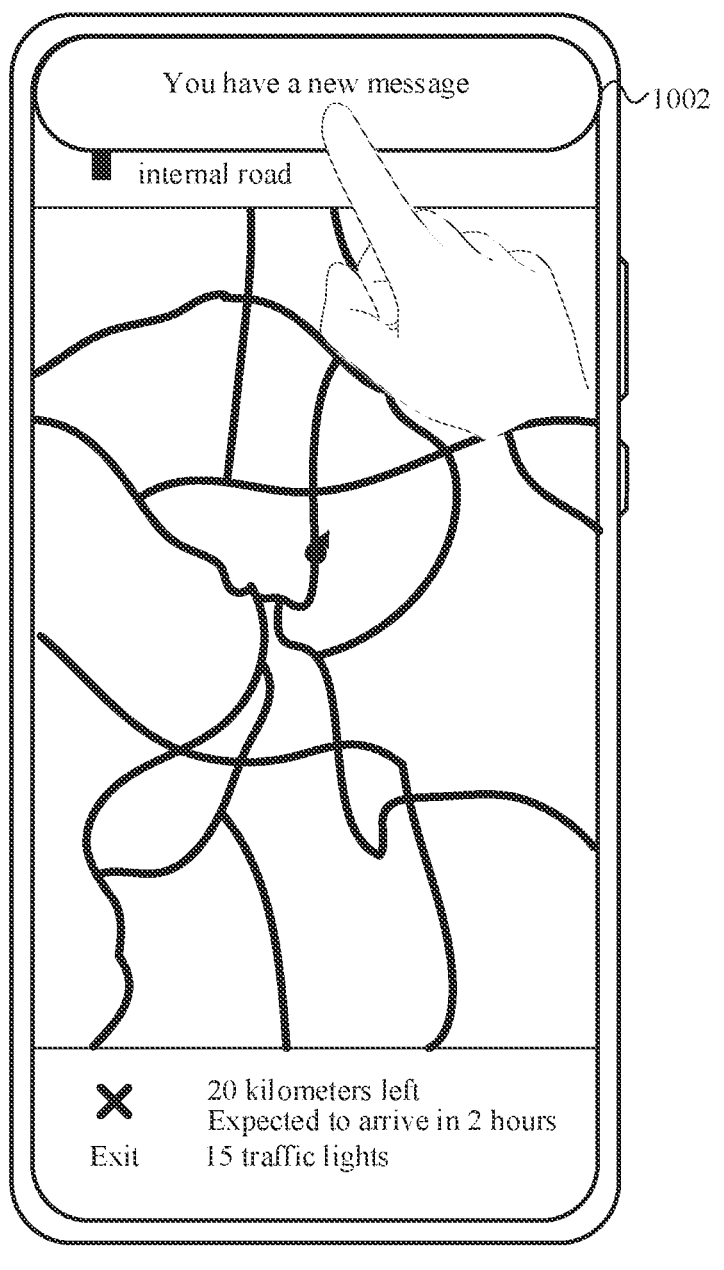
Figure 10B:
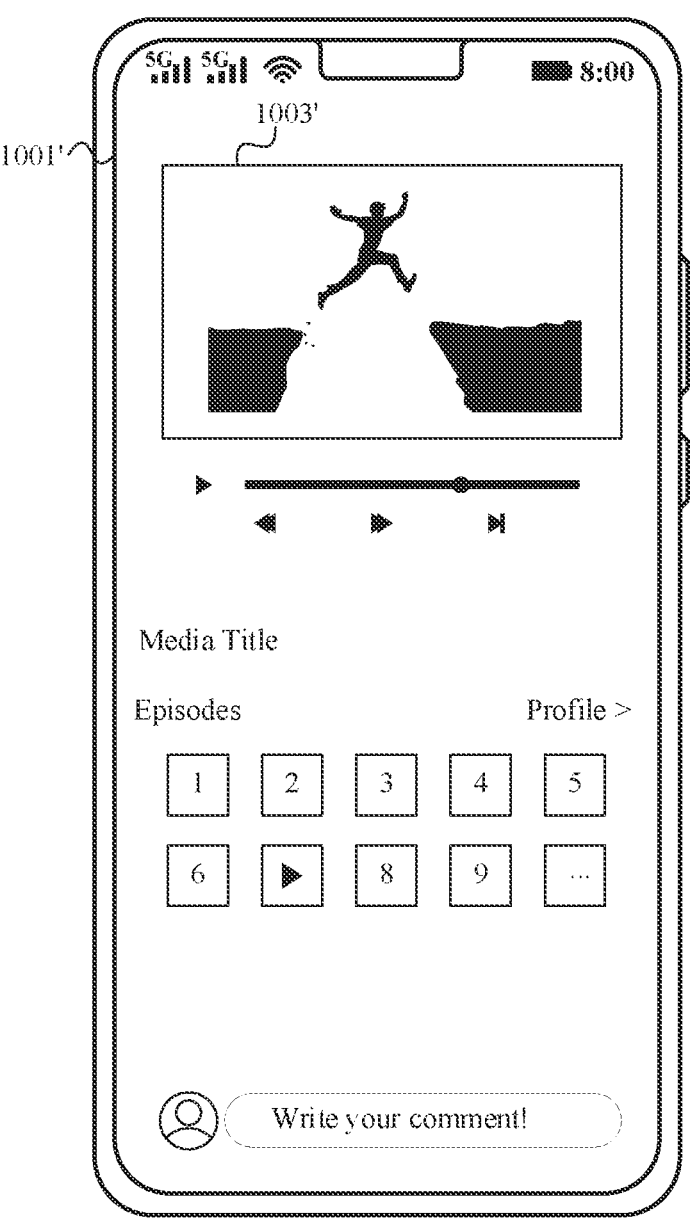
FIG. 10B(a) and FIG. 10B(b) are schematic diagrams of still another display interface according to an embodiment of this application.
Figure 10B:
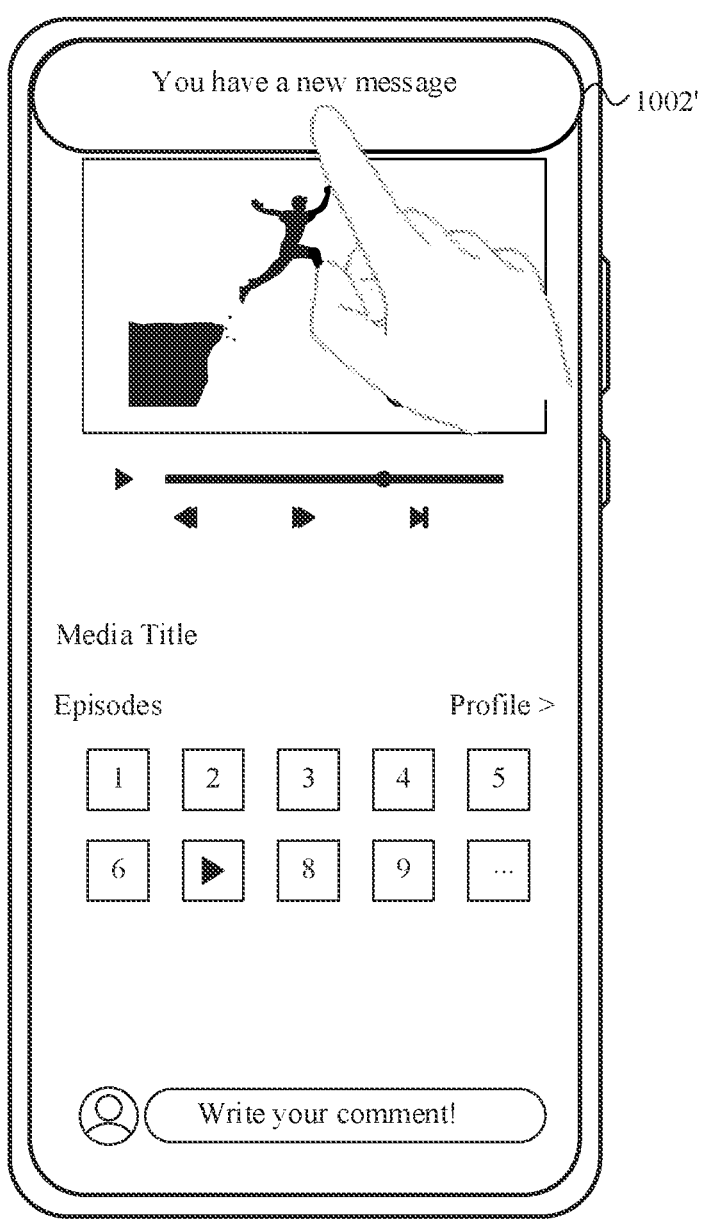

For another example, with reference to FIG. 10A(a) and FIG. 10A(b), the application window is an application window of a navigation application, and the user operation in S701 is a selection operation on a notification message. As shown in FIG. 10A(a), an application window 1001 of the navigation application is displayed on the display screen of the mobile phone. The application window 1001 includes a navigation details page. When the user uses the navigation application for navigation, the mobile phone receives a notification message. As shown in FIG. 10A(b), the mobile phone displays prompt information 1002 of the notification message. When the user wants to view the notification message, the user may perform a tap operation on the prompt information 1002. It may be understood that, after the user performs the tap operation on the prompt information 1002, the mobile phone displays a details interface corresponding to the prompt information 1002. Therefore, after receiving the tap operation, the mobile phone may further perform the following S702 and S703, to trigger the mobile phone to display, in the live window form on the display screen of the mobile phone, a key element of the navigation details page in the application window 1001 for the user to continue viewing. With reference to FIG. 10B(a) and FIG. 10B(b), for example, the application window is an application window of a video application, and the user operation in S701 is a selection operation on a notification message. As shown in FIG. 10B(a), an application window 1001' of the video application is displayed on the display screen of the mobile phone. The application window 1001' includes a video details page. The mobile phone receives a notification message. Then, as shown in FIG. 10B(b), the mobile phone displays prompt information 1002' of the notification message. When the user wants to view the notification message, the user may perform a tap operation on the prompt information 1002'. It may be understood that, after the user performs the tap operation on the prompt information 1002', the mobile phone displays a details interface corresponding to the prompt information 1002'. Therefore, after receiving the tap operation, the mobile phone may further perform the following S702 and S703, to trigger the mobile phone to display, in the live window form on the display screen of the mobile phone, a key element of the video details page in the application window 1001' for the user to continue viewing.

Figure 11:
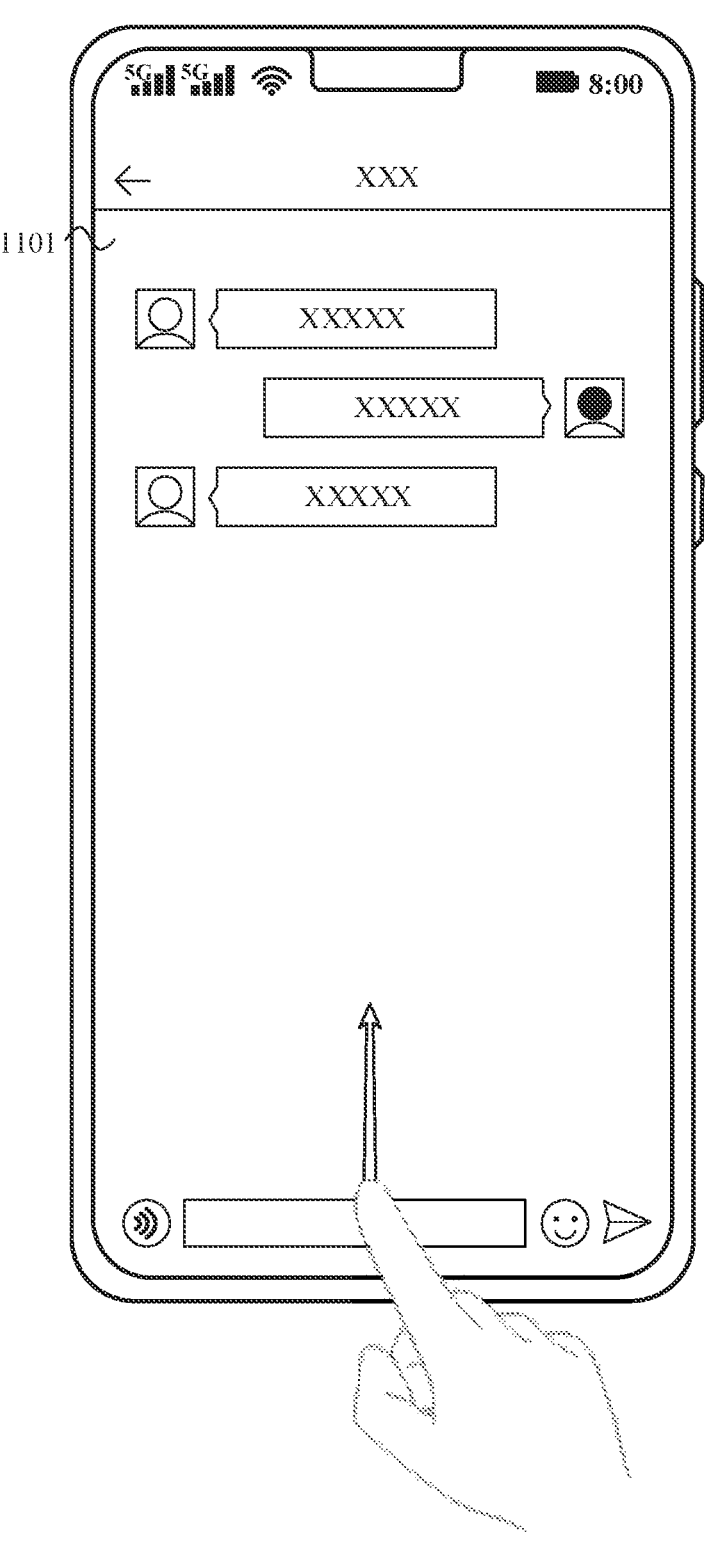
FIG. 11 is a schematic diagram of still another display interface according to an embodiment of this application.

For still another example, with reference to FIG. 11, the application window is an application window of an instant messaging application, and the user operation in S701 is an operation of switching the instant messaging application of the mobile phone to background. As shown in FIG. 11, an application window 1101 of the instant messaging application is displayed on the display screen of a mobile phone. The application window 1101 includes a chat details page. When the user wants to display, in the live window form, a key element in the application window 1101, the user may perform an operation of switching the instant messaging application to background, for example, perform a sliding operation starting from the lower edge of the display screen of the mobile phone and pointing to the upper edge of the display screen of the mobile phone. After receiving the operation, the mobile phone may perform the following S702 and S703.

S702: The mobile phone obtains small-window data in response to the user operation in S701.

After the mobile phone receives the user operation in S701, it indicates that the user wants to display, in the live window form, a key element of an interface in an application window currently displayed on the mobile phone. The mobile phone may obtain small-window data.

The small-window data may include an identifier of an application. The small-window data may further include an identifier of an interface in the application window, and/or an application interface in the application window, for example, may be a screenshot of the application window (or a screenshot of the application interface in the application window). The identifier of the application may be a package name of the application. The identifier of the interface may be an activity (Activity) name of the interface.

For example, the small-window data includes the package name of the application, the identifier of the interface in the application window, and the application interface in the application window. With reference to FIG. 6, after the user operation in S701 is received, the drag service module at the application layer of the mobile phone may obtain the small-window data. For example, the user operation is an operation that triggers display of a multi-task interface and an operation of dragging the application window in the multi-task interface to a specified area. After the mobile phone receives an operation of dragging the application window in the multi-task interface by the user, the mobile phone, for example, the launcher at the application layer of the mobile phone, may initiate a drag for the application window. When the application window is dragged, the launcher at the application layer of the mobile phone may perform drag listening. After determining that the application window is dragged to a specified area, the launcher at the application layer of the mobile phone may obtain the package name of the application and the identifier of the interface in the application window from an activity stack of the mobile phone, and find the application interface in the application window, for example, a screenshot of the application window, based on the package name of the application, to obtain the small-window data. Then, the launcher at the application layer of the mobile phone may send the obtained small-window data to the drag service module at the application layer of the mobile phone. Then, the drag service module at the application layer of the mobile phone may obtain the small-window data.

It should be noted that, a specific implementation of obtaining the small-window data by the mobile phone when the user operation in S701 is an operation that triggers the application window to be dragged up and an operation of dragging the dragged-up application window to a specified area, or the user operation is an operation of switching an application currently started on the mobile phone to background, or the user operation is a selection operation on a notification message is similar to the specific implementation of obtaining the small-window data by the mobile phone when the user operation is an operation that triggers display of a multi-task interface and an operation of dragging the application window in the multi-task interface to a specified area, and details are not described herein again. When the user operation is an operation of switching to another page in the application window or a sliding operation on a current page of the application window, a specific implementation of obtaining the small-window data by the mobile phone may be as follows: After the user operation is received, the application of the application window may obtain the small-window data, and then send the obtained small-window data to the drag service module at the application layer of the mobile phone.

In addition, in some embodiments, when the user operation in S701 includes a drag operation on the application window, an intent of dragging the application window by the user may be triggering live window generation, or may be triggering a cross-device drag. With reference to the foregoing description, it can be learned that the small-window data is reported by the launcher at the application layer of the mobile phone to the drag service module at the application layer, and processed by the drag service module. To enable the drag service module to distinguish whether the user operation is performed to trigger live window display or trigger a cross-device drag, the small-window data may further include an object type. The object type is different from an object type in data obtained by the drag service module during a cross-device drag, and the object type may be used to indicate to trigger live window display. For example, the object type may be live window (live window). In an example, to unify a structure of small-window data, in this embodiment, for the user operations in the implementations in S701, after the user wants to trigger live window display and performs a corresponding user operation, small-window data obtained by the drag service module at the application layer of the mobile phone may include the object type.

With further reference to FIG. 6, after obtaining the small-window data, the drag service module at the application layer of the mobile phone may determine whether the object type in the small-window data is live window, to determine whether to trigger live window display. After determining that the object type in the small-window data is live window, the drag service module at the application layer of the mobile phone may transmit the small-window data to the live window controller at the application layer of the mobile phone. In some other embodiments, alternatively, the software architecture shown in FIG. 6 may include no drag service module. In such embodiments, after the user operation in S701 is received, the launcher at the application layer of the mobile phone or the application may obtain the small-window data, and directly transmit the small-window data to the live window controller at the application layer of the mobile phone.

The foregoing embodiment is described by using an example in which the mobile phone obtains the small-window data after receiving the user operation in S701. In some other embodiments, after receiving the user operation in S701, the mobile phone may first determine whether the currently displayed application window supports live window display. If live window display is supported, S702 is performed. If live window display is not supported, the mobile phone may not perform S702, and the mobile phone may display prompt information to prompt the user that the application window does not support live window display.

In some implementations, a specific implementation of determining whether the application window supports live window display may be as follows: The mobile phone may store a trustlist. The trustlist includes an identifier of an application that supports live window display. After receiving the user operation in S701, the mobile phone may determine whether the identifier of the application corresponding to the application window is included in the trustlist. When the identifier of the application is included in the trustlist, the mobile phone may determine that the application window supports live window display. If the identifier of the application is not included in the trustlist, the mobile phone may determine that the application window does not support live window display. In some other implementations, a specific implementation of determining whether the application window supports live window display may be as follows: After receiving the user operation in S701, the mobile phone may determine whether the application interface in the application window includes a video component. If the application interface in the application window includes a video component, it may be determined that the application window supports live window display. If the application interface in the application window does not include a video component, it may be determined that the application window does not support live window display. In some other implementations, a specific implementation of determining whether the application window supports live window display may be as follows: The mobile phone prestores an application type that supports live window display. After receiving the user operation in S701, the mobile phone may determine whether a type of the application corresponding to the application window is an application type that supports live window display. When the type of the application is an application type that supports live window display, the mobile phone may determine that the application window supports live window display. If the type of the application is not an application type that supports live window display, the mobile phone may determine that the application window does not support live window display.

S703: The mobile phone displays a live window based on the small-window data.

After obtaining the small-window data, the mobile phone may display a live window on the display screen of the mobile phone based on the small-window data. The live window may include the following one or more types of elements: a presentation-type element and a manipulation-type element. The presentation-type element may include one or more of the following: a picture, a video, a text, an icon, and a banner (banner). The manipulation-type element may include one or more of the following: a button, a progress slider, and a toolbar. In other words, the live window may include one or more of the following elements:

a picture, a video, a text, an icon, a banner, a button, a progress slider, a toolbar, and the like.

For example, an element included in the live window may be some elements of the interface in the application window displayed on the mobile phone before the user operation in S701 is received. For ease of description, an element included in the live window may be referred to as a small-window element.

In an example, the mobile phone may extract, based on the identifier of the application included in the small-window data, a small-window element from the application window corresponding to the identifier. Alternatively, the mobile phone may extract a small-window element from the interface of the corresponding application window based on the identifier of the application and the identifier of the interface that are included in the small-window data. In embodiments of this application, a first identifier may be an identifier of an application, or the first identifier may include the identifier of the application and an identifier of an interface.

In a possible implementation, the small-window element may be predefined. In other words, which elements are small-window elements may be predefined. Small-window elements corresponding to different applications may be the same or may be different. Small-window elements corresponding to different interfaces of a same application may be the same or may be different.

For example, an application developer may predefine which elements in an application are small-window elements, and store a corresponding configuration file into the mobile phone. For example, small-window elements corresponding to different applications are different. An identifier of an application and a configuration file may be correspondingly stored in the mobile phone. The identifier of the application may be a package name of the application. As shown in Table 1, a configuration file 1 and a package name 1 of an application 1 are correspondingly stored, a configuration file 2 and a package name 2 of an application 2 are correspondingly stored, and so on.

TABLE 1

| Application identifier | Configuration file |
| --- | --- |
| Package name 1 | Configuration file 1 |
| Package name 2 | Configuration file 2 |
| . . . | . . . |

For another example, a developer may predefine which elements in different interfaces of an application are small-window elements, and configure a corresponding configuration file into the mobile phone. For example, small-window elements corresponding to different interfaces of a same application are different. An identifier of the application, an identifier of an interface, and a configuration file may be correspondingly stored in the mobile phone. The identifier of the application may be a package name of the application. The identifier of the interface may be an activity (Activity) name of the interface. As shown in Table 2, a configuration file a, a package name a of an application a, and an identifier of an interface 1 (for example, an activity name 1) are correspondingly stored. A configuration file b, the package name a of the application a, and an identifier of an interface 2 (for example, an activity name 2) are correspondingly stored. A configuration file c, a package name b of an application b, and an identifier of an interface 3 (for example, an activity name 3) are correspondingly stored. A configuration file d, the package name b of the application b, and an identifier of an interface 4 (for example, an activity name 4) are correspondingly stored. A configuration file e, the package name b of the application b, and an identifier of an interface 5 (for example, an activity name 5) are correspondingly stored, and so on.

TABLE 2

| Application identifier | Interface identifier | Configuration file |
|---|---|---|
| Package name a | Activity name 1 | Configuration file a |
| | Activity name 2 | Configuration file b |
| Package name b | Activity name 3 | Configuration file c |
| | Activity name 4 | Configuration file d |
| | Activity name 5 | Configuration file e |
| . . . | . . . | . . . |

The configuration file may include an identifier of an element that needs to be displayed in a live window. The identifier of the element may include one or more of an ID (for example, a view ID) of the element, a class name (for example, a view class) of the element, a sequence number (for example, a view index), and the like. In addition, it can be learned from the description of S702 that the small-window data includes an application identifier, and an application indicated by the application identifier corresponds to the application window displayed on the mobile phone before the user performs the user operation in S701. In this way, based on Table 1 (or Table 2), the mobile phone may first search for a corresponding configuration file based on the identifier of the application (or the identifier of the application and the identifier of the interface in the application window) included in the small-window data. Then, the mobile phone may extract a small-window element from the interface of the application window based on an identifier of an element included in the found configuration file.

For example, a configuration file and an identifier of an application are correspondingly stored in the mobile phone. With reference to the descriptions in FIG. 6 and S702, a specific implementation in which the mobile phone searches for a corresponding configuration file based on the identifier of the application included in the small-window data, and extracts a small-window element from the interface of the application window based on an identifier of an element in the configuration file may be as follows: After receiving the small-window data from the drag service module at the application layer of the mobile phone, the live window controller at the application layer of the mobile phone may find the corresponding configuration file based on the identifier of the application included in the small-window data. The live window controller of the mobile phone may further start a virtual display (VirtualDisplay, or referred to as a virtual screen). For example, the live window controller of the mobile phone sends a request for creating a VirtualDisplay to a display manager of the mobile phone. After creating the VirtualDisplay, the display manager of the mobile phone may return an identifier (identify, ID) of the created VirtualDisplay to the live window controller of the mobile phone. Then, the live window controller of the mobile phone may transmit the ID of the VirtualDisplay and the package name of the application in the small-window data to the window manager at the framework layer of the mobile phone. The window manager of the mobile phone may move, based on the ID of the VirtualDisplay and the package name of the application, the application window of the application indicated by the package name to the VirtualDisplay for drawing. For example, the window manager of the mobile phone may find, based on the package name, a stack identifier (stackId) of the application indicated by the package name, and then move, based on the stackId and the ID of the VirtualDisplay, a corresponding stack to the virtual display for drawing. Then, the live window controller of the mobile phone may extract, based on the identifier of the element included in the found configuration file, a small-window element from an application window drawn on the VirtualDisplay.

Figure 12:
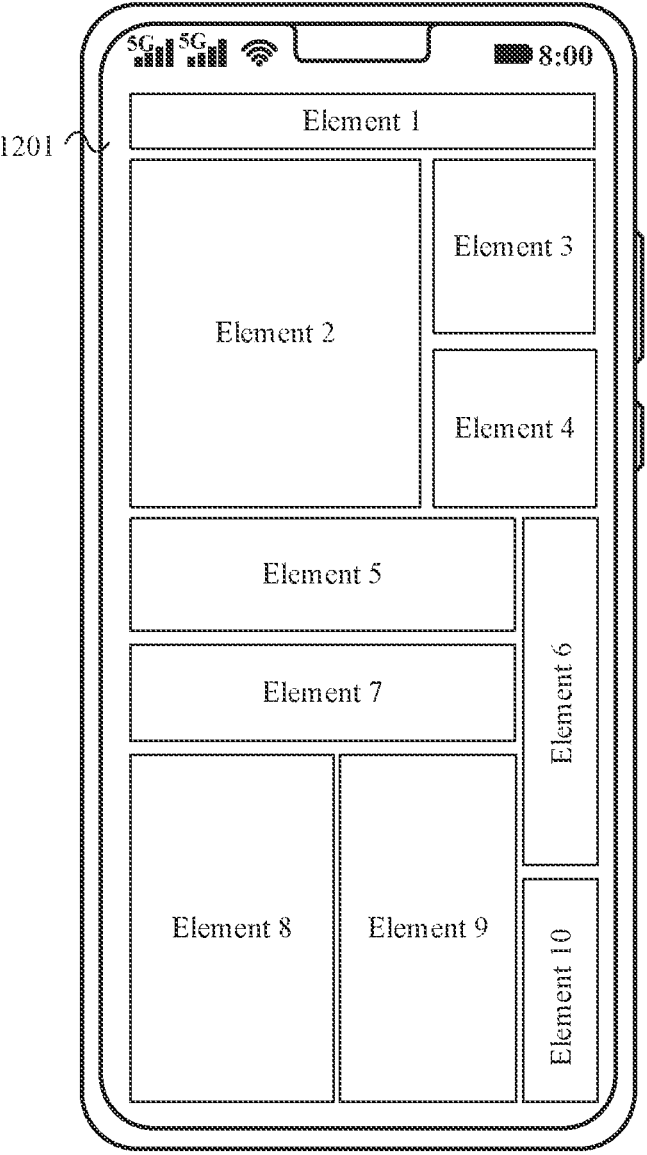
FIG. 12 is a schematic diagram of still another display interface according to an embodiment of this application.

For example, with reference to FIG. 12, the mobile phone displays an application window 1201 before the user performs the user operation in S701, an application developer predefines an element 3, an element 4, and an element 5 in the application window 1201 as small-window elements, and a corresponding configuration file is stored in the mobile phone. The small-window data includes a package name of an application corresponding to the application window 1201. After receiving the small-window data, the live window controller of the mobile phone may find the corresponding configuration file based on the package name of the application included in the small-window data. The configuration file includes an identifier of the element 3, an identifier of the element 4, and an identifier of the element 5. The live window controller of the mobile phone may further start a VirtualDisplay, and transmit an ID of the VirtualDisplay and the package name of the application in the small-window data to the window manager of the mobile phone. Based on the ID of the VirtualDisplay and the package name of the application, the window manager of the mobile phone may draw the application window 1201 on the VirtualDisplay. As drawn on the VirtualDisplay, the application window 1201 includes an element 1, an element 2 . . . , and an element 10. The live window controller of the mobile phone may extract, based on the identifier of the element 3, the identifier of the element 4, and the identifier of the element 5 that are included in the found configuration file, the element 3, the element 4, and the element 5 from the application window 1201 drawn on the VirtualDisplay. The extracted element 3, element 4, and element 5 are displayed in the live window form on the display screen of the mobile phone.

In another possible implementation, the small-window element may be recommended by the system. In other words, the system recommends which elements are small-window elements. Small-window elements corresponding to different types of applications may be the same or may be different. For example, small-window elements corresponding to different types of applications are different. Recommendation models corresponding to different types of applications may be prestored in the mobile phone. The application type may include one or more of the following types: a music type, a video type, a navigation type, an e-commerce type, an instant messaging (instant messaging, IM) type, and the like. As shown in Table 3, a recommendation model 1 corresponds to the music type, a recommendation model 2 corresponds to the video type, a recommendation model 3 corresponds to the navigation type, a recommendation model 4 corresponds to the e-commerce type, a recommendation model 5 corresponds to the instant messaging type, and so on.

TABLE 3

| Application type | Recommendation model |
|---|---|
| Music type | Recommendation model 1 |
| Video type | Recommendation model 2 |

TABLE 3-continued

| Application type | Recommendation model |
| --- | --- |
| Navigation type | Recommendation model 3 |
| E-commerce type | Recommendation model 4 |
| Instant messaging type | Recommendation model 5 |
| . . . | . . . |

Based on Table 3, the mobile phone may first determine a type of the application based on the identifier of the application included in the small-window data. Then, the mobile phone searches for a recommendation model corresponding to the type of the application. Then, the mobile phone may extract a small-window element from the interface of the application window based on the found recommendation model.

It may be understood that the mobile phone may extract one or more small-window elements from the interface of the application window based on the configuration file or the recommendation model. Then, the mobile phone may display the one or more extracted small-window elements in the live window form on the display screen of the mobile phone.

For example, the mobile phone may display each small-window element in the live window based on a preconfigured layout file. The layout file includes a configuration of a drawing area of each small-window element (for example, including configurations such as an identifier, a position, and a style of the element), and drawing areas of small-window elements do not overlap or partially overlap. In addition, the drawing area of each small-window element in the layout file may not correspond to an area of a corresponding small-window element in an original interface, that is, the small-window element may be re-laid by using the layout file.

The layout file may be defined by an application developer, that is, a layout of a small-window element is customized by an application developer. Corresponding to the foregoing description of extracting a small-window element, when small-window elements corresponding to different applications are the same, layout files corresponding to the different applications may be the same or may be different. When small-window elements corresponding to different applications are different, layout files corresponding to the different applications are different. When different applications correspond to different layout files, an identifier (for example, a package name) of an application and a layout file may be correspondingly stored in the mobile phone. When different interfaces of a same application correspond to different small-window elements, different interfaces may also correspond to different layout files. When different interfaces of a same application correspond to different layout files, an identifier of the application, an identifier of an interface, and a layout file may be correspondingly stored in the mobile phone.

Alternatively, the layout file may not need to be defined by an application developer, and is defined by a system developer. That is, a layout of a small-window element is recommended by the system. Corresponding to the foregoing description of extracting a small-window element, when small-window elements corresponding to different types of applications are the same, layout files corresponding to different application types may be the same or may be different. When small-window elements corresponding to different types of applications are different, layout files corresponding to different application types are different.

When different types of applications correspond to different layout files, an application type and a layout file may be correspondingly stored in the mobile phone.

Figure 13:
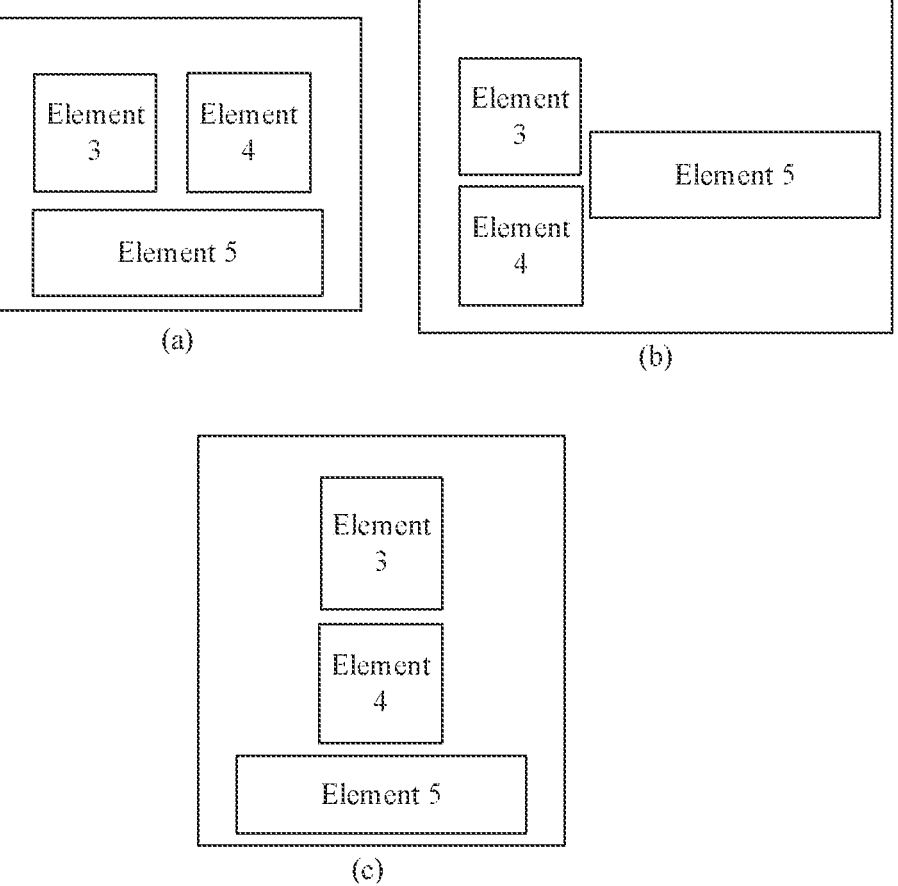
FIG. 13 is a schematic diagram of a live window according to an embodiment of this application.

Based on the foregoing description, the mobile phone may obtain a corresponding layout file based on the identifier of the application corresponding to the application window (or the identifier of the application and the identifier of the interface, or the type of the application), to lay the extracted small-window element in the live window. For example, a layout file and an identifier of an application are correspondingly stored in the mobile phone. With reference to FIG. 6 and the foregoing description of extracting a small-window element, the live window controller at the application layer of the mobile phone may search for a corresponding layout file based on the identifier of the application in the small-window data, and lay the extracted small-window element based on the found layout file. For example, with reference to the example shown in FIG. 12, a result obtained after the live window controller of the mobile phone re-lays the extracted element 3, element 4, and element 5 based on the found layout file may be shown in (a) in FIG. 13.

It should be noted that, in this embodiment, there may be one or more layout files corresponding to a same application (or a same interface of an application, or a same type of applications), which is not specifically limited in this embodiment. For example, different applications correspond to different layout files. It may be understood that, display effects obtained after the mobile phone re-lays a same small-window element based on different layout files are different. For example, with reference to FIG. 12 and FIG. 13, the application corresponds to three layout files. In this case, after the mobile phone extracts the element 3, the element 4, and the element 5, results obtained after a re-layout is performed by using the three different layout files may be respectively shown in (a) in FIG. 13, (b) in FIG. 13, and (c) in FIG. 13. When a same application (or a same interface of an application, or a same type of applications) corresponds to a plurality of layout files, the mobile phone may select any layout file from the plurality of layout files, to re-lay an extracted small-window element. Alternatively, a system developer may provide a plurality of layout files, and an application developer selects a layout file from the plurality of layout files. In this way, the mobile phone may select the corresponding layout file from the plurality of layout files as specified by the application developer, to re-lay an extracted small-window element. In addition, in this embodiment, the mobile phone may re-lay the extracted small-window element based on the layout file by invoking a layout capability provided by the system. For example, the system may provide one or more layout capabilities such as a secondary layout capability (which may also be referred to as a RIO capability), a DUP capability, and a recommended layout capability. After extracting the small-window element, the mobile phone may invoke, based on the corresponding layout file, a layout capability provided by the system, to re-lay the small-window element. The DUP capability may also be used to extract a small-window element. For example, the mobile phone may invoke the DUP capability of the system based on a corresponding configuration file (which may be referred to as a DUP configuration file) to extract a small-window element. Similarly, there may also be one or more configuration files (or recommendation models) corresponding to a same application (or a same interface of an application, or a same type of applications). For a same application (or a same interface of an application, or a same type of applications), small-window elements extracted by the mobile phone based on different configuration files (or recommendation models) are different. When a same application (or a same interface of an application, or a same type of applications) corresponds to a plurality of configuration files (or recommendation models), the mobile phone may select any one of the plurality of configuration files (or recommendation models), to extract a small-window element. Alternatively, a system developer may provide a plurality of configuration files (or recommendation models), and an application developer selects a configuration file (or recommendation model) from the plurality of configuration files (or recommendation models), to extract a small-window element.

It should be noted that, for any application, when the small-window element in the live window includes only one or more predetermined elements, for example, the small-window element includes only a video element, in this embodiment, the configuration file/recommendation model may be not stored (or not required), and the layout file may be not stored. In this case, after obtaining the small-window data, the mobile phone may directly identify the predetermined element, for example, the video element, in the application window, and then perform a re-layout in a default layout manner. That is, the small-window element is predetermined, and the layout is also predetermined.

After the obtained small-window element is re-laid, the mobile phone may display the re-laid small-window element in the live window form on the display screen of the mobile phone.

As described in the foregoing embodiment, the live window is a small window displayed on the display screen in a floating manner. It may be understood that the display screen of the mobile phone may be horizontally or vertically divided into a plurality of grids, for example, 4 grids, 8 grids, or 12 grids. In this embodiment, a size of a small window, or referred to as a live window, may be set based on grids obtained by dividing the display screen of the mobile phone. For example, a system developer or an application developer may set the size of the live window based on grids.

Figure 14:
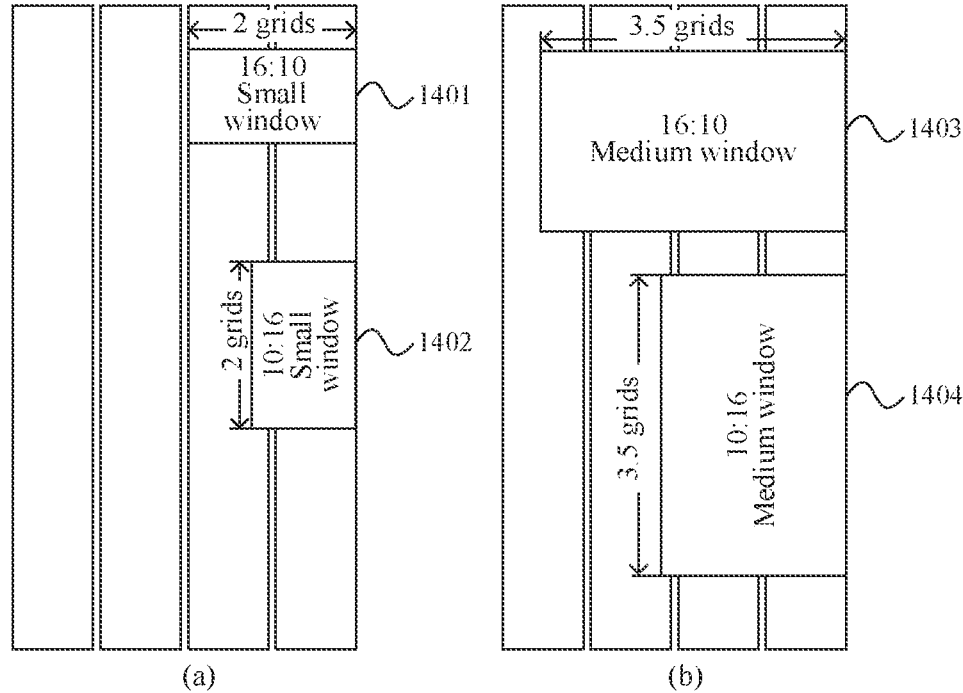
FIG. 14 is a schematic diagram of live window display according to an embodiment of this application.
Figure 15:
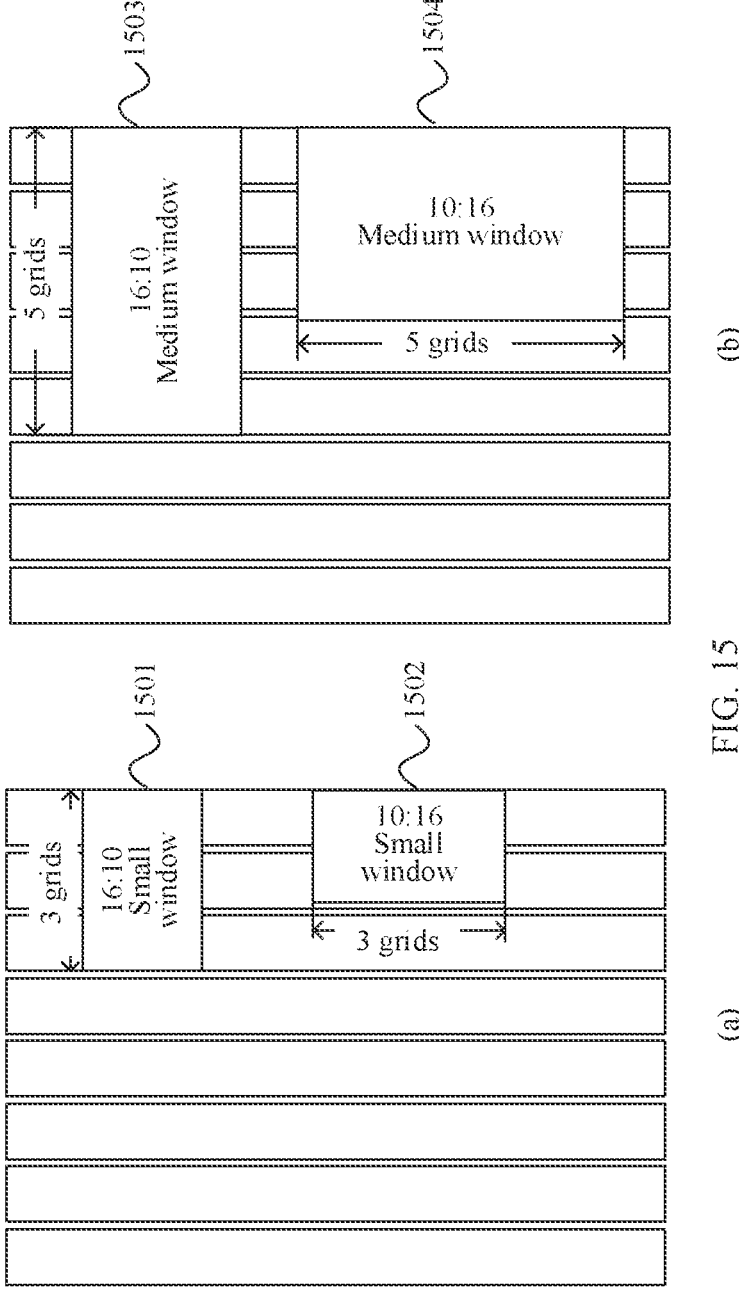
FIG. 15 is another schematic diagram of live window display according to an embodiment of this application.
Figure 16:
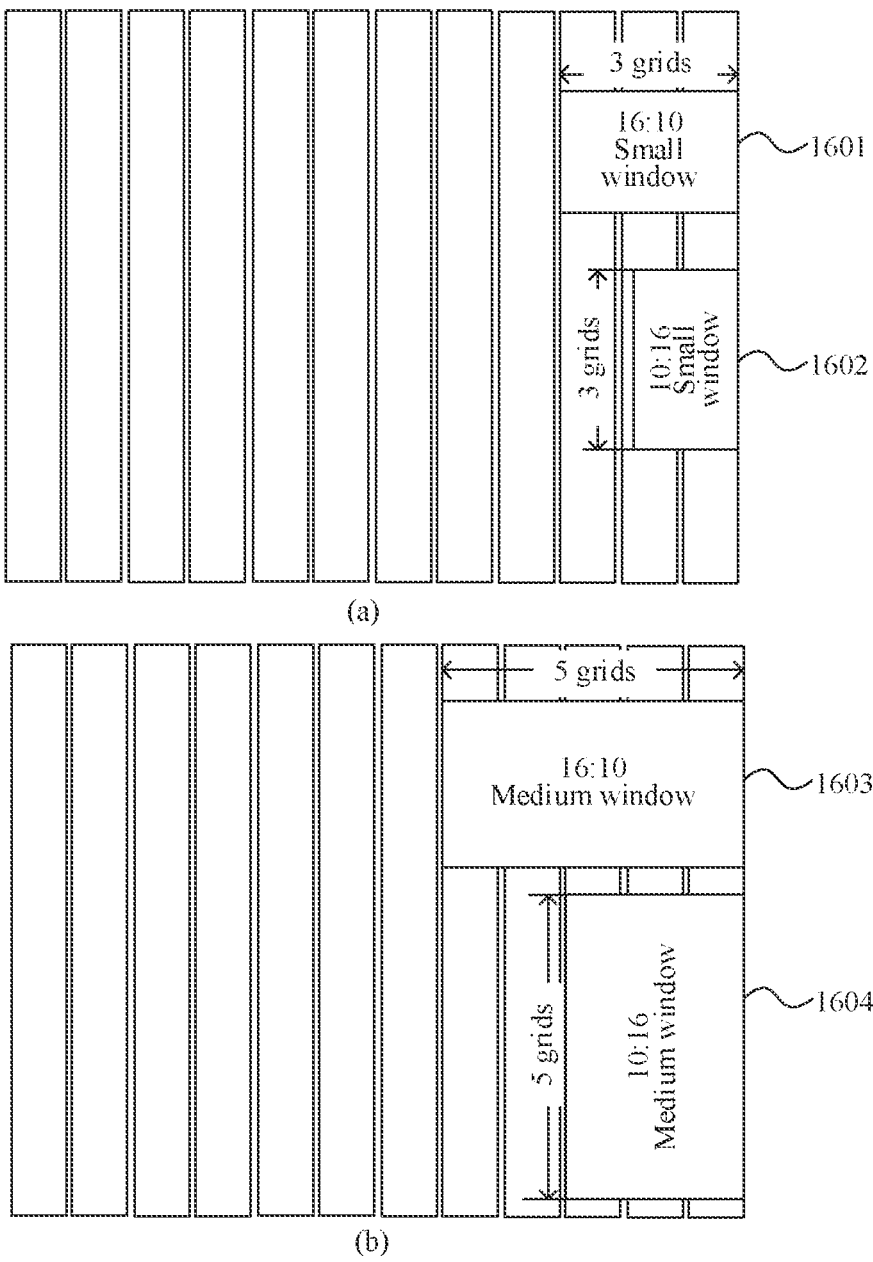
FIG. 16 is still another schematic diagram of live window display according to an embodiment of this application.

For example, with reference to FIG. 14 to FIG. 16, an example in which an aspect ratio of a horizontal live window is 16:10 and an aspect ratio of a vertical live window is 10:16 is used to show display effects of the horizontal live window and the vertical live window when the display screen of the mobile phone is vertically divided into 4 grids, 8 grids, and 12 grids, respectively.

With reference to FIG. 14, as shown in (a) in FIG. 14, for the horizontal live window, a system developer or an application developer may set a width of the live window to 2 grids. Based on the aspect ratio 16:10 of the horizontal live window, the mobile phone may display, on the display screen of the mobile phone, a live window 1401 with a width of 2 grids based on the 4 grids obtained by dividing the display screen of the mobile phone. For the vertical live window, a system developer or an application developer may set a height of the live window to 2 grids. Based on the aspect ratio 10:16 of the vertical live window, the mobile phone may display, on the display screen of the mobile phone, a live window 1402 with a height of 2 grids based on the 4 grids obtained by dividing the display screen of the mobile phone.

Similarly, with reference to FIG. 15, as shown in (a) in FIG. 15, for the horizontal live window, a system developer or an application developer may set a width of the live window to 3 grids. Based on the aspect ratio 16:10 of the horizontal live window, the mobile phone may display, on the display screen of the mobile phone, a live window 1501 with a width of 3 grids based on the 8 grids obtained by dividing the display screen of the mobile phone. For the vertical live window, a system developer or an application developer may set a height of the live window to 3 grids. Based on the aspect ratio 10:16 of the vertical live window, the mobile phone may display, on the display screen of the mobile phone, a live window 1502 with a height of 3 grids based on the 8 grids obtained by dividing the display screen of the mobile phone.

With reference to FIG. 16, as shown in (a) in FIG. 16, for the horizontal live window, a system developer or an application developer may set a width of the live window to 3 grids. Based on the aspect ratio 16:10 of the horizontal live window, the mobile phone may display, on the display screen of the mobile phone live window 1601 with a width of 3 grids based on the 12 grids obtained by dividing the display screen of the mobile phone. For the vertical live window, a system developer or an application developer may set a height of the live window to 3 grids. Based on the aspect ratio 10:16 of the vertical live window, the mobile phone may display, on the display screen of the mobile phone, a live window 1602 with a height of 3 grids based on the 12 grids obtained by dividing the display screen of the mobile phone.

Figure 17:
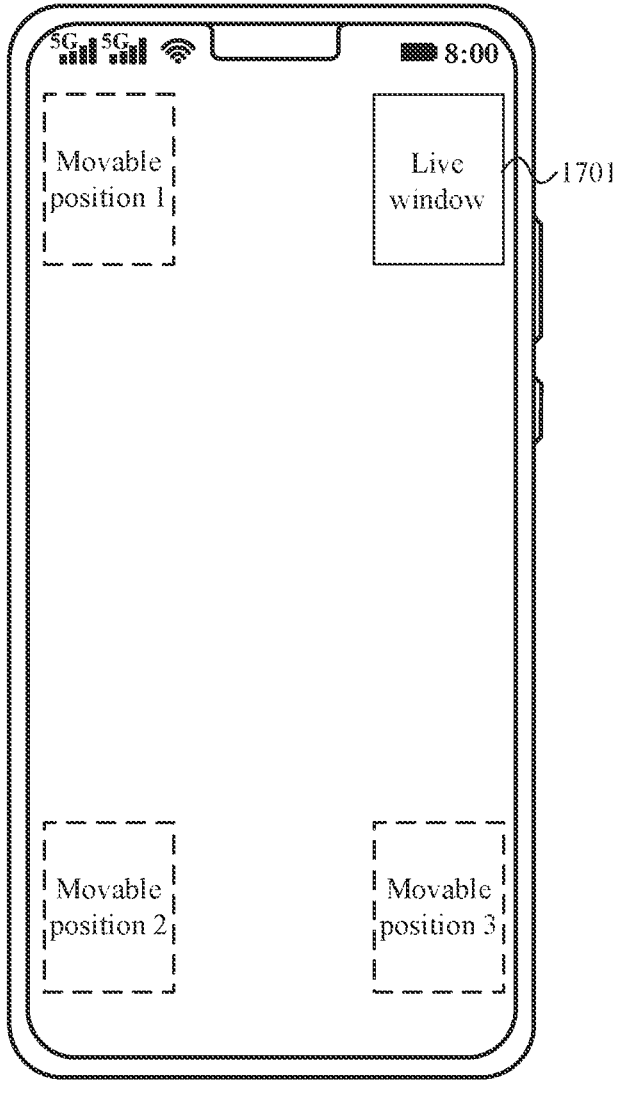
FIG. 17 is still another schematic diagram of live window display according to an embodiment of this application.

In addition, in this embodiment, a display position of the live window on the display screen may be any position on the display screen. In an example, the display position of the live window may be predefined (or set by the system). For example, as shown in FIG. 17, the display position of the live window may be predefined to be a position that is a predetermined distance 1 away from the right edge of the display screen and a predetermined distance 2 away from the upper edge of the display screen. The predetermined distance 1 and the predetermined distance 2 may be predefined. For example, the predetermined distance 1 is one $N^{th}$ of a width of the display screen of the mobile phone, and the predetermined distance 2 is one $M^{th}$ of a length of the display screen of the mobile phone. In this way, the mobile phone may display a live window 1701 on the display screen of the mobile phone based on the predefined display position and size. For example, a display effect is shown in FIG. 17. That is, the live window 1701 may be automatically attached to an edge of the display screen of the mobile phone.

In the foregoing description, for the horizontal live window and the vertical live window, the mobile phone may automatically recommend, based on a size of an area constituted by all small-window elements after the layout is completed, whether to display a horizontal live window or a vertical live window. For example, if the size (for example, an aspect ratio) of the area constituted by all the small-window elements after the layout is completed is greater than or equal to 1:1, the mobile phone may recommend a horizontal live window to display the re-laid small-window elements. If the size (for example, an aspect ratio) of the area constituted by all the small-window elements after the layout is completed is less than 1:1, the mobile phone may recommend a vertical live window to display the re-laid small-window elements. For example, the small-window element includes only a video element. If a size (for example, an aspect ratio) of the video element is greater than or equal to 1:1, the mobile phone may recommend a horizontal live window to display the video element. If a size (for example, an aspect ratio) of the video element is less than 1:1, the mobile phone may recommend a vertical live window to display the video element. In addition, for a scenario in which the small-window element is a video element, considering that most sizes of videos in video elements are 16:9 or 16:10, while there are some videos of other sizes, to keep a uniform size of the live window, a video may be partially cropped, to ensure that no black border exists in a video played in the live window. For example, when a size (for example, an aspect ratio) of the video is greater than or equal to 1:1 and is less than or equal to 16:10, a width of the video may be consistent with a width of the live window, and upper and lower parts of the video are cropped. When a size (for example, an aspect ratio) of the video is greater than 16:10, a height of the video may be consistent with a height of the live window, and left and right parts of the video are cropped. When a size (for example, an aspect ratio) of the video is greater than or equal to 10:16 and is less than 1:1, a height of the video may be consistent with a height of the live window, and left and right parts of the video are cropped. When a size (for example, an aspect ratio) of the video is less than 10:16, a width of the video may be consistent with a width of the live window, and upper and lower parts of the video are cropped.

It should be noted that, in the foregoing example, the horizontal live window may be a live window whose width has a larger value than a height, and the vertical live window may be a live window whose width has a smaller value than a height. In addition, in this embodiment, the foregoing description is provided by using an example in which the aspect ratio of the horizontal live window is 16:10. The aspect ratio of the horizontal live window may alternatively be another ratio, for example, 16:9 or 4:3. Similarly, the aspect ratio of the vertical live window may alternatively be another ratio, for example, 9:16 or 3:4. In this embodiment, aspect ratios of the horizontal live window and the vertical live window are not specifically limited.

The following describes S702 and S703 with reference to FIG. 6 and the examples shown in FIG. 9(a) to FIG. 11.

Figure 9A:
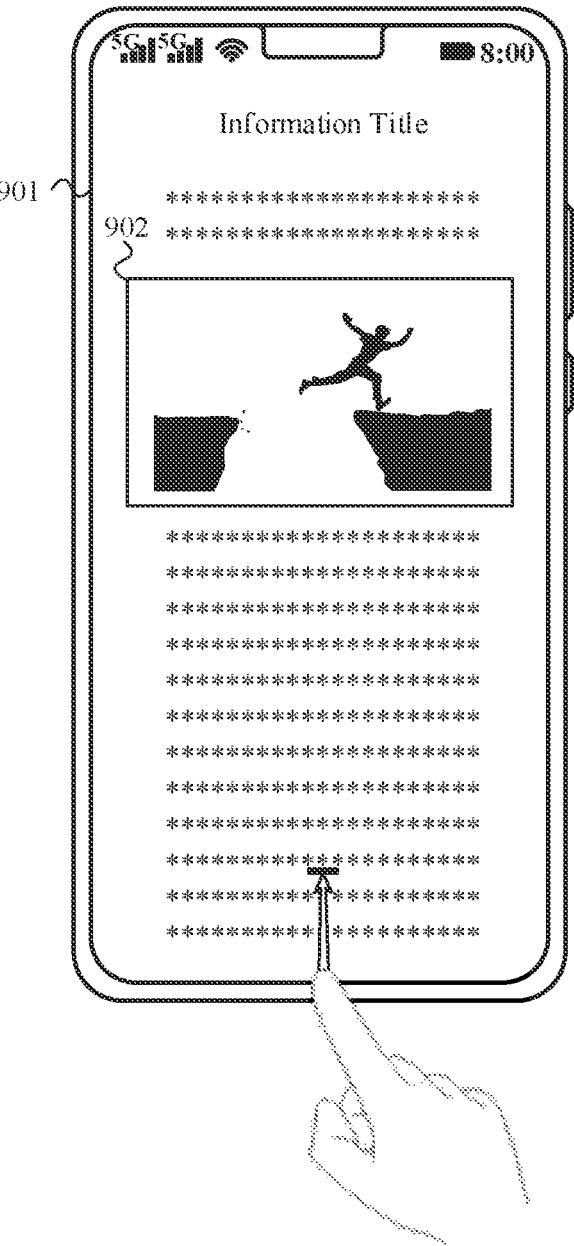
FIG. 9(a) to FIG. 9(c) are schematic diagram of a display interface according to an embodiment of this application.
Figure 9B:
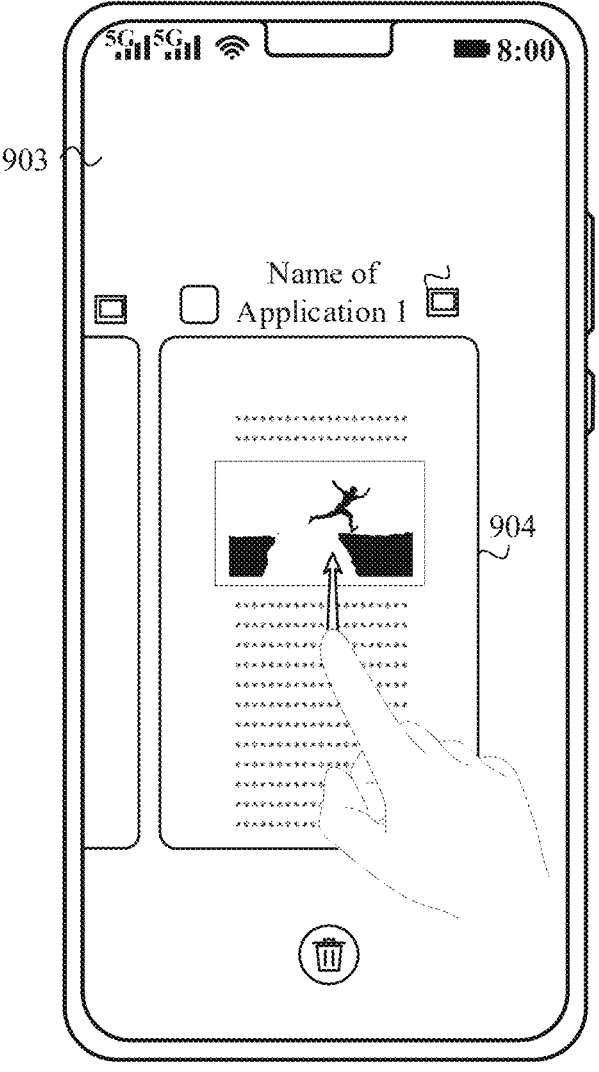
Figure 9C:
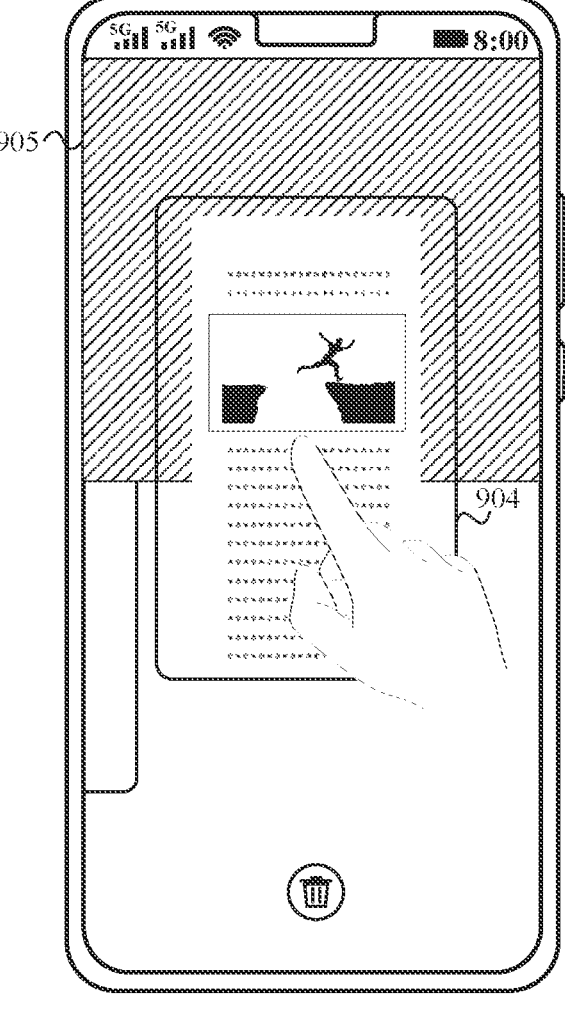
Figure 18:
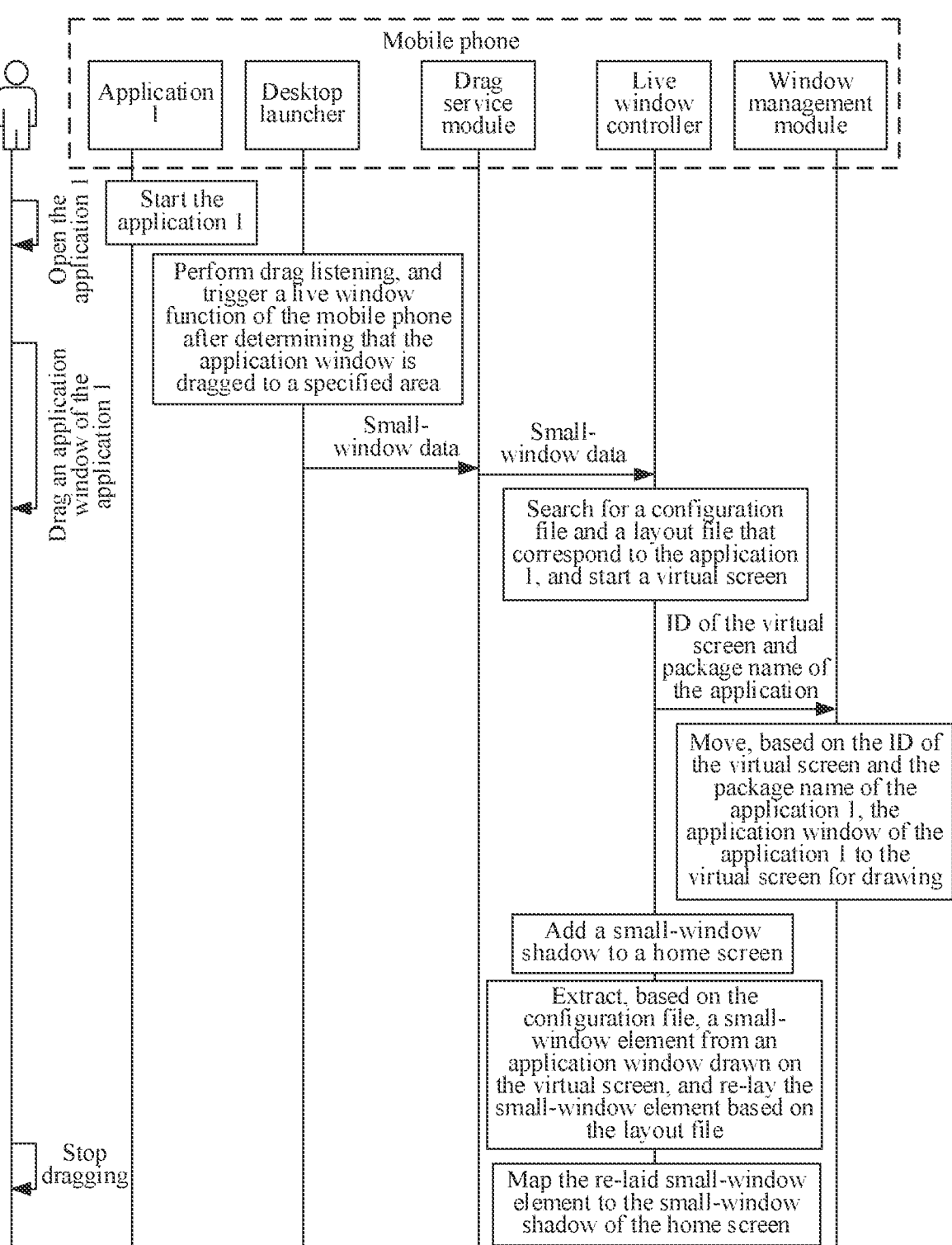
FIG. 18 is a schematic flowchart of another window display method according to an embodiment of this application.

For example, with reference to FIG. 6 and the example shown in FIG. 9(a) to FIG. 9(c), a developer of the application 1 predefines a video element in the application 1 as a small-window element, a corresponding configuration file and a package name of the application 1 are correspondingly stored in the mobile phone, a configuration of a drawing area of the video element is predefined, and a corresponding layout file is also stored together with the package name of the application 1 in the mobile phone. As shown in FIG. 18, after the user opens the application 1, the mobile phone may start the application 1, and display the application window of the application 1 on the display screen. The user drags the application window of the application 1. For example, as shown in FIG. 9(a) to FIG. 9(c), the user presses the application window thumbnail 904 of the application 1 in the multi-task interface and moves the finger, to trigger a small-window drag service. When the application window is dragged, the launcher at the application layer of the mobile phone may perform drag listening, to determine whether the application window is dragged to a specified area. After it is determined that the application window is dragged to the specified area, the live window function of the mobile phone may be triggered, that is, the following process is performed:

The launcher of the mobile phone obtains small-window data, and sends the small-window data to the drag service module at the application layer of the mobile phone. For example, the launcher adds the small-window data to a DragEvent (DragEvent) and sends the drag event to the drag service module. The small-window data includes an identifier (for example, the package name) of the application 1, an object type (specifically, live window), and an application interface (for example, may be the application window thumbnail 904 in FIG. 9(b)) in the application window.

The drag service module of the mobile phone may determine, based on the object type (live window) in the small-window data, that the user operation of dragging the application window is performed to trigger live window display. Then, the drag service module of the mobile phone may send the small-window data to the live window controller at the application layer of the mobile phone, so that the live window controller performs processing logic of a live window service.

For example, the live window controller of the mobile phone may search, based on the package name of the application 1 included in the small-window data, for the configuration file corresponding to the application 1. The configuration file includes an identifier of an element that is in the application 1 and that needs to be displayed in a live window, for example, includes an identifier of a video element. The live window controller of the mobile phone may further search, based on the package name of the application 1 included in the small-window data, for the layout file corresponding to the application 1. The layout file includes configurations such as the identifier and a position of the video element.

The live window controller of the mobile phone may further start a virtual screen, and transmit an ID of the virtual screen and the package name of the application 1 in the small-window data to the window manager at the framework layer of the mobile phone. The window manager of the mobile phone may move, based on the ID of the virtual screen and the package name of the application 1, the application window of the application 1 indicated by the package name 1 to the virtual screen for drawing. The live window controller of the mobile phone may further generate a small-window shadow (shadow), and add the shadow to a home screen of the mobile phone. The shadow is generated based on the application interface, for example, the application window thumbnail 904 in FIG. 9(b), in the small-window data.

Then, the live window controller of the mobile phone may extract, based on the identifier of the video element included in the found configuration file, a small-window element from an application window drawn on the virtual screen. For example, the small-window element is the video element 902 in FIG. 9(a). For example, the live window controller of the mobile phone may determine a layer name (layer name) and a display name (display name) of the video element 902 in the application window based on the identifier of the video element, and extract, based on the layer name and the display name, the video element 902 from the application window drawn on the virtual screen. After extracting the small-window element, for example, the video element 902, the live window controller of the mobile phone may re-lay the extracted small-window element based on the found layout file.

Figure 19A:
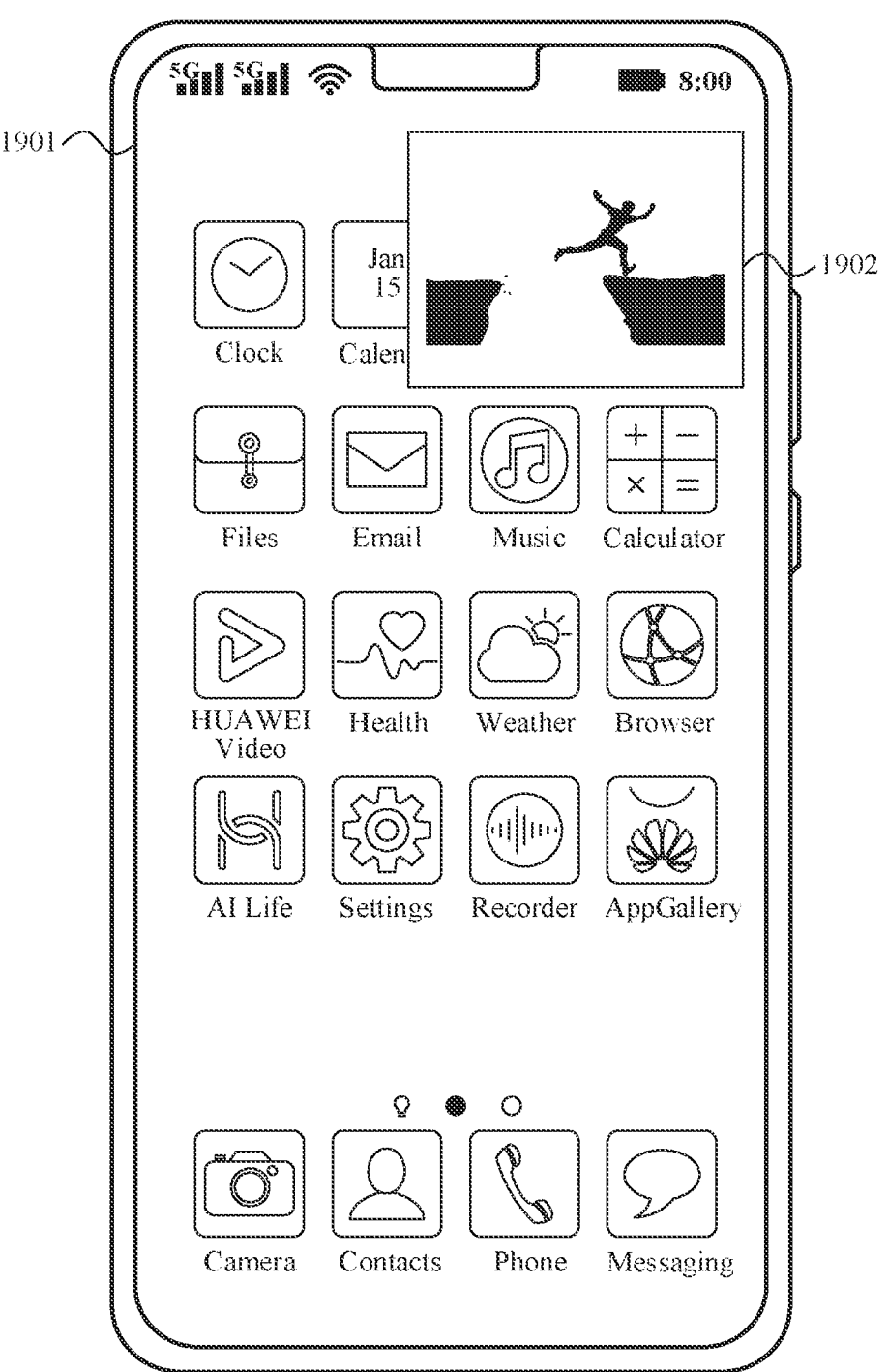
FIG. 19(a) and FIG. 19(b) are schematic diagrams of still another display interface according to an embodiment of this application.

After the layout is completed, the live window controller of the mobile phone maps the re-laid small-window element to the shadow of the home screen. In this way, after the user stops dragging the application window, for example, releases the finger in the example shown in FIG. 9(c) as shown in FIG. 19(a), the mobile phone may display a desktop 1901, and display a live window 1902 on the desktop 1901. For example, the live window 1902 includes a video element. In the video element, the video in the video element 902 shown in FIG. 9(a) may continue to be played for the user to continue watching. Then, when the user switches between sub-screens on the desktop, or opens another application in the mobile phone, the live window 1902 may continue to be displayed on the display screen of the mobile phone in a floating manner. The sub-screens refer to pages into which the desktop is divided.

Figure 19B:
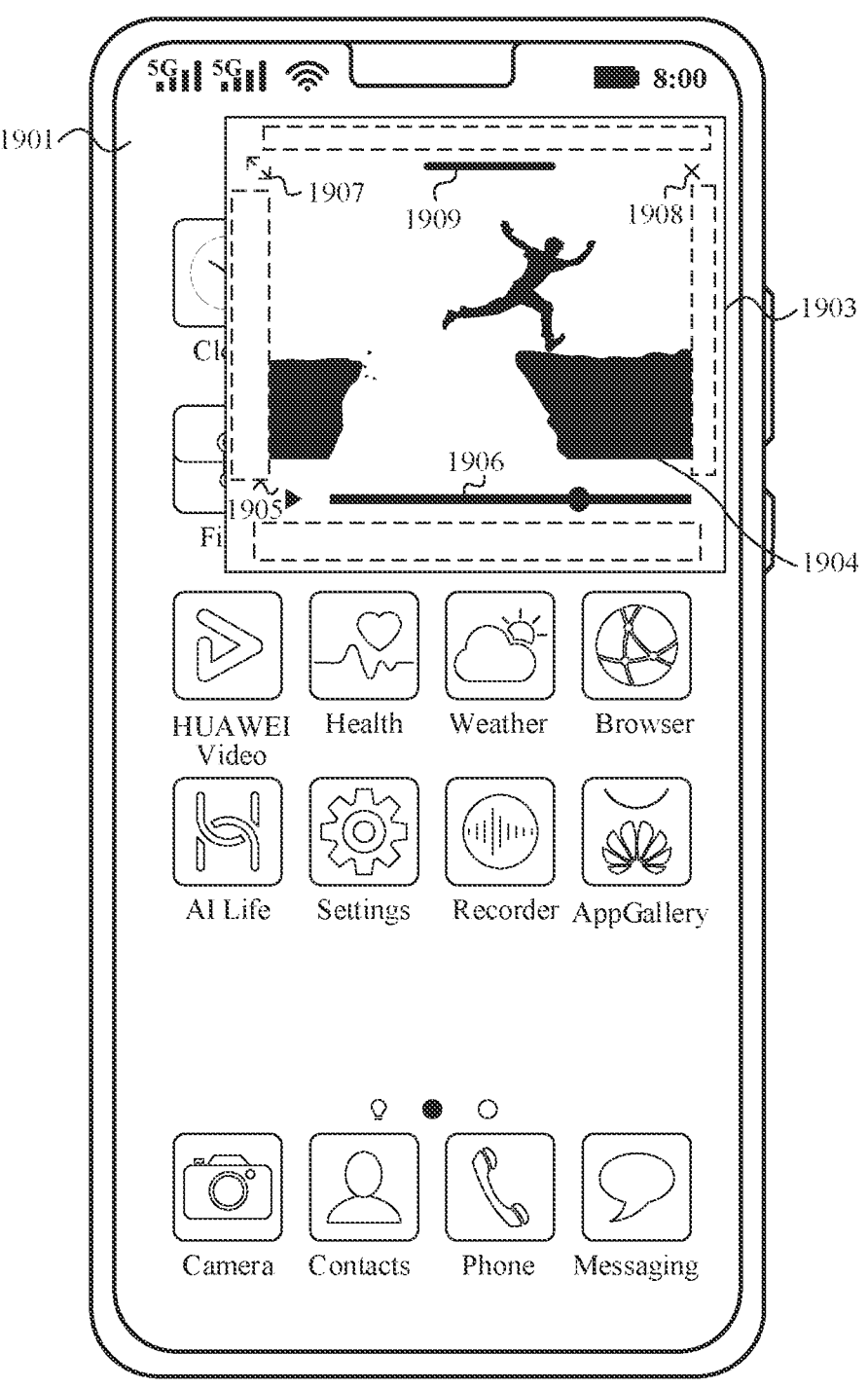

It should be noted that the examples shown in FIG. 9(a) to FIG. 9(c). FIG. 18, and FIG. 19(a) and FIG. 19(b) are described by using an example in which the video on the information details page is displayed in the live window form on the display screen of the mobile phone. It may be understood that the information details page is a hypertext markup language (hypertext markup language, HTML) web page. That is, for a video in an HTML web page (for example, information in a WeChat® official account or information in Toutiao®), the user may perform the user operation in S701, to trigger the mobile phone to display the video in the live window form. In other words, a video source in a live window is an HTML web page. In this embodiment, the video source in the live window may alternatively be another source, for example, a surfaceView (surfaceView), such as surfaceView in a third-party application such as Youku®, Tencent®, or iQIYI® (such as the example shown in FIG. 10B(a) and FIG. 10B(b)), for another example, a textureView (textureView), such as textureView in a third-party application such as Weibo® or TikTok®. That is, for any interface including a video element (such as surfaceView and textureView), provided that the user performs an operation that triggers live window display, the video element may be extracted from a corresponding interface by using the method in this embodiment, to continue to play, in a live window, a video in the video element. A specific implementation thereof is similar to the implementation in the example shown in FIG. 18, and details are not described herein again. In the embodiment shown in FIG. 18, a small-window element may be recommended by the system, and a layout of the small-window element may also be recommended by the system. This is not specifically limited in this embodiment.

Figure 20A:
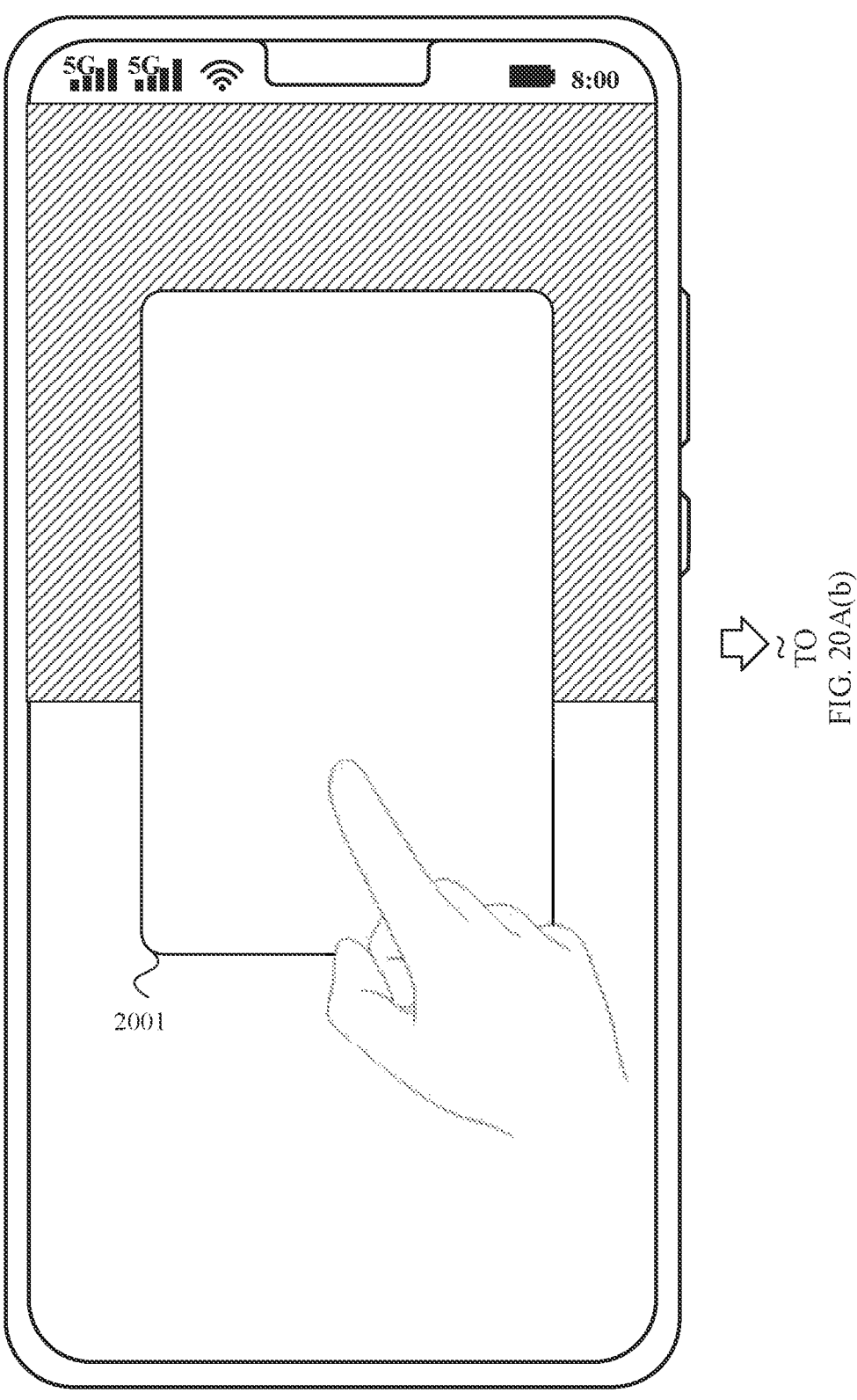
FIG. 20A(a) to FIG. 20A(e) are schematic diagrams of still another display interface according to an embodiment of this application.
Figure 20A:
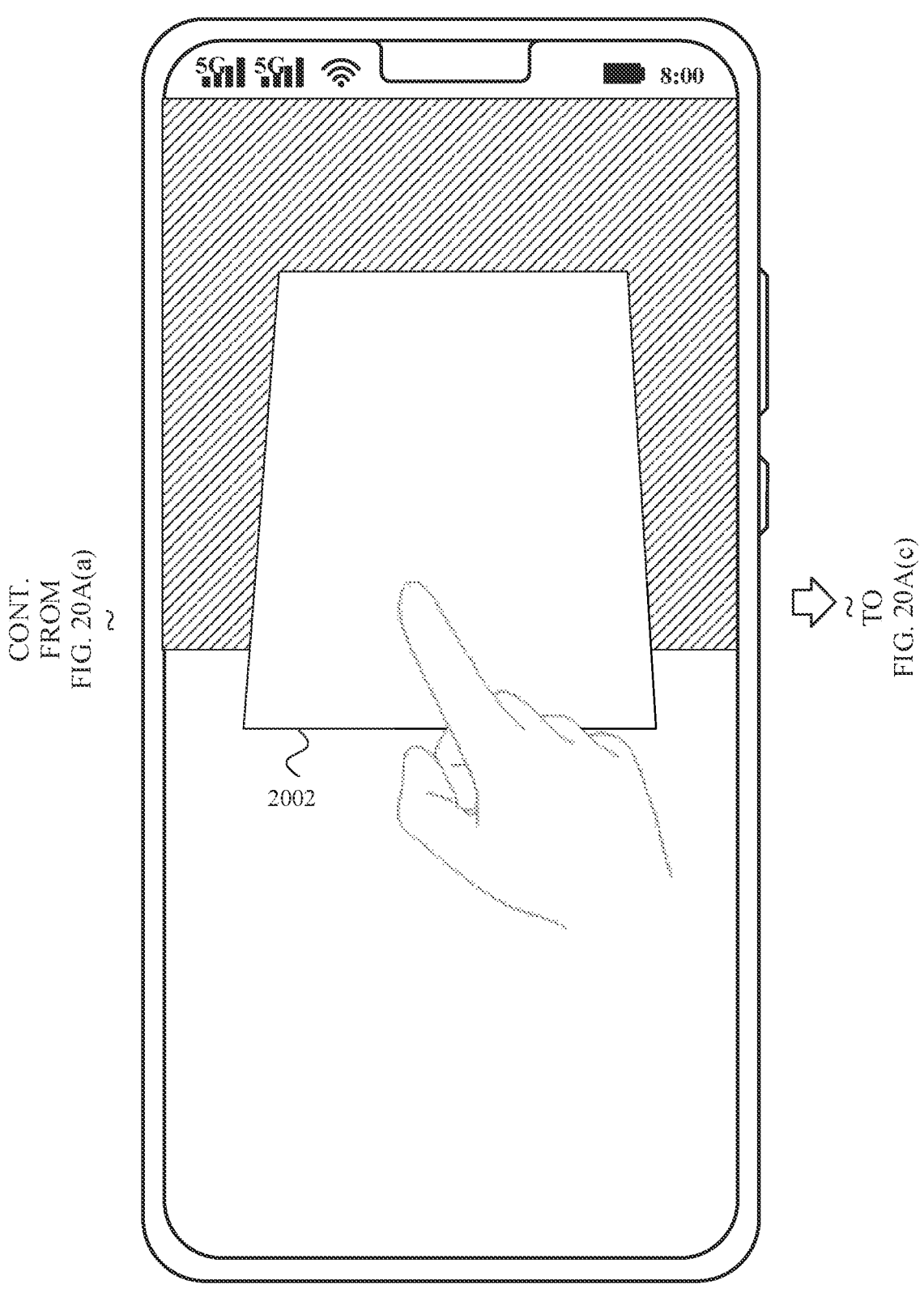
Figure 20A:
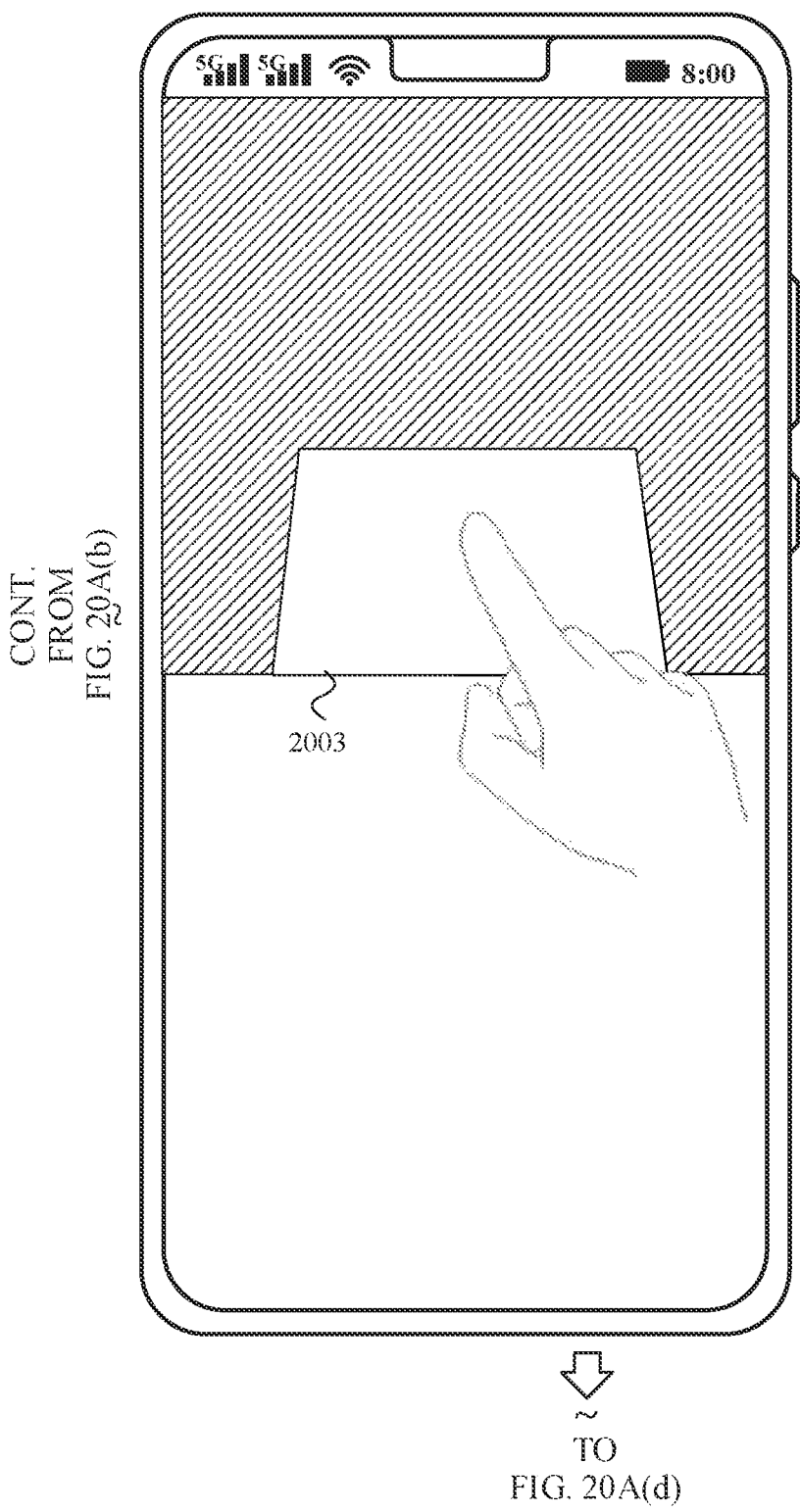
Figure 20A:
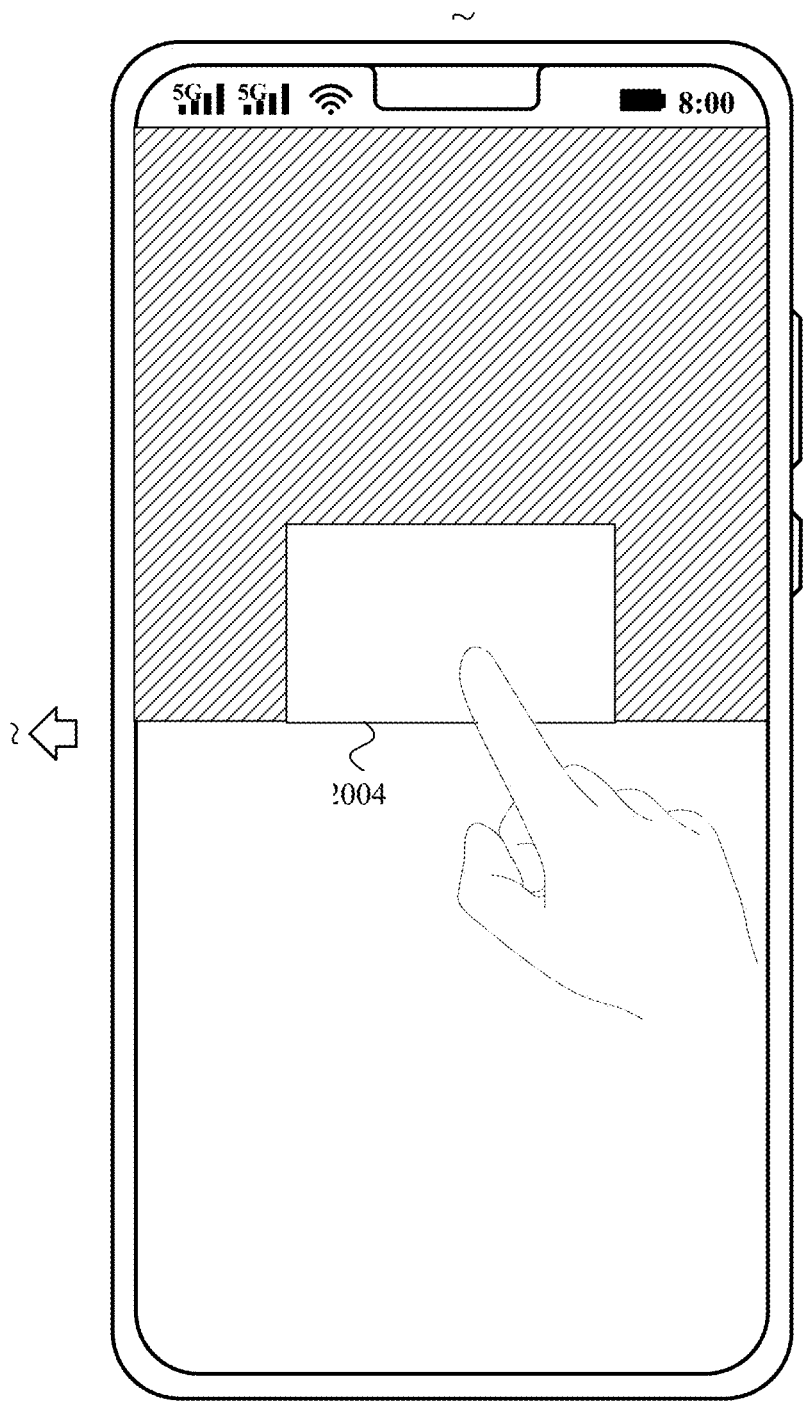
Figure 20A:
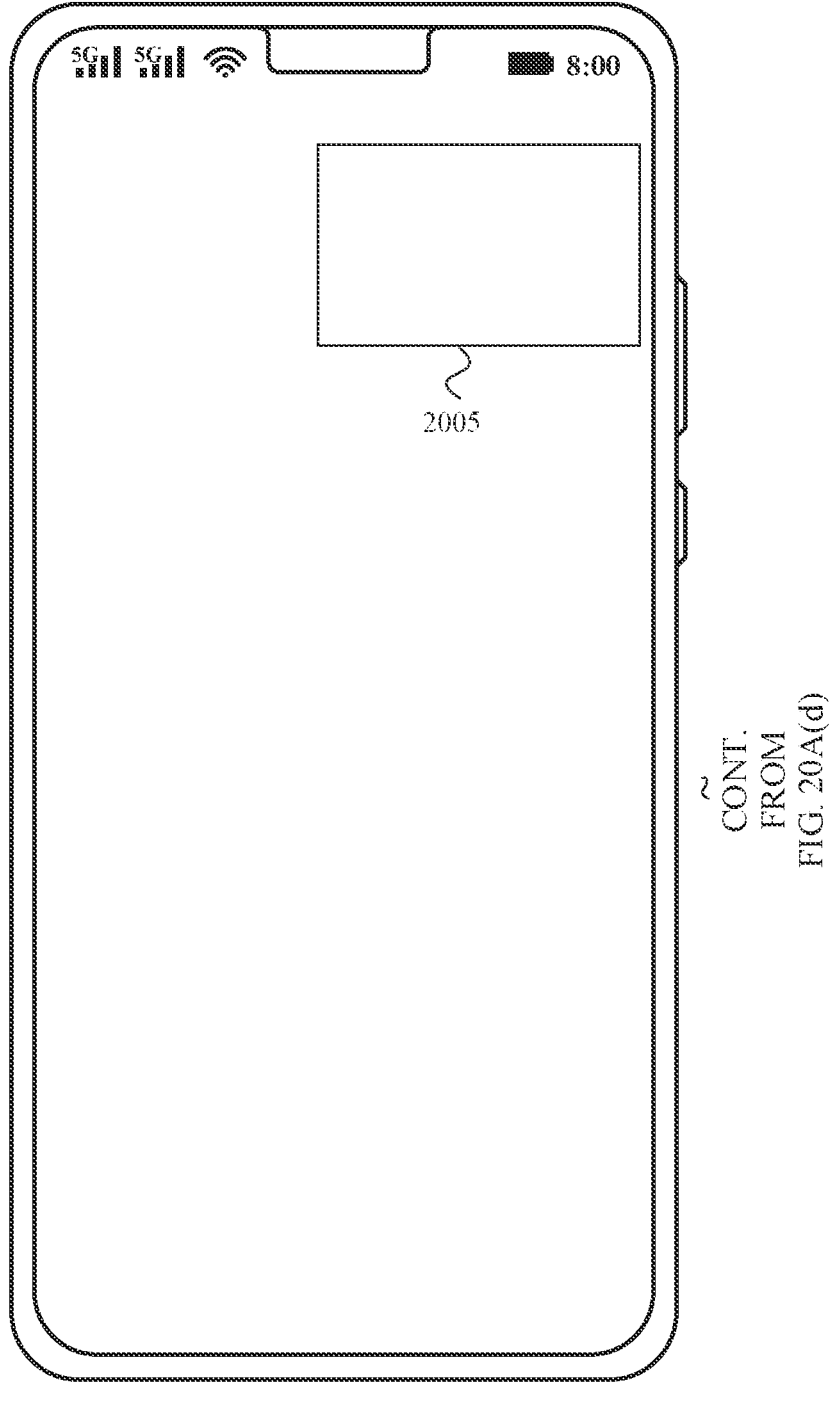

In a scenario in which the user drags the application window to trigger live window display, this embodiment provides a dynamic effect of live window display. For example, with reference to FIG. 20A(a) to FIG. 20A(e), as shown in FIG. 20A(a), the user presses an application window 2001 and moves the finger. As the user finger moves, the application window 2001 may rotate toward the display screen of the mobile phone (or away from the display screen of the mobile phone) and is updated and displayed on the display screen of the mobile phone. An updated application window is shown by 2002 in FIG. 20A(b) and 2003 in FIG. 20A(c). In addition, as the user finger moves, transparency of the application window gradually changes from 0 to 100, that is, from opaque to transparent. For example, transparency of the application window 2001 is 0. As the user finger moves, the transparency gradually increases until transparency of the updated application window is 100. In this way, a visual effect that a rotating edge of the application window 2001 becomes smaller until disappearing is provided for the user. In addition, as described in the foregoing embodiment, the mobile phone maps the shadow to the home screen, so that the shadow is displayed on the display screen of the mobile phone. For example, in this example, the shadow may be a cropped picture of an area in which the small-window element is located in the application window (for example, an area in which the video element in FIG. 9(a) to FIG. 9(c) is located). In cooperation with the dynamic effect of the application window, as the user finger moves, transparency of the shadow displayed on the display screen of the mobile phone gradually changes from 100 to 0, that is, from transparent to opaque, to provide the user with a visual effect that the shadow occurs and gradually becomes clear. In this way, the two dynamic effects cooperate. After the transparency of the application window is 100 and the transparency of the shadow changes to 0, a display effect may be shown in FIG. 20A(d), and the mobile phone displays a shadow 2004. Because content in a live window finally displayed is the same as content in the shadow 2004, an effect of gradually changing from the application window to a live window by using the dynamic effect may be provided for the user. Finally, after the user releases the finger, as shown in FIG. 20A(e), the mobile phone may display a live window 2005 on the display screen of the mobile phone. The foregoing example is described by using an example in which the application window rotates. Alternatively, the application window may be cropped as the user finger moves. For example, the application window may be cropped upward from a lower edge of the application window. For another example, an area in which the small-window element is located may be cropped. In this way, in cooperation with a change of transparency of the application window and a change of transparency of the shadow, the dynamic effect of gradually changing from the application window to a live window may also be presented to the user. In addition, after the effect shown in FIG. 20A(d) is presented, if the user does not release the finger, but slides the finger in a direction pointing to the lower edge of the display screen, the application window may be displayed in full screen again. Certainly, the content in the shadow may alternatively be different from the content of the live window.

Figure 20B:
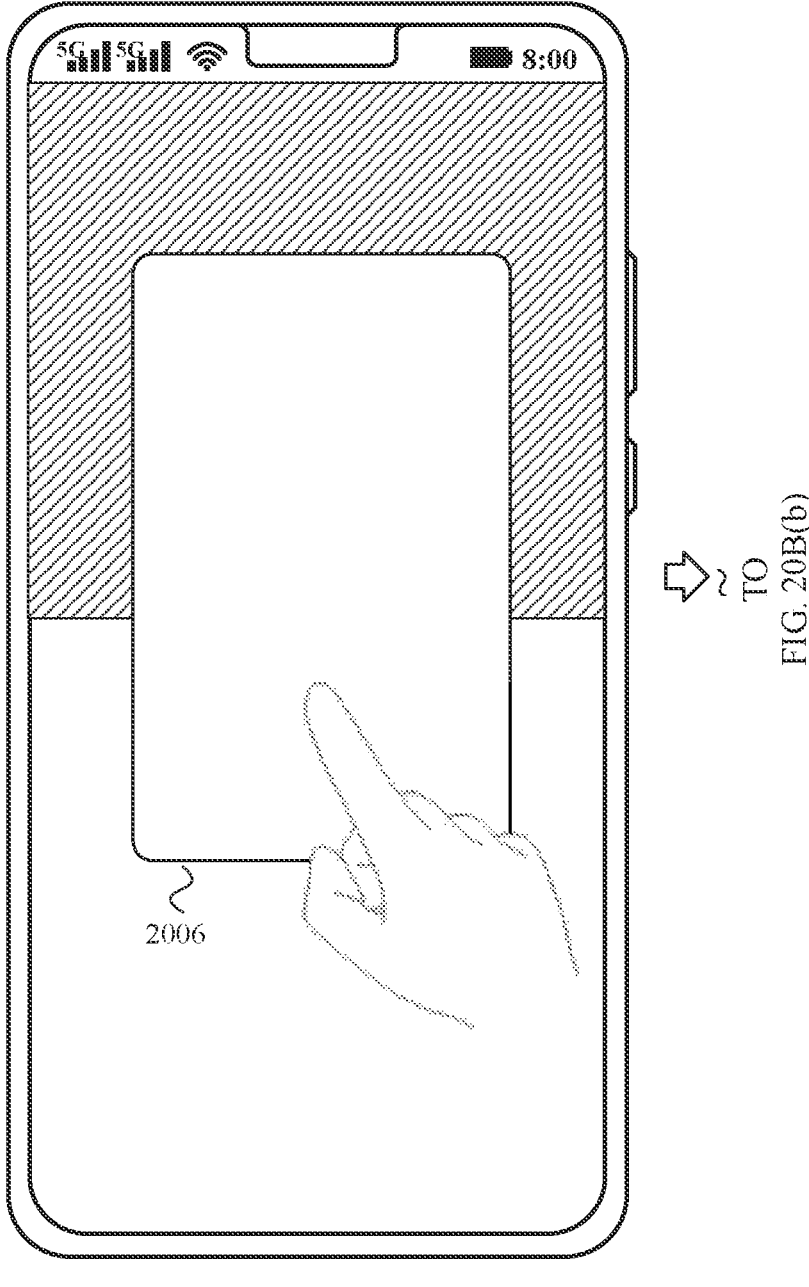
FIG. 20B(a) to FIG. 20B(e) are schematic diagrams of still another display interface according to an embodiment of this application.
Figure 20B:
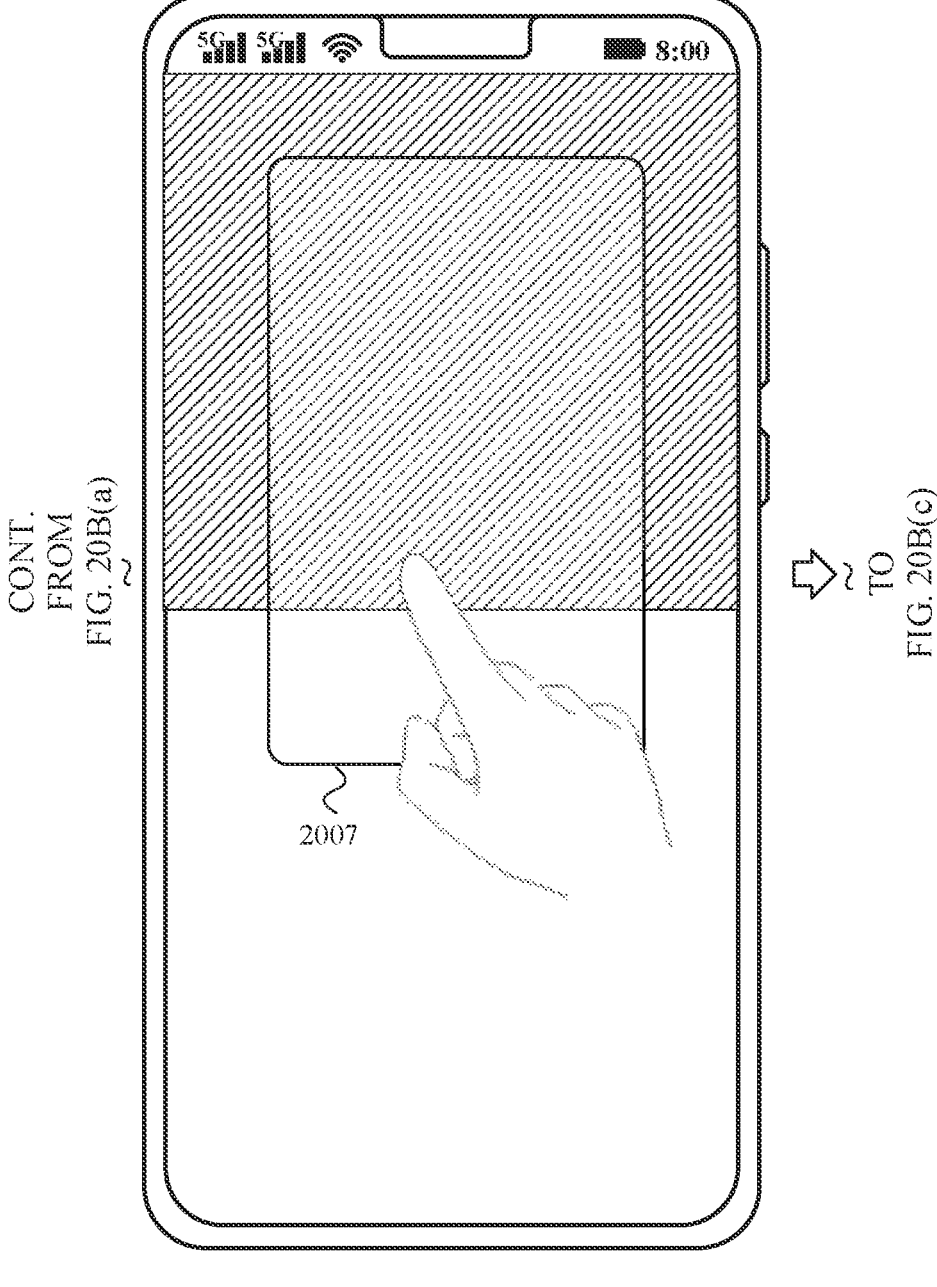
Figure 20B:
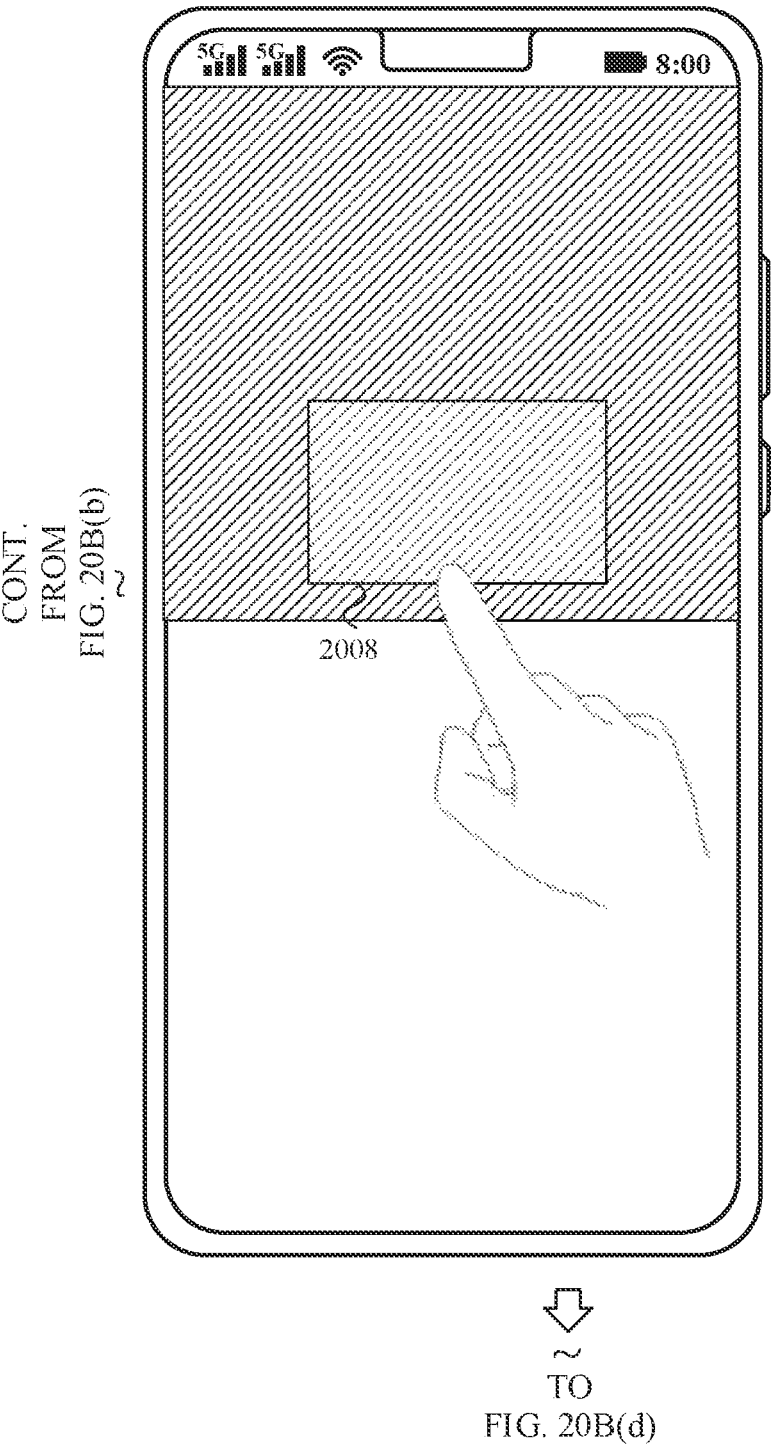
Figure 20B:
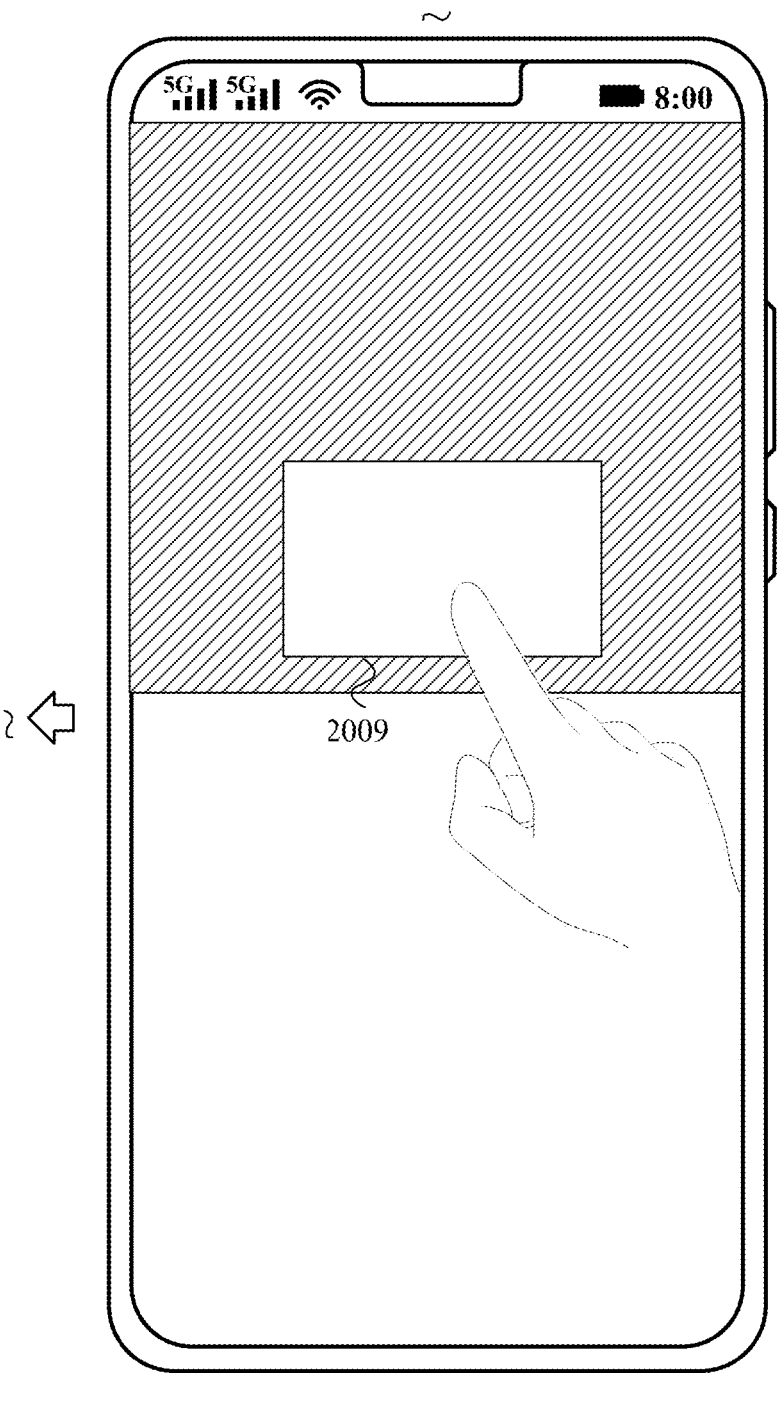
Figure 20B:
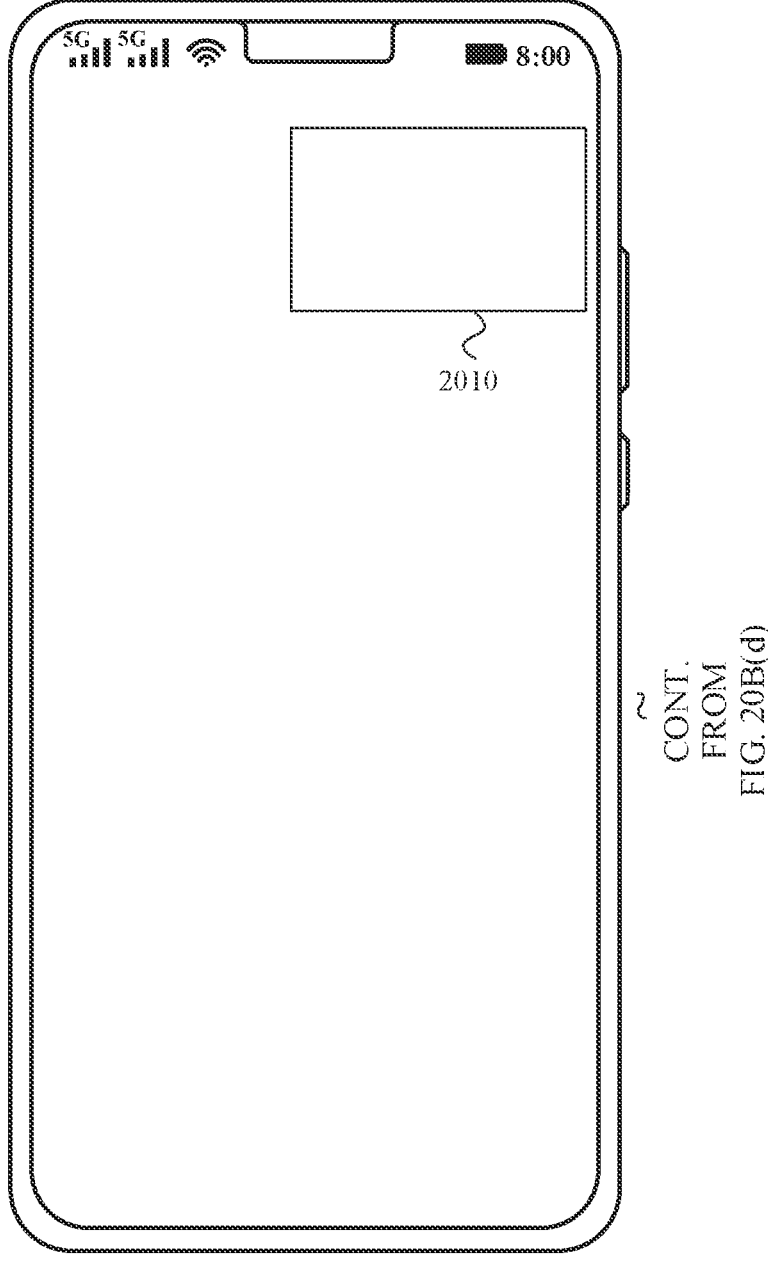

For example, with reference to FIG. 20B(a) to FIG. 20B(e), the dynamic effect of gradually switching from the application window to a live window may be presented by using an effect that the application window fades out and a live window fades in. As shown in FIG. 20B(a), the user presses an application window 2006 and moves the finger. As the user finger moves, transparency of the application window 2006 gradually changes from 0 to 100, that is, from opaque to transparent. For example, the transparency of the application window 2006 shown in FIG. 20B(a) is 0. As the user finger moves, the transparency of the application window 2006 increases. For example, when the finger moves, the application window 2006 changes to an application window 2007 shown in FIG. 20B(b), until the transparency changes to 100. In addition, as the user finger moves, transparency of the shadow mapped to the home screen on the mobile phone gradually changes from 100 to 0, that is, from transparent to opaque. For example, the transparency of the shadow at the beginning is 100. When the user finger moves, the transparency of the shadow decreases. For example, the mobile phone displays a shadow 2008 shown in FIG. 20B(c). The user finger continues to move, and the transparency of the shadow changes to 0. For example, the mobile phone displays a shadow 2009 shown in FIG. 20B(d). In this way, the two dynamic effects cooperate to present the effect that the application window fades out and a live window fades in to the user, that is, an effect of gradually changing from the application window to a live window by using the dynamic effect is provided for the user. Finally, after the user releases the finger, as shown in FIG. 20B(e), the mobile phone may display a live window 2010 on the display screen of the mobile phone. This dynamic effect is visually simple.

For another example, for a navigation-type application, a small-window element may be recommended by the system, and a layout of the small-window element may also be recommended by the system. For example, with reference to FIG. 6 and the example shown in FIG. 10A(a) and FIG. 10A(b), a recommendation model and an application type of the navigation-type application are correspondingly stored in the mobile phone, and a layout file is also correspondingly stored together with the application type in the mobile phone. After the user opens a navigation application, the mobile phone may start the navigation application, and display an application window of the navigation application on the display screen. Then, the user may perform navigation by using the navigation application. When the navigation application is used for navigation, if the mobile phone receives a notification message, after the user performs a tap operation on the notification message, the live window function of the mobile phone may be triggered, that is, the following process is performed:

The navigation application of the mobile phone obtains small-window data, and sends the small-window data to the drag service module at the application layer of the mobile phone. The small-window data includes an identifier (for example, a package name) of the navigation application, an object type (specifically, live window), and an application interface (for example, may be a screenshot of the application window 1001 in FIG. 10A(a)) in the application window.

The drag service module of the mobile phone may determine, based on the object type (live window) in the small-window data, that the user operation of tapping the notification message is performed to trigger live window display. Then, the drag service module of the mobile phone may send the small-window data to the live window controller at the application layer of the mobile phone, so that the live window controller performs processing logic of a live window service.

For example, the live window controller of the mobile phone may determine, based on the package name of the navigation application included in the small-window data, that an application type of the application is the navigation type, and may find, based on the application type, the recommendation model corresponding to the navigation-type application. The recommendation model is used to identify elements, for example, a navigation direction, a distance, and a road indication, in the navigation application as small-window elements. The live window controller of the mobile phone may further find, based on the determined application type, the layout file corresponding to the navigation-type application. The layout file includes layout configurations of the small-window elements of the navigation-type application.

The live window controller of the mobile phone may further start a virtual screen, and transmit an ID of the virtual screen and the package name of the navigation application in the small-window data to the window manager at the framework layer of the mobile phone. The window manager of the mobile phone may move, based on the ID of the virtual screen and the package name of the navigation application, the application window of the navigation application to the virtual screen for drawing. The live window controller of the mobile phone may further generate a small-window shadow, and add the shadow to the home screen of the mobile phone. The shadow is generated based on the application interface, for example, a screenshot of the application window 1001 in FIG. 10A(a), in the small-window data.

Then, the live window controller of the mobile phone may extract, based on the recommendation model, small-window elements from an application window drawn on the virtual screen. For example, the small-window elements are a navigation direction 1003, a distance 1004, and a road indication 1005 in FIG. 10A(5). After extracting the navigation direction 1003, the distance 1004, and the road indication 1005, the live window controller of the mobile phone may re-lay the extracted small-window element based on the found layout file.

Figure 21A:
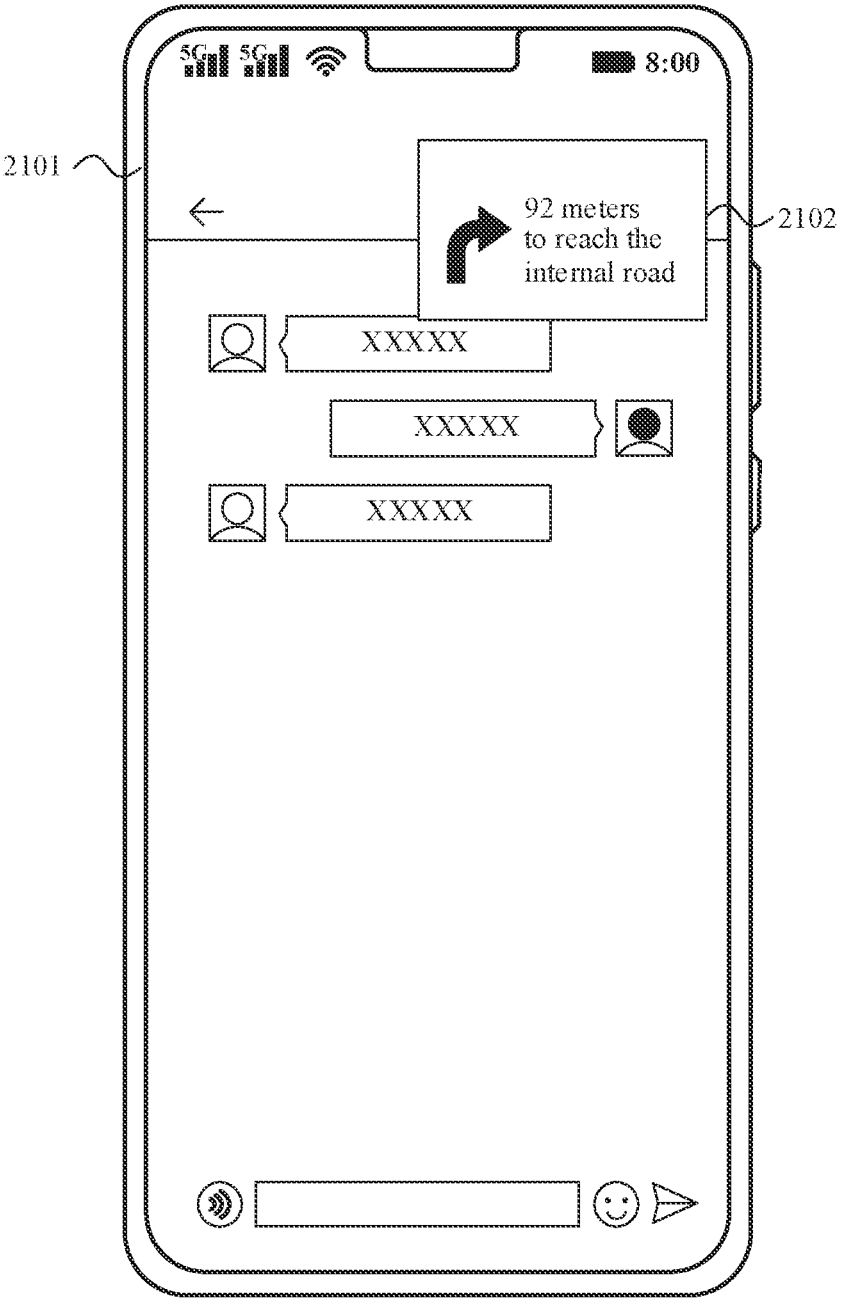
FIG. 21A(a) and FIG. 21A(b) are schematic diagrams of still another display interface according to an embodiment of this application.
Figure 21A:
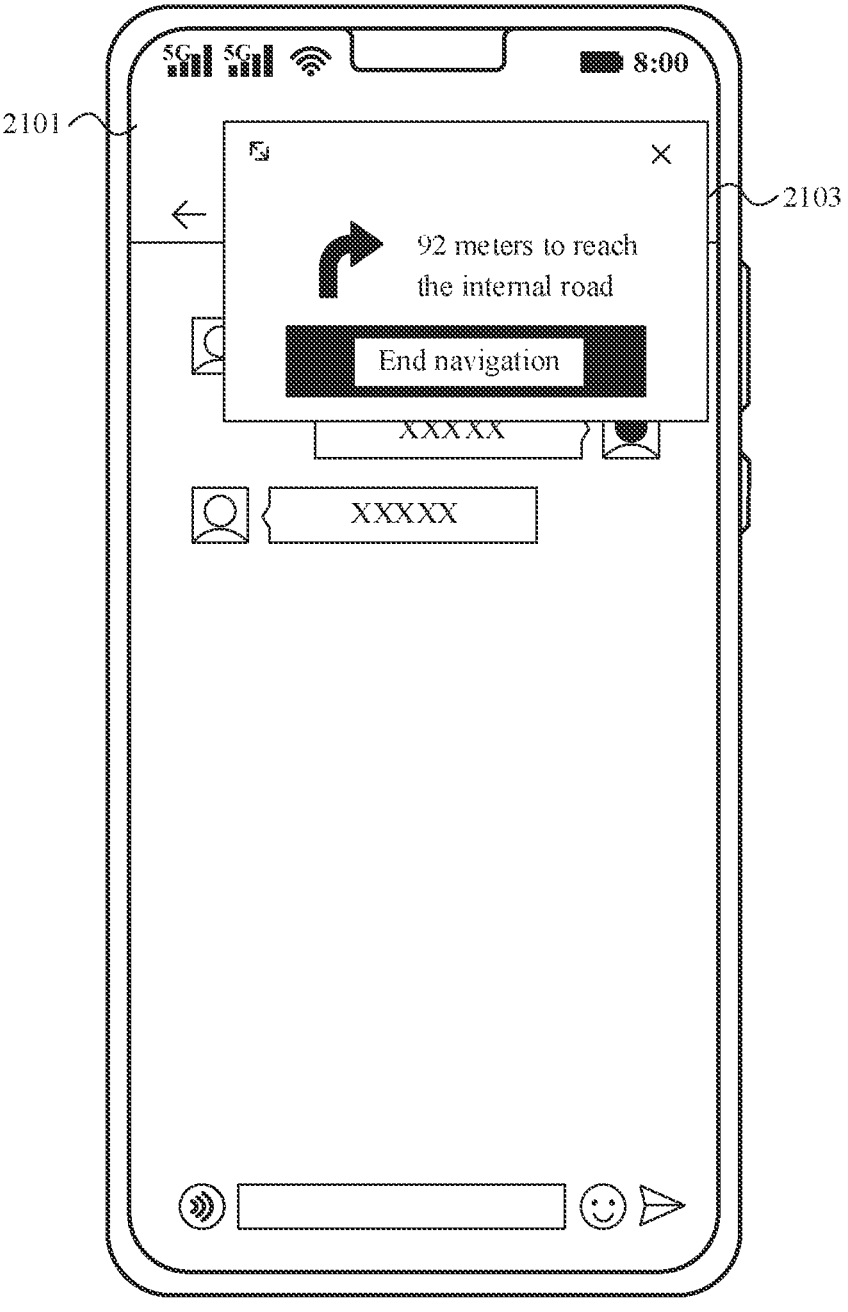

After the layout is completed, the live window controller of the mobile phone maps the re-laid navigation direction, distance, and road indication to the shadow of the home screen. In addition, it may be understood that after the user taps the notification message, the mobile phone may further display a details interface of the notification message in response to the operation. In this way, after the user taps the notification message, for example, releases the finger in the example shown in FIG. 10A(b), as shown in FIG. 21A(a), the mobile phone may display a details interface 2101 corresponding to the notification message, and display a live window 2102 on the details interface 2101. For example, the live window 2102 includes the navigation direction, the distance, and the road indication, so that the user continues to view navigation information. Then, when the user switches to the desktop and opens another application in the mobile phone, the live window 2102 may continue to be displayed on the display screen of the mobile phone in a floating manner. It can be learned that, in the navigation process, if the application window of the navigation application switches from foreground to background, a key element in the application window of the navigation application may be displayed in the live window form on the display screen of the mobile phone, so that the user continues to view navigation information.

Figure 21B:
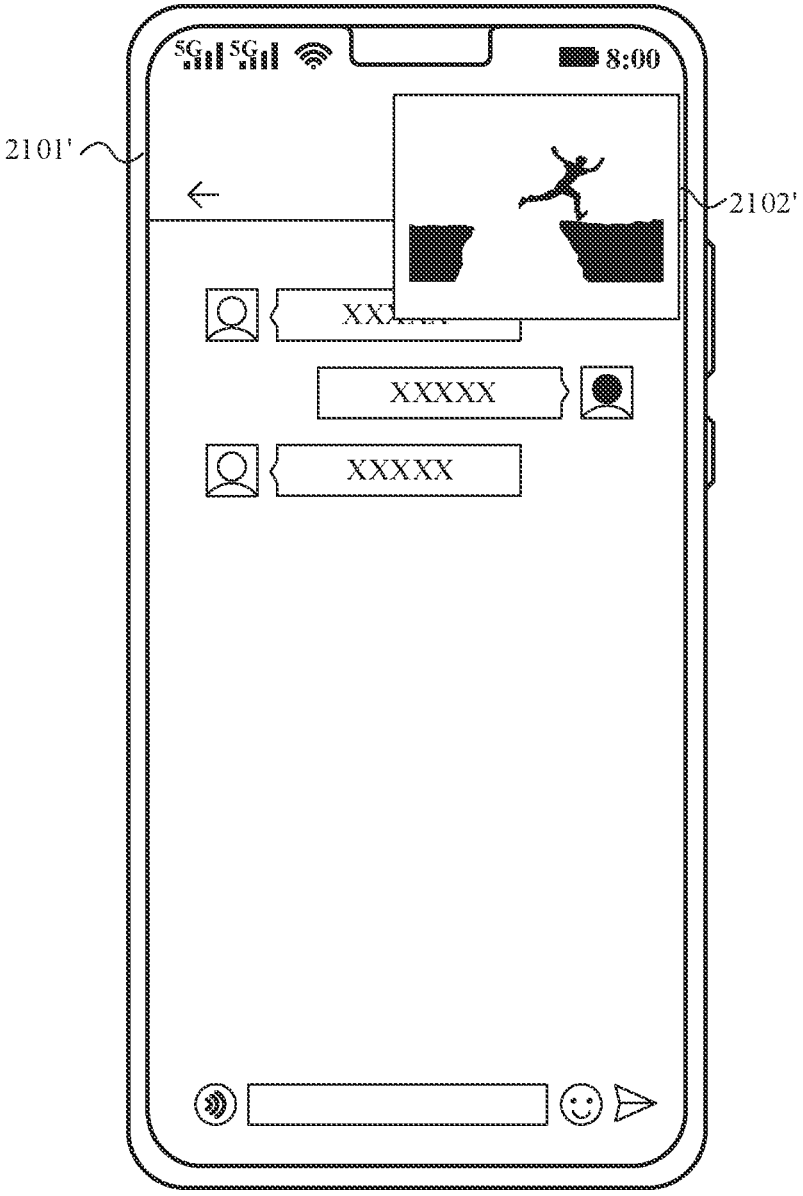
FIG. 21B is a schematic diagram of still another display interface according to an embodiment of this application.

It should be noted that, for the navigation-type application, a small-window element displayed in a live window may include the navigation direction, the distance, and the road indication. In some other embodiments, the live window may include none of these elements, or may include one or more elements of the navigation direction, the distance, and the road indication, or may include another element of the navigation application, for example, may include an "end navigation" button. This is not specifically limited in this embodiment. In addition, the foregoing embodiment is described by using an example in which the small-window elements of the navigation application are recommended by the system. In some other embodiments, alternatively, a small-window element of the navigation application may be defined by an application developer. For example, the DUP capability provided by the system is invoked to extract a small-window element. If a corresponding DUP configuration file (the DUP configuration file includes a DUP ID of a small-window element) is preconfigured in the mobile phone, the live window controller of the mobile phone may extract, based on the preconfigured DUP configuration file, an instruction of an element of the specified DUP ID from an application window drawn on a virtual screen. Then, after the extracted element is re-laid based on a found layout file, the element is mapped to the shadow of the home screen, to display the specified small-window element in a live window. Similarly, with reference to FIG. 10B(a) and FIG. 10B(b), as shown in FIG. 21B, after the mobile phone receives a tap operation performed by the user on the notification message, the mobile phone may display a details interface 2101' corresponding to the notification message, and display a live window 2102' on the details interface 2101'. For example, the live window 2102' includes a video element. In the video element, a video in a video element 1003' shown in FIG. 10B(a) may continue to be played for the user to continue watching. Then, when the user switches to the desktop and opens another application in the mobile phone, the live window 2102' may continue to be displayed on the display screen of the mobile phone in a floating manner.

Figure 22A:
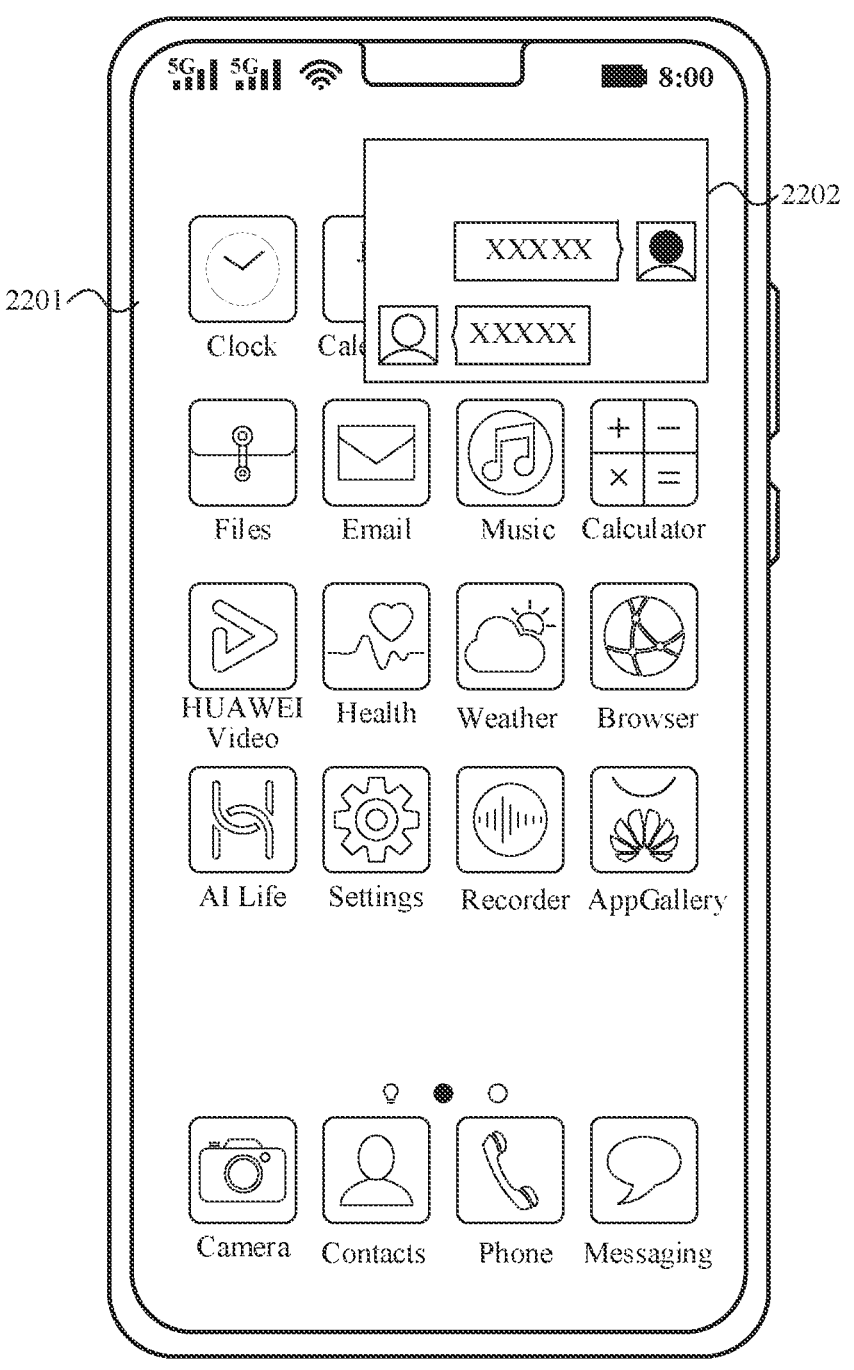
FIG. 22(a) to FIG. 22(c) are schematic diagrams of still another display interface according to an embodiment of this application.

For another example, for instant messaging, notes, information, or other list (list)-type application interfaces, a small-window element may be recommended by the system. The small-window element may be N (for example, two or three) latest messages or information. In an example, the N latest messages (or information) may be identified based on time of the messages (or information). For example, the N latest messages are N messages whose time is closest to a current moment. Alternatively, the N latest messages (or information) may be identified based on display positions of the messages (or information) in an interface. For example, the N latest messages are N messages starting from the bottom of the interface. A layout of the small-window element may also be recommended by the system. For example, with reference to FIG. 6 and the example shown in FIG. 11, after the user opens an instant messaging application, the mobile phone may start the instant messaging application, and display an application window of the instant messaging application on the display screen. For example, the application window includes a chat details page, and the chat details page includes three messages. The user may perform an operation of switching the instant messaging application to background, for example, perform a sliding operation starting from the lower edge of the display screen of the mobile phone and pointing to the upper edge of the display screen of the mobile phone. After receiving the operation of switching the application to background, the mobile phone may trigger the live window function of the mobile phone. For a specific implementation, refer to the implementation of displaying the live window corresponding to the navigation-type application. In this way, in response to the operation of the user, the live window controller of the mobile phone may extract a small-window element, for example, two latest messages on the chat details page, and display the small-window element in the live window form on the display screen of the mobile phone after a re-layout. For example, in the example shown in FIG. 11, the user performs an upward sliding operation starting from the lower edge of the display screen. After the finger leaves the display screen of the mobile phone, as shown in FIG. 22(a), the mobile phone may display a desktop 2201, and display a live window 2202 on the desktop 2201. For example, the live window 2202 includes the two latest messages on the chat details page for the user to continue viewing. Then, when the user switches between sub-screens on the desktop, or opens another application in the mobile phone, the live window 2202 may continue to be displayed on the display screen of the mobile phone in a floating manner.

After the mobile phone displays the live window on the display screen of the mobile phone, the method may further include the following S704 to S706.

S704: The mobile phone receives a user operation on the live window.

S705: The mobile phone displays a live window in a medium window form.

As described in the foregoing embodiment, after the mobile phone receives the user operation in S701, the mobile phone may display a live window on the display screen of the mobile phone. The live window is a small window displayed on the display screen in a floating manner. The live window in a small window form may be a first window in embodiments of this application. In this embodiment, the live window in the small window form may be provided for the user to continue to browse key information in an application window that is not displayed on the display screen. For example, with reference to FIG. 19(a), the user may continue to browse the video on the information details page. For another example, with reference to FIG. 21A(a), the user may continue to browse the navigation information in the navigation application. For another example, with reference to FIG. 21B, the user may continue to watch the video on the video details page. For another example, with reference to FIG. 22(a), the user may continue to view the messages in the instant messaging application.

In this embodiment, the live window in the small window form supports the following user operations. For example, the user operation in S704 may be an operation 1, and the operation 1 is used to trigger the live window to change from the small window form to the medium window form. The operation 1 may be a third operation in embodiments of this application. In an example, the operation 1 may be a touchscreen gesture operation, for example, a tap operation or a double-tap operation on the live window in the small window form. That is, after the user performs the operation 1 on the live window in the small window form, the live window changes from the small window form to the medium window form and is displayed on the display screen. It should be noted that the live window in the medium window form is also displayed on the display screen in a floating manner, and after the user switches between pages, exits an application, or opens another application, the live window in the medium window form may continue to be displayed on the display screen of the mobile phone. The live window in the medium window form may be a second window in embodiments of this application.

The live window in the medium window form and the live window in the small window form may include different small-window elements. In an example, the live window in the medium window form includes more small-window elements than the live window in the small window form. For example, the live window in the small window form includes only an element that can be browsed by the user, and the live window in the medium window form includes an element that can be browsed by the user (the same as the element in the live window in the small window form) and an element that can be operated by the user. In some embodiments, similar to the specific implementation of displaying the live window in the small window form, the live window in the medium window form may also be displayed on the display screen of the mobile phone after the mobile phone extracts a small-window element from a corresponding application window and performs a re-layout. A small-window element and a layout manner in the live window in the medium window form may also be recommended by the system or defined by an application developer, and a configuration file or a recommendation model used to extract a small-window element and a layout file used to re-lay the small-window element may also be prestored in the mobile phone. Specific implementations thereof are similar to the specific implementations of corresponding content in the live window in the small window form, and details are not described herein again.

For example, with reference to FIG. 19(a) and FIG. 19(b), the operation 1 is a tap operation on the live window in the small window form, a small-window element and a layout manner in the live window in the medium window form are defined by an application developer, a corresponding configuration file and layout file are stored in the mobile phone, and the application developer defines a video element, a play/pause button, and a progress bar in the application as small-window elements in the live window in the medium window form. As shown in FIG. 19(*a*), the mobile phone displays the live window 1902 in the small window form on the desktop 1901. The mobile phone receives a tap operation performed by the user on the live window 1902 in the small window form. In response to the tap operation, the mobile phone searches for a configuration file and a layout file that correspond to a live window in a medium window form of the application. The configuration file includes an identifier of an element that needs to be displayed in the live window in the medium window form of the application, for example, an identifier of the video element, an identifier of the play/pause button, and an identifier of the progress bar. The layout file includes configurations such as the identifier and a position of the video element, the identifier and a position of the play/pause button, and the identifier and a position of the progress bar. The mobile phone extracts, based on the found configuration file and from an application window drawn on a virtual screen, the small-window element that needs to be displayed in the live window in the medium window form. For example, the small-window element is the video element, the play/pause button, and the progress bar. The video element, the play/pause button, and the progress bar are re-laid based on the found layout file. After the layout is completed, the mobile phone maps the re-laid small-window element to the shadow of the home screen. In this way, as shown in FIG. 19(*b*), the mobile phone may display a live window 1903 in a medium window form on the desktop 1901. The live window 1903 in the medium window form includes a video component 1904, a play/pause button 1905, and a progress bar 1906.

Figure 22B:
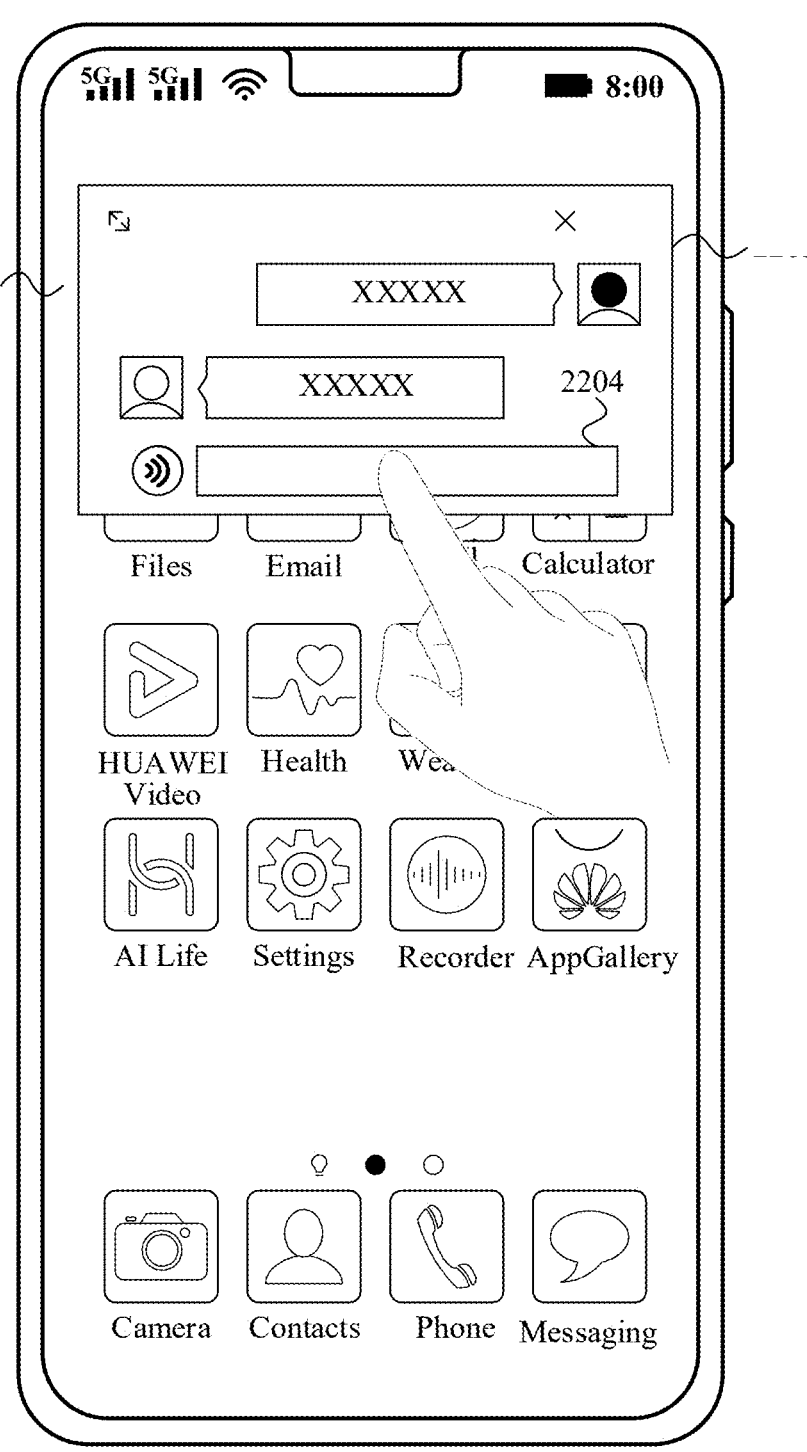
Figure 22C:
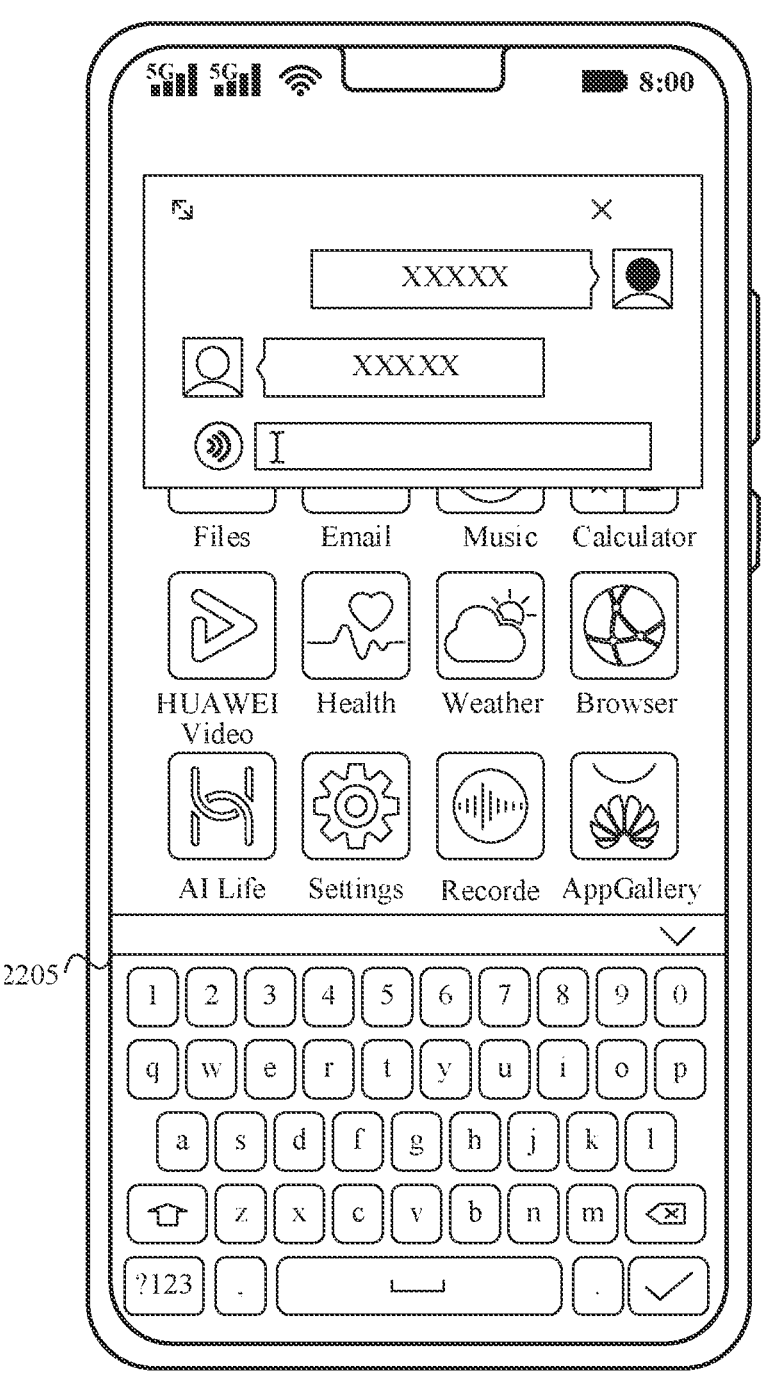

Similarly, with reference to FIG. 21A(a) and FIG. 21A(b), as shown in FIG. 21A(a), the mobile phone displays the live window 2102 in the small window form on the details interface 2101 corresponding to the notification message. After receiving an operation 1 performed by the user on the live window 2102 in the small window form, for example, a tap operation, the mobile phone may search for a configuration file and a layout file that correspond to a live window in a medium window form of the application. Then, the mobile phone extracts, based on the configuration file, a small-window element that needs to be displayed in the live window in the medium window form, and the small-window element may be mapped to the shadow of the home screen after re-laid. In this way, as shown in FIG. 21A(b), the mobile phone may display a live window 2103 in a medium window form on the details interface 2101 corresponding to the notification message. The live window 2103 in the medium window form includes the navigation direction, the distance, the road indication, and an "end navigation" button. With reference to FIG. 22(*a*) to FIG. 22(*c*), as shown in FIG. 22(*a*), the mobile phone displays the live window 2202 in the small window form on the desktop 2201. After the mobile phone receives an operation 1 performed by the user on the live window 2202 in the small window form, for example, a tap operation, as shown in FIG. 22(*b*), the mobile phone may display a live window 2203 in a medium window form on the desktop 2201. The live window 2203 in the medium window form includes the two latest messages on the chat details page, a voice button, and an input box 2204.

It should be noted that, similar to the description of the layout file in the corresponding description of the live window in the small window form, there may be one or more layout files corresponding to a live window in a medium window form of a same application (or a same interface of an application, or a same type of applications). Similarly, there may also be one or more configuration files (or recommendation models) corresponding to the live window in the medium window form. It may be understood that, for different configuration files (or recommendation models), the mobile phone may extract different small-window elements to be displayed in the live window in the medium window form. Display effects obtained after the mobile phone re-lays a same small-window element based on different layout files are also different.

Figure 23:
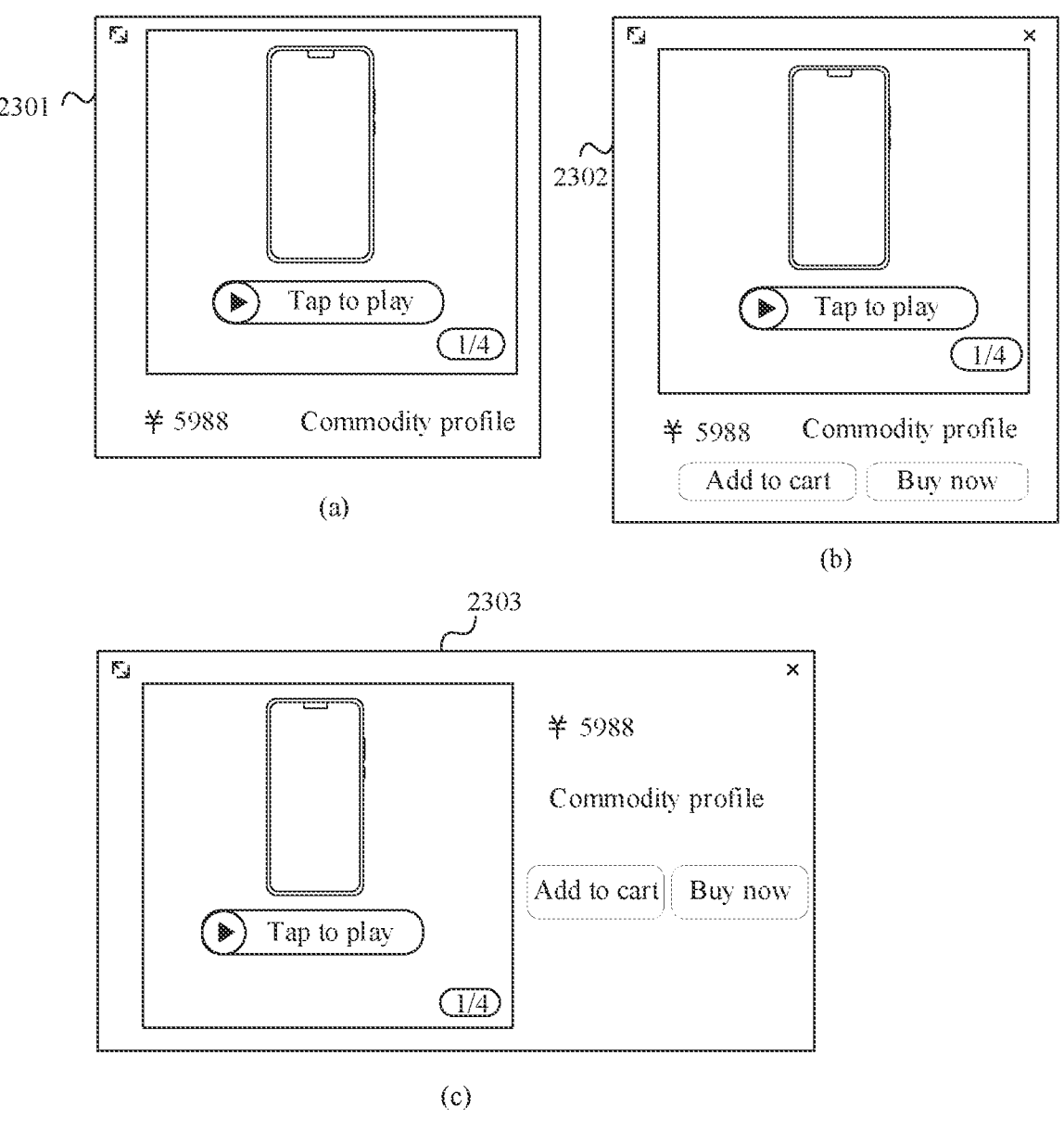
FIG. 23 is a schematic diagram of another live window according to an embodiment of this application.
Figure 24A:
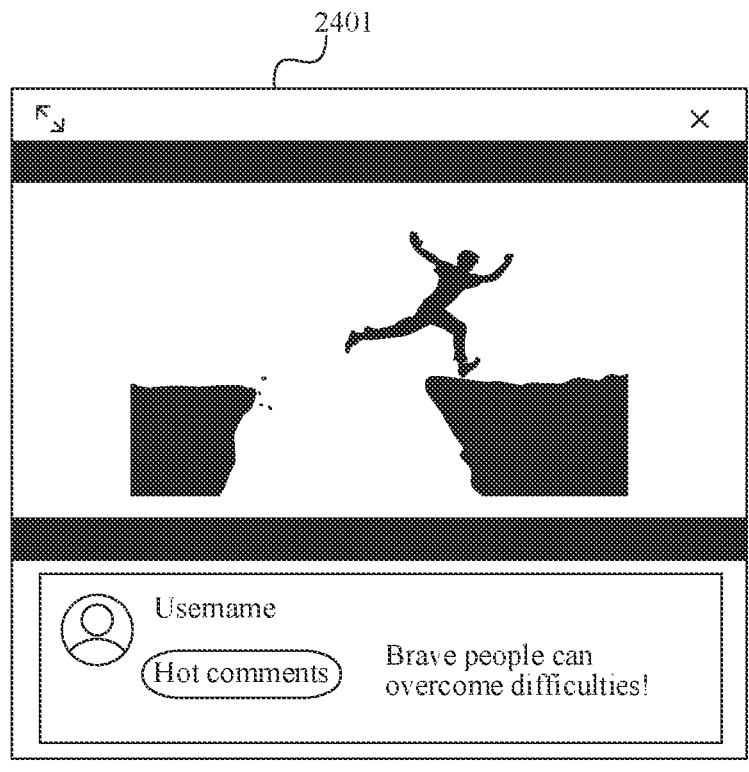
FIG. 24A(a) to FIG. 24A(c) are schematic diagrams of still another live window according to an embodiment of this application.
Figure 24A:
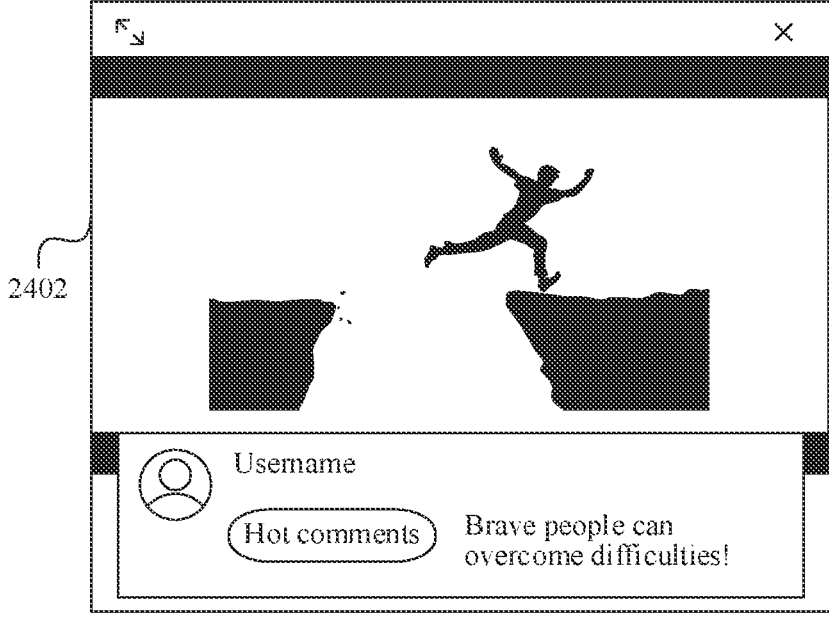
Figure 24A:
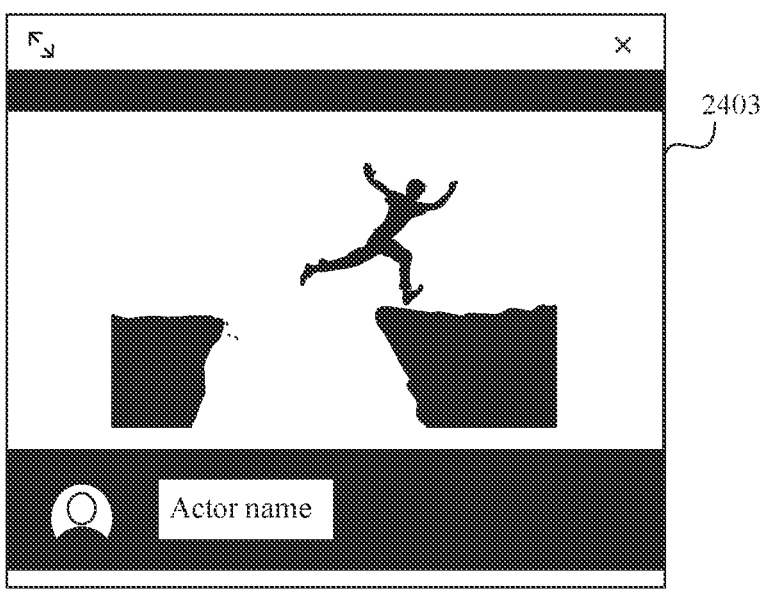

For example, with reference to FIG. 23, in a shopping application, corresponding configuration files of a live window in a medium window form include a configuration file a1 and a configuration file a2, and corresponding layout files are a layout file b1 and a layout file b2. The configuration file a1 includes an identifier of a commodity preview, an identifier of a commodity price, and an identifier of a commodity profile. The configuration file a2 includes the identifier of the commodity preview, the identifier of the commodity price, the identifier of the commodity profile, an identifier of an "add to cart" button, and an identifier of "buy now". As shown in (a) in FIG. 23, the mobile phone may display a live window 2301 in a medium window form based on the configuration file a1 and the layout file b1. As shown in (b) in FIG. 23, the mobile phone may display a live window 2302 in a medium window form based on the configuration file a2 and the layout file b2. For another example, for a same small-window element, for example, including the commodity preview, the commodity price, the commodity profile, the "add to cart" button, and the "buy now" button, the mobile phone includes two different layout files, for example, the layout file b2 and a layout file b3. In this case, as shown in (c) in FIG. 23, the mobile phone may display a live window 2303 in a medium window form based on the layout file b3. It can be learned that, a layout manner of the live window 2303 is different from a layout manner of the live window 2302 shown in (b) in FIG. 23. For another example, with reference to FIG. 24A(a) to FIG. 24A(c), in a video application, there are two configuration files corresponding to a live window in a medium window form. As shown in FIG. 24A(a), the mobile phone may display a live window 2401 in a medium window form based on one configuration file and a corresponding layout file. As shown in FIG. 24A(c), the mobile phone may display a live window 2403 in a medium window form based on the other configuration file and a corresponding layout file. For another example, for a same small-window element, the mobile phone includes two different layout files. In this case, the mobile phone may display, based on the different layout files, the live window 2401 in the medium window form shown in FIG. 24A(a) and a live window 2402 shown in FIG. 24A(b). It can be learned that a layout manner of the live window 2401 is different from that of the live window 2402.

It should be noted that, when a live window in a medium window form of a same application (or a same interface of an application, or a same type of applications) corresponds to a plurality of layout files, the mobile phone may select any layout file from the plurality of layout files, to re-lay an extracted small-window element. Alternatively, a system developer may provide a plurality of layout files, and an application developer selects a layout file from the plurality of layout files. In this way, the mobile phone may select the corresponding layout file from the plurality of layout files as specified by the application developer, to re-lay an extracted small-window element. Similarly, when the live window in the medium window form corresponds to a plurality of configuration files (or recommendation models), the mobile phone may select any one of the plurality of configuration files (or recommendation models), or select a corresponding configuration file (or recommendation model) as specified by an application developer, to extract a small-window element.

In addition, in some embodiments, in addition to the small-window element, the live window in the medium window form may further include a close button and an enlarge button. The close button is used to close the live window. The enlarge button is used to enlarge the live window, that is, display the application window in the full-screen large window form. For example, with reference to FIG. 19(*a*) and FIG. 19(*b*), as shown in FIG. 19(*b*), in addition to the small-window elements, the live window 1903 in the medium window form may further include a close button 1908 and an enlarge button 1907. After the mobile phone receives an operation, for example, a tap operation, performed by the user on the close button 1908, the mobile phone may close the live window 1903, and display only the desktop 1901. After the mobile phone receives an operation, for example, a tap operation, performed by the user on the enlarge button 1907, the mobile phone may display an application window of a corresponding application, for example, the application window 901 shown in FIG. 9(*a*). The live window in the medium window form may further include a move button. The user may drag the live window in the medium window form by pressing the move button and moving the finger. For example, with reference to FIG. 19(*a*) and FIG. 19(*b*), as shown in FIG. 19(*b*), the live window 1903 in the medium window form may further include a move button 1909. After the mobile phone receives an operation of pressing the move button 1909 and moving the finger by the user, the mobile phone moves the live window 1903 on the display screen of the mobile phone.

In some embodiments, after the user performs the operation 1 on the live window in the small window form so that the mobile phone displays the live window in the medium window form on the display screen, if the user does not operate the mobile phone for X seconds (s), for example, 3s, the mobile phone may automatically switch the live window in the medium window form and display the live window in the small window form. For example, with reference to FIG. 19(*a*) and FIG. 19(*b*), as shown in FIG. 19(*b*), after the mobile phone displays the live window 1903 in the medium window form, if the user does not operate the mobile phone for 3s, the mobile phone may display the live window 1902 in the small window form shown in FIG. 19(*a*). Alternatively, after the mobile phone displays the live window in the medium window form on the display screen, if the mobile phone receives an operation, for example, a tap operation, performed by the user on a blank area, that is, an area in which no interface element is displayed, on the display screen of the mobile phone, the mobile phone may also switch the live window in the medium window form and display the live window in the small window form. Alternatively, after the mobile phone displays the live window in the medium window form on the display screen, if the mobile phone receives an operation, for example, a tap operation or a double-tap operation, performed by the user on an edge area (with no operable element, for example, an area in a dashed-line box shown in FIG. 19(*b*)) of the live window in the medium window form, the mobile phone may also switch the live window in the medium window form and display the live window in the small window form.

In addition, with reference to the foregoing descriptions of FIG. 14 to FIG. 16, it can be learned that in this embodiment, the size of the live window in the small window form may be set based on grids obtained by dividing the display screen. Similarly, a size of the live window in the medium window form may also be set based on grids obtained by dividing the display screen, for example, may be set by a system developer or an application developer. For example, with further reference to FIG. 14 to FIG. 16, FIG. 14 to FIG. 16 show, by using an example in which an aspect ratio of a horizontal live window is 16:10 and an aspect ratio of a vertical live window is 10:16, display effects of the horizontal live window in the medium window form and the vertical live window in the medium window form when the display screen of the mobile phone is vertically divided into 4 grids, 8 grids, and 12 grids, respectively.

It can be learned that, with reference to FIG. 14, as shown in (b) in FIG. 14, for the horizontal live window in the medium window form, a system developer or an application developer may set a width of the live window in the medium window form to 3.5 grids. Based on the aspect ratio 16:10 of the horizontal live window, the mobile phone may display, on the display screen of the mobile phone, a live window 1403 with a width of 3.5 grids in the medium window form based on the 4 grids obtained by dividing the display screen of the mobile phone. For the vertical live window in the medium window form, a system developer or an application developer may set a height of the live window in the medium window form to 3.5 grids. Based on the aspect ratio 10:16 of the vertical live window, the mobile phone may display, on the display screen of the mobile phone, a live window 1404 with a height of 3.5 grids in the medium window form based on the 4 grids obtained by dividing the display screen of the mobile phone.

Similarly, with reference to FIG. 15, as shown in (b) in FIG. 15, for the horizontal live window in the medium window form, a system developer or an application developer may set a width of the live window in the medium window form to 5 grids. Based on the aspect ratio 16:10 of the horizontal live window, the mobile phone may display, on the display screen of the mobile phone, a live window 1503 with a width of 5 grids in the medium window form based on the 8 grids obtained by dividing the display screen of the mobile phone. For the vertical live window in the medium window form, a system developer or an application developer may set a height of the live window in the medium window form to 5 grids. Based on the aspect ratio 10:16 of the vertical live window, the mobile phone may display, on the display screen of the mobile phone, a live window 1504 with a height of 5 grids in the medium window form based on the 8 grids obtained by dividing the display screen of the mobile phone.

With reference to FIG. 16, as shown in (b) in FIG. 16, for the horizontal live window in the medium window form, a system developer or an application developer may set a width of the live window in the medium window form to 5 grids. Based on the aspect ratio 16:10 of the horizontal live window, the mobile phone may display, on the display screen of the mobile phone live window 1603 with a width of 5 grids in the medium window form based on the 12 grids obtained by dividing the display screen of the mobile phone. For the vertical live window in the medium window form, a system developer or an application developer may set a height of the live window in the medium window form to 5 grids. Based on the aspect ratio 10:16 of the vertical live window, the mobile phone may display, on the display screen of the mobile phone, a live window 1604 with a height of 3 grids in the medium window form based on the 12 grids obtained by dividing the display screen of the mobile phone.

In addition, in this embodiment, a display position of the live window in the medium window form on the display screen may also be any position on the display screen. In an example, the display position of the live window in the medium window form may be predefined. For example, the display position of the live window in the medium window form may be predefined to be a position that is a predetermined distance 3 away from the right edge of the display screen and a predetermined distance 4 away from the upper edge of the display screen. The predetermined distance 3 and the predetermined distance 4 may also be predefined. In this way, the mobile phone may display the live window in the medium window form on the display screen of the mobile phone based on the predefined display position and size. For example, based on the predefined display position, the live window in the medium window form may be automatically attached to an edge of the display screen of the mobile phone, which is similar to the display effect of the live window 1701 in the small window form in FIG. 17.

As described in the foregoing embodiment, the live window in the medium window form may include an element that can be operated by the user, for example, the play/pause button 1905 and the progress bar 1906 that are shown in FIG. 19(*b*), for another example, the "end navigation" button shown in FIG. 21A(b), for another example, the voice button and the input box 2204 that are shown in FIG. 22(*b*). In this embodiment, the user may perform an operation on the operable element in the live window in the medium window form, and the mobile phone may respond correspondingly to the operation of the user.

In an example, a specific implementation in which the mobile phone responds correspondingly to an operation performed by the user on an element in the live window in the medium window form may be as follows: After the mobile phone receives a corresponding user operation, for example, the operation 1, extracts, from an application window on a virtual screen, a small-window element that needs to be displayed in the live window in the medium window form, and performs a re-layout, the mobile phone may record a correspondence between a layout position of the small-window element in the live window in the medium window form and a position of a corresponding element in an original application window. In this way, after receiving an operation performed by the user on a small-window element in the live window in the medium window form, the mobile phone may determine, based on the recorded correspondence, a corresponding position of the small-window element in the original application window, and injects the operation of the user into an element at the position in the original application window. Then, the mobile phone may respond correspondingly. In addition, the mobile phone may further update a state of the corresponding small-window element in the live window in the medium window form based on a response result.

For example, with further reference to FIG. 19(*a*) and FIG. 19(*b*), after the play/pause button 1905 is extracted from an application window on a virtual screen and re-laid, a correspondence between a layout position of the play/pause button 1905 in the live window and a position of a corresponding play/pause button in an original application window is recorded. As shown in FIG. 19(*b*), the mobile phone receives an operation, for example, a tap operation, performed by the user on the play/pause button 1905. The mobile phone determines, based on the recorded correspondence, the corresponding position of the play/pause button 1905 in the original application window, and injects the tap operation of the user into an element corresponding to the position, that is, the play/pause button in the application window. In this way, the mobile phone may pause playing of the video in the video element, and update a state of the corresponding video element in the live window in the medium window form, that is, pause playing of the video. For another example, with further reference to FIG. 22(*a*) to FIG. 22(*c*), after the input box 2204 is extracted from an application window on a virtual screen and re-laid, a correspondence between a layout position of the input box 2204 in the live window and a position of a corresponding input box in an original application window is recorded. As shown in FIG. 22(*b*), the mobile phone receives an operation, for example, a tap operation, performed by the user on the input box 2204. The mobile phone determines, based on the recorded correspondence, the corresponding position of the input box 2204 in the original application window, and injects the tap operation of the user into an element corresponding to the position, that is, the input box in the application window. In this way, as shown in FIG. 22(*c*), the mobile phone may display an input method interface 2205 on the display screen of the mobile phone. The mobile phone may further update a state of the input box in the live window in the medium window form, for example, display a cursor in the input box. Then, the user may perform an operation in the input method interface 2205, to implement input in the live window in the medium window form.

The foregoing example is described by using an example in which the operable element in the live window in the medium window form is operated to implement corresponding control. In some other embodiments, for a scenario in which a video is played in the live window in the medium window form, in this embodiment, a corresponding gesture operation may also be supported in the live window, to implement control on the played video. For example, when the user slides the finger from bottom to top in the live window, the mobile phone may increase volume of the video played in the live window. When the user slides the finger from top to bottom in the live window, the mobile phone may decrease the volume of the video played in the live window. When the user slides the finger from left to right in the live window, the mobile phone may perform a fast-forward operation on the video played in the live window. When the user slides the finger from right to left in the live window, the mobile phone may perform a rewind operation on the video played in the live window. Specifically, after receiving a corresponding gesture operation, the mobile phone may inject the gesture operation into a video element in an original application window, so that the mobile phone responds correspondingly to the injected gesture operation, and updates and displays a response result in the live window in the medium window form.

In some embodiments, the foregoing examples are described by using an example in which the mobile phone changes the live window in the small window form and displays the live window in the medium window form after the operation 1 is performed on the live window in the small window form. In some other embodiments, after the mobile phone receives an operation 2 performed by the user on the live window in the small window form, the mobile phone may further display a close button and an enlarge button on the live window in the small window form. Functions of the close button and the enlarge button are the same as those of the close button and the enlarge button in the live window in the medium window form. The close button is used to close the live window. The enlarge button is used to enlarge the live window, that is, display the application window in the full-screen large window form. It should be noted that the operation 2 is specifically an operation different from the operation 1. For example, the operation 1 is a tap operation, and the operation 2 may be a double-tap operation. For another example, the operation 1 is a double-tap operation, and the operation 2 is a tap operation. In this embodiment, specific implementation forms of the operation 1 and the operation 2 are not specifically limited herein.

It should be noted that the foregoing embodiment is described by using an example in which the live window in the medium window form and the live window in the small window form include different small-window elements. In some other embodiments, small-window elements included in the live window in the medium window form and the live window in the small window form may alternatively be the same, and a difference lies in that the live window in the medium window form further includes one or more of a close button, an enlarge button, and a move button. In addition, in a scenario in which a small-window element in the live window in the medium window form is the same as or different from a small-window element in the live window in the small window form, one or more of a close button, an enlarge button, and a move button may be displayed within a preset time period after the user triggers switching from the live window displayed in the small window form to the live window in the medium window form. After the preset time period, these buttons may be hidden, and only a corresponding small-window element is displayed in the live window in the medium window form.

For ease of understanding, a process of changing the live window in the small window form to the live window in the medium window form is described below with reference to FIG. 24B(a) to FIG. 24B(d) and FIG. 24C(a) to FIG. 24C(e) by using an example in which small-window elements in the live window in the medium window form and the live window in the small window form are the same.

Figure 24B:
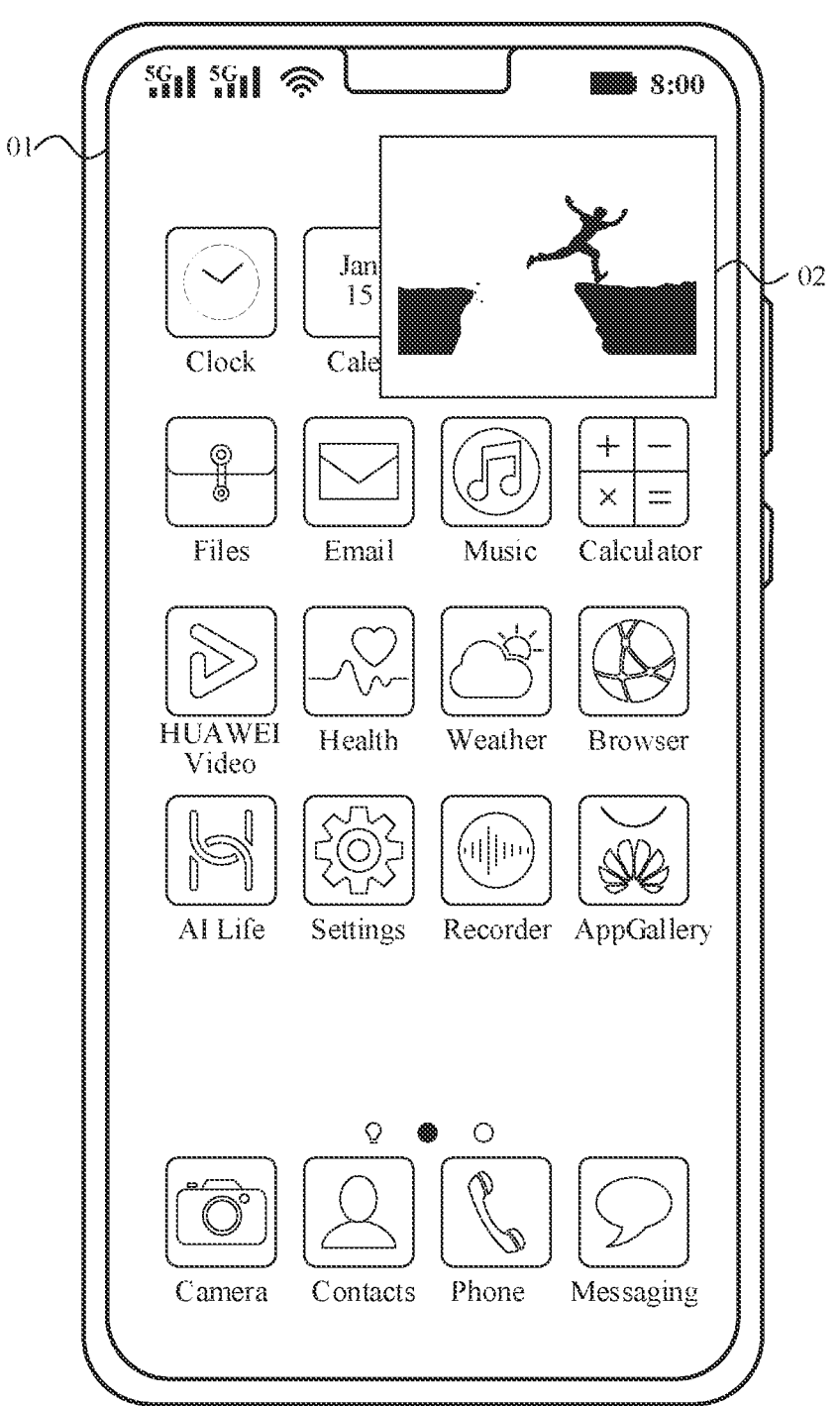
FIG. 24B(a) to FIG. 24B(d) are schematic diagrams of still another display interface according to an embodiment of this application.
Figure 24B:
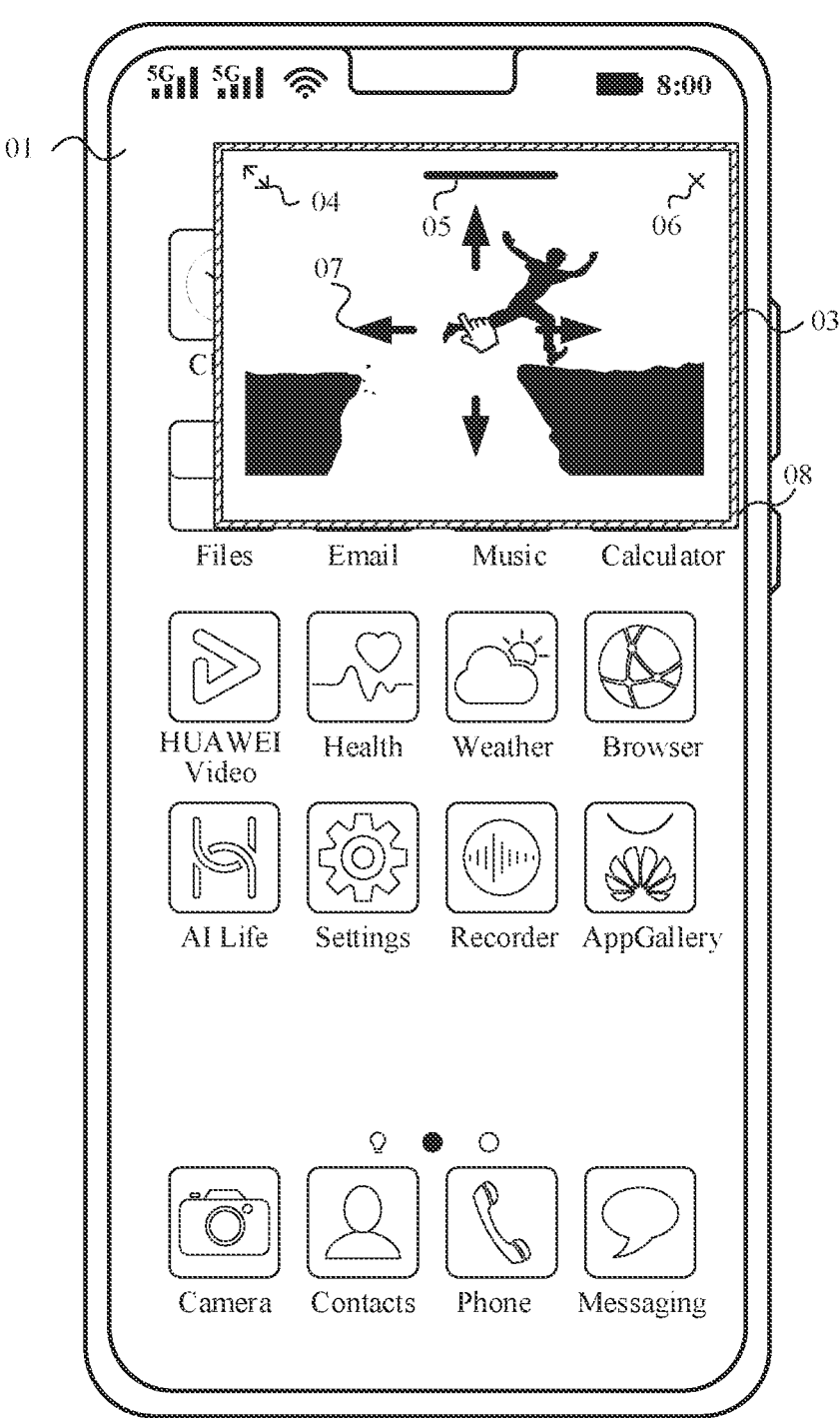
Figure 24B:
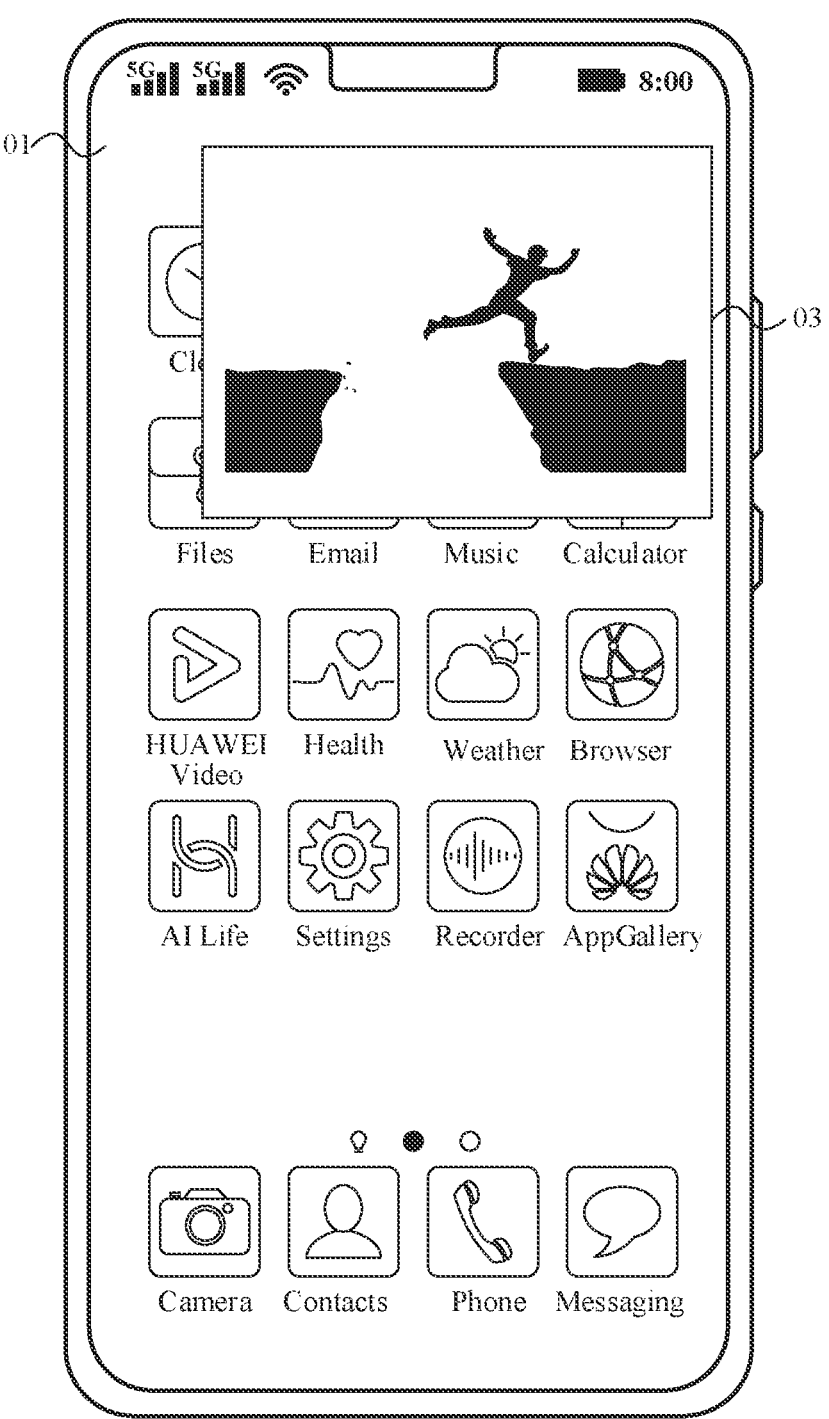
Figure 24B:
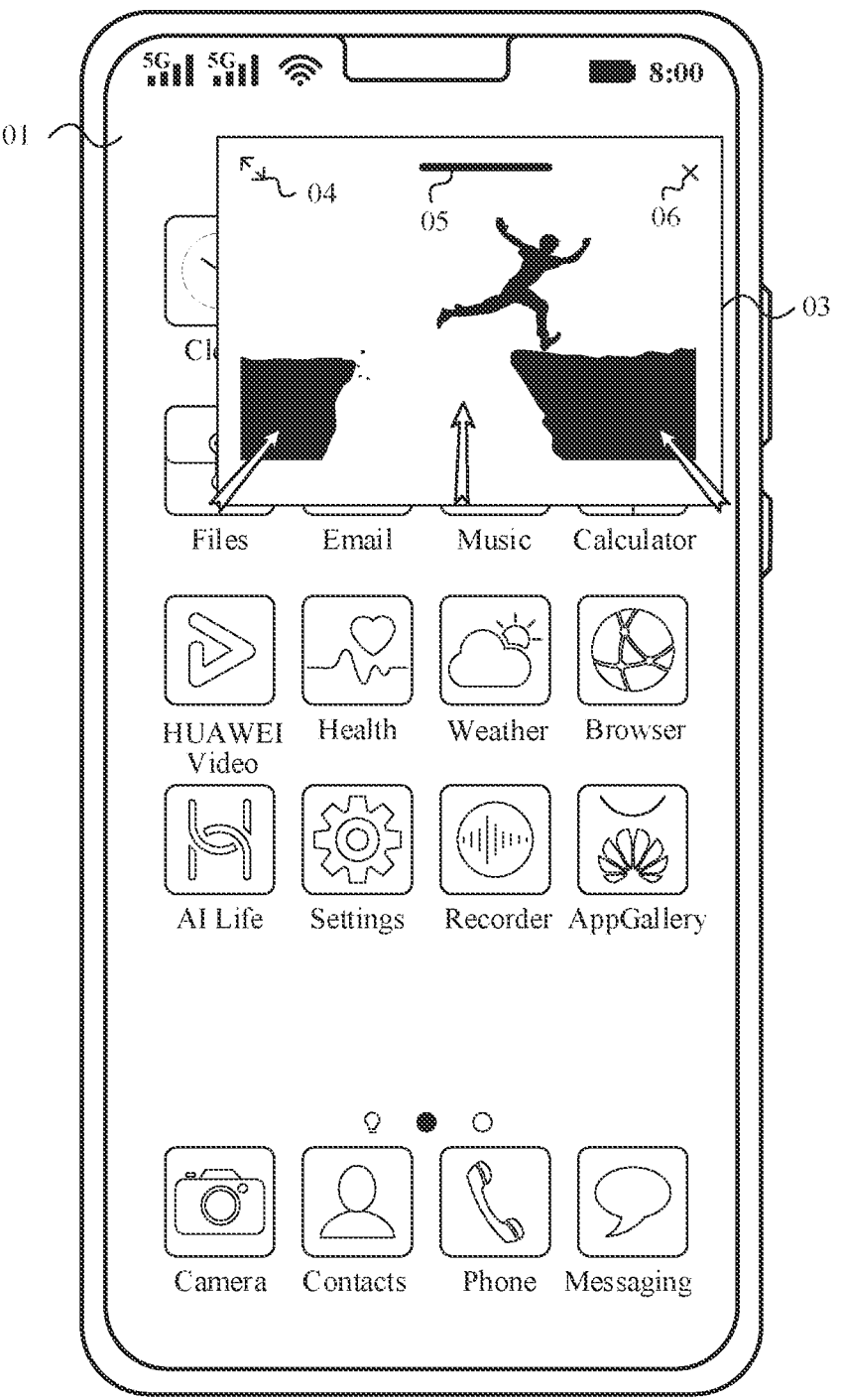

With reference to FIG. 24B(a) to FIG. 24B(d), for example, when the live window in the small window form is tapped, the mobile phone displays the live window in the medium window form. As shown in FIG. 24B(a), the mobile phone displays a desktop 01, and displays a live window 02 in a small window form on the desktop 01. The mobile phone receives a tap operation performed by the user on the live window in the small window form. In response to the tap operation, as shown in FIG. 24B(b), the mobile phone displays a live window 03 in a medium window form on the desktop 01. The live window 03 in the medium window form includes a close button 06, an enlarge button 04, and a move button 05. The live window 03 in the medium window form further includes an operation prompt 07, to prompt the user that an upward sliding operation, a downward sliding operation, a leftward sliding operation, or a rightward sliding operation may be performed on the live window 03, to operate the live window 03. For example, a video is played in the live window 03. When the user slides the finger upward in the live window 03, the mobile phone may increase volume of the video played in the live window 03. When the user slides the finger downward in the live window 03, the mobile phone may decrease the volume of the video played in the live window 03. When the user slides the finger rightward in the live window 03, the mobile phone may perform a fast-forward operation on the video played in the live window 03. When the user slides the finger leftward in the live window 03, the mobile phone may perform a rewind operation on the video played in the live window 03. The mobile phone may further display prompt information 08 around the live window 03 in the medium window form, for example, display a color (for example, blue) stroke around edges of the live window 03. Then, if the user does not perform any operation for a preset time period, for example, 3s, the close button 06, the enlarge button 04, and the move button 05 on the live window 03 in the medium window form disappear and are not displayed, and the operation prompt 07 and the prompt information 08 are not displayed. As shown in FIG. 24B(c), the mobile phone only plays the video in the live window 03 in the medium window form. After the mobile phone only plays the video in the live window 03 in the medium window form, if the user performs a tap operation on the live window 03 in the medium window form, as shown in FIG. 24B(d), the mobile phone may display the close button 06, the enlarge button 04, and the move button 05 in the live window 03 in the medium window form on the desktop 01 again, and may further display the prompt information 08 around the live window 03 in the medium window form again. When the mobile phone displays the live window 03 shown in FIG. 24B(d), if no user operation is received within a preset time period, for example, 3s, the mobile phone may only play the video in the live window 03 in the medium window form, as shown in FIG. 24B(c). When the mobile phone displays the live window 03 shown in FIG. 24B(d), if the mobile phone receives an operation (the operation may be a fourth operation in embodiments of this application) performed by the user from a lower left corner, a lower right corner, or a bottom edge of the live window 03 in the medium window form to a center of the live window 03, as shown in FIG. 24B(a), the mobile phone may display the live window 02 in the small window form again. It should be noted that the operation prompt 07 included in the live window in the medium window form may be displayed only when the live window in the medium window form is displayed for the first time, and the operation prompt 07 is not displayed when the live window in the medium window form is not displayed for the first time.

Figure 24C:
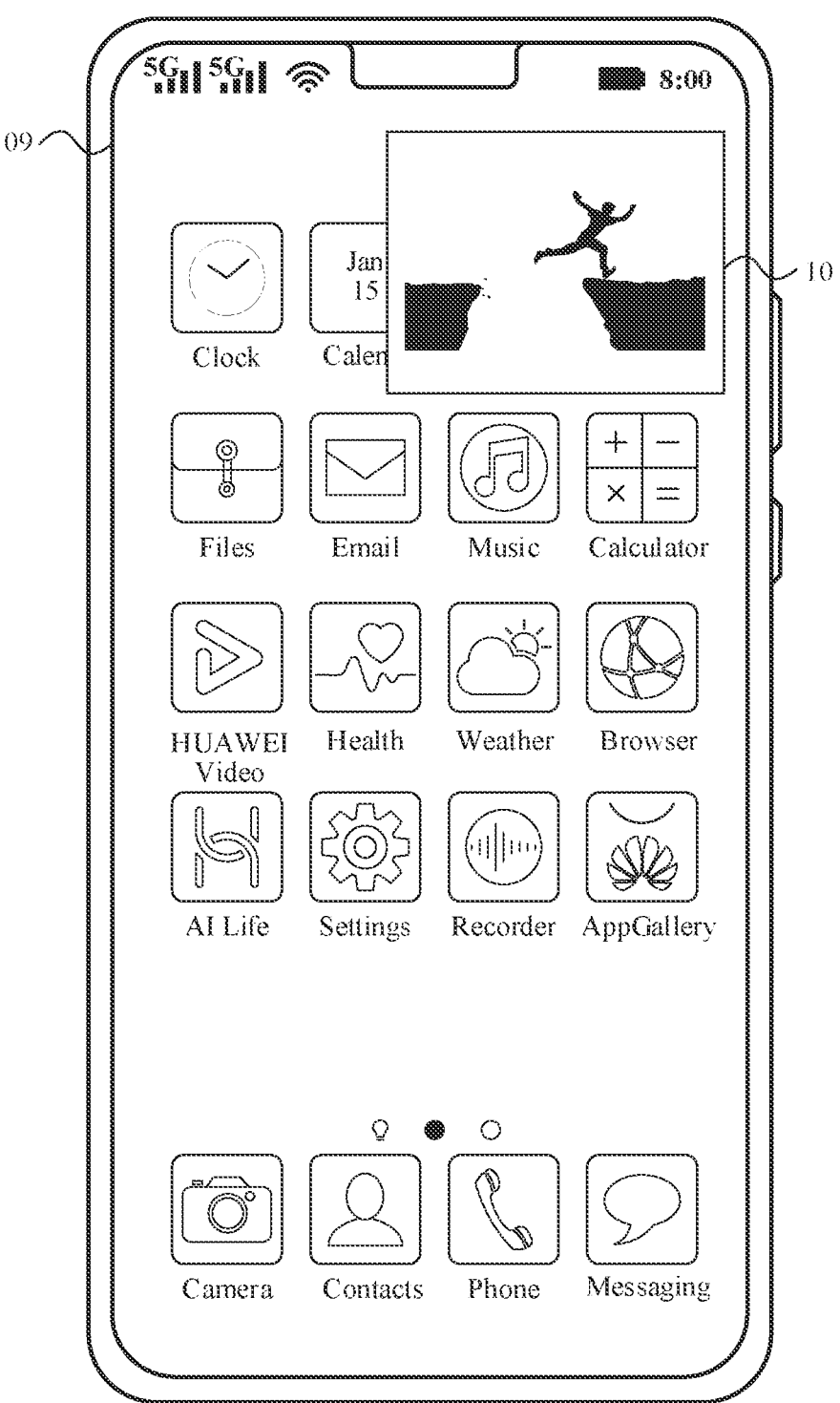
FIG. 24C(a) to FIG. 24C(e) are schematic diagrams of still another display interface according to an embodiment of this application.
Figure 24C:
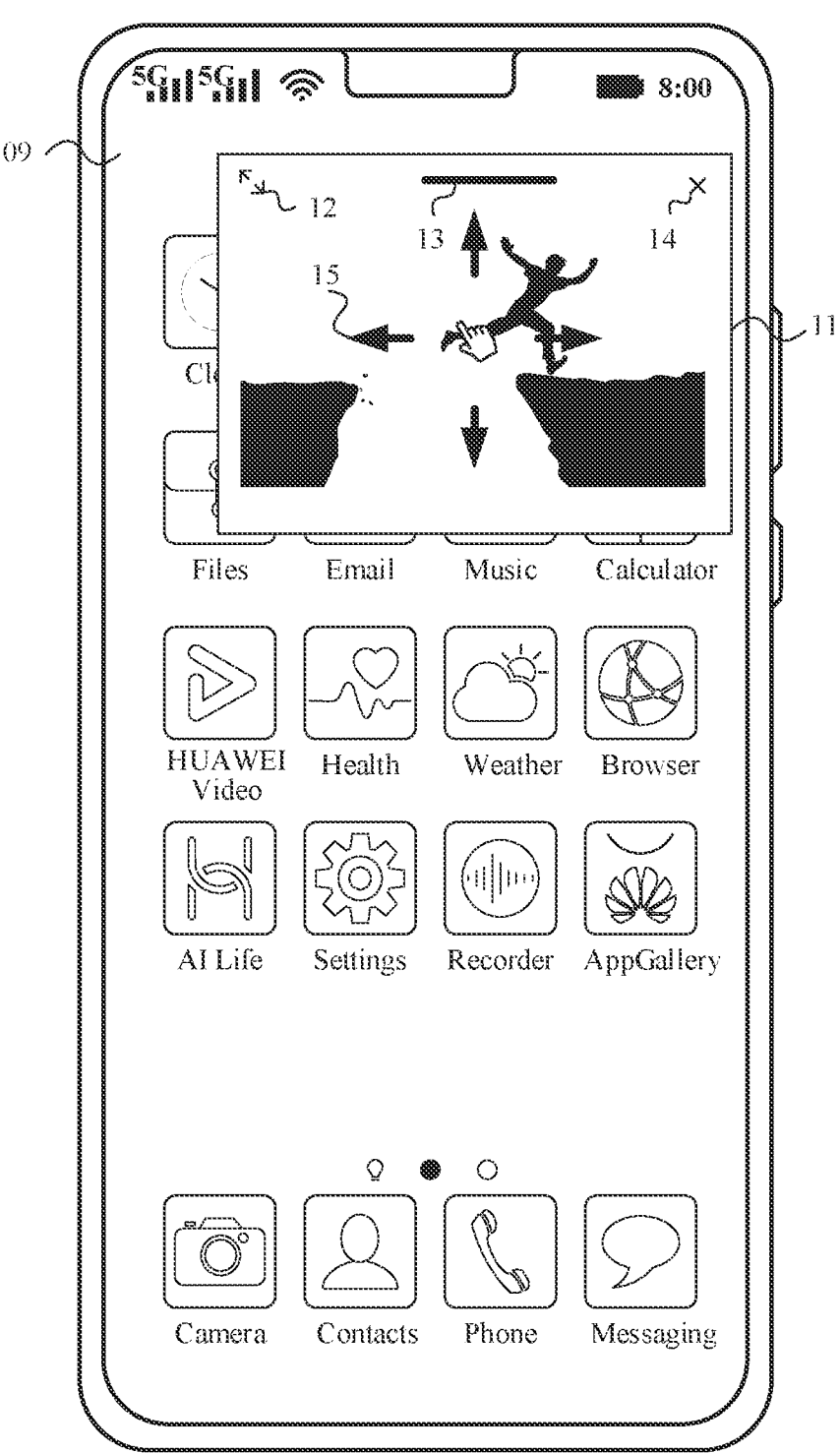
Figure 24C:
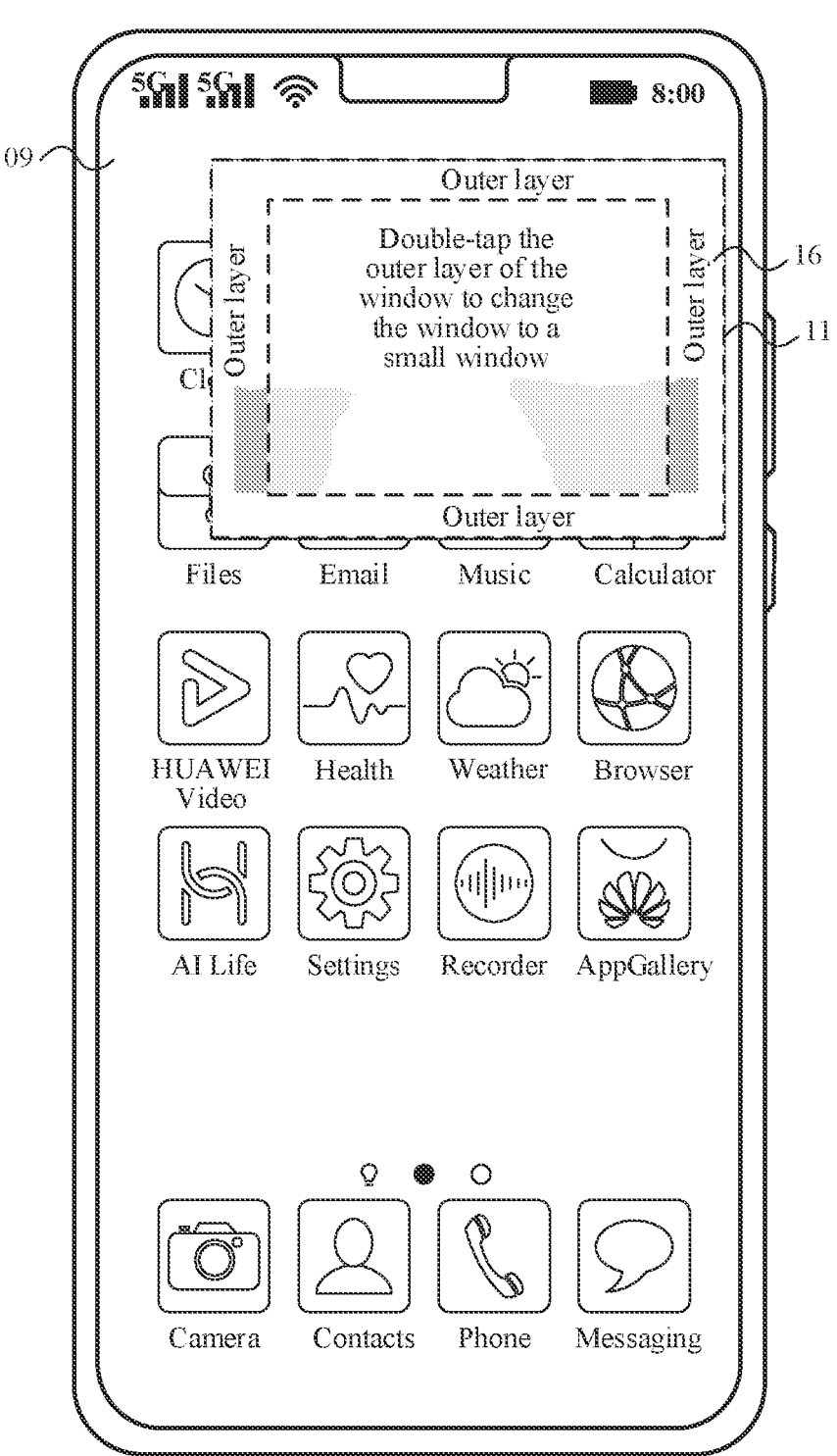
Figure 24C:
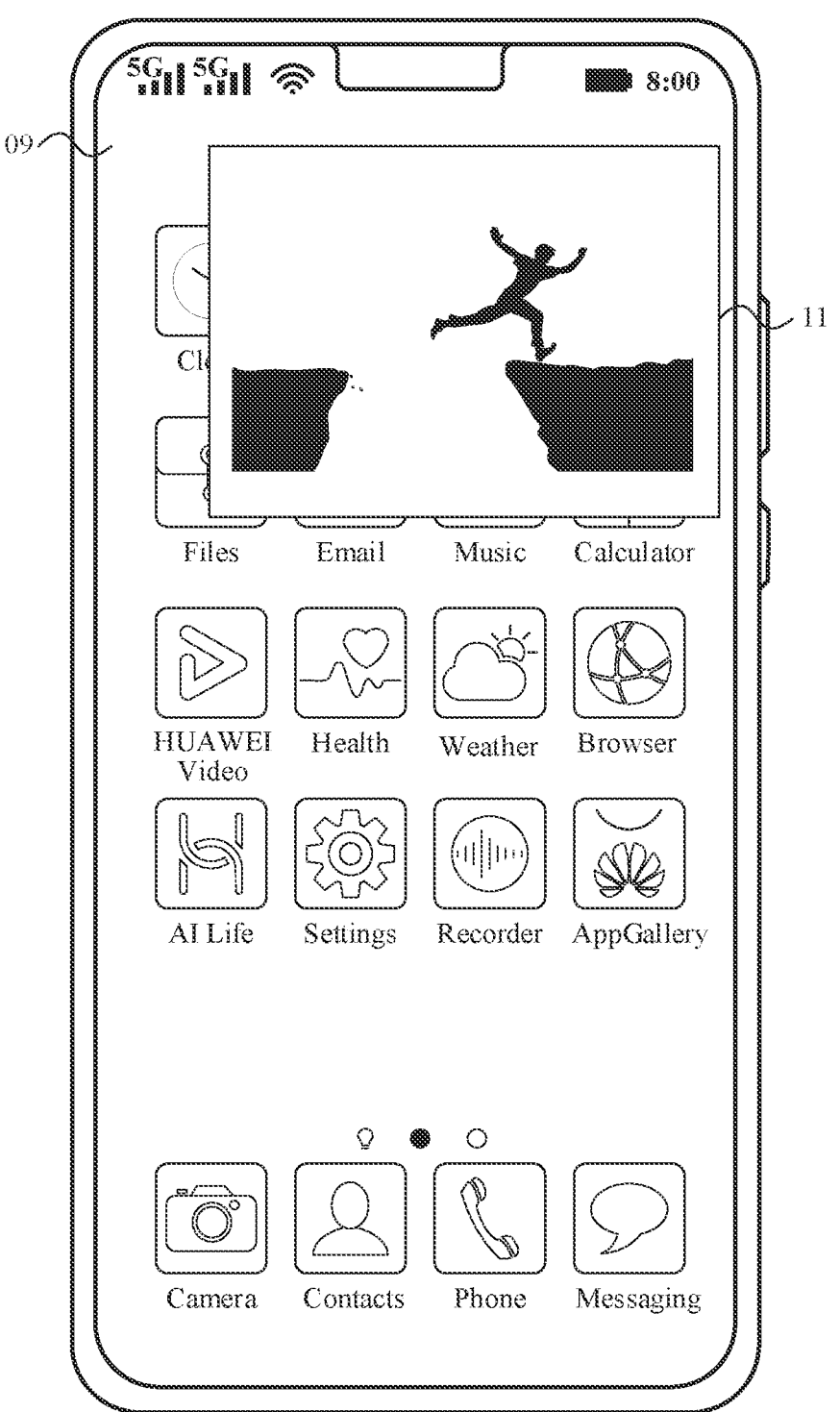
Figure 24C:
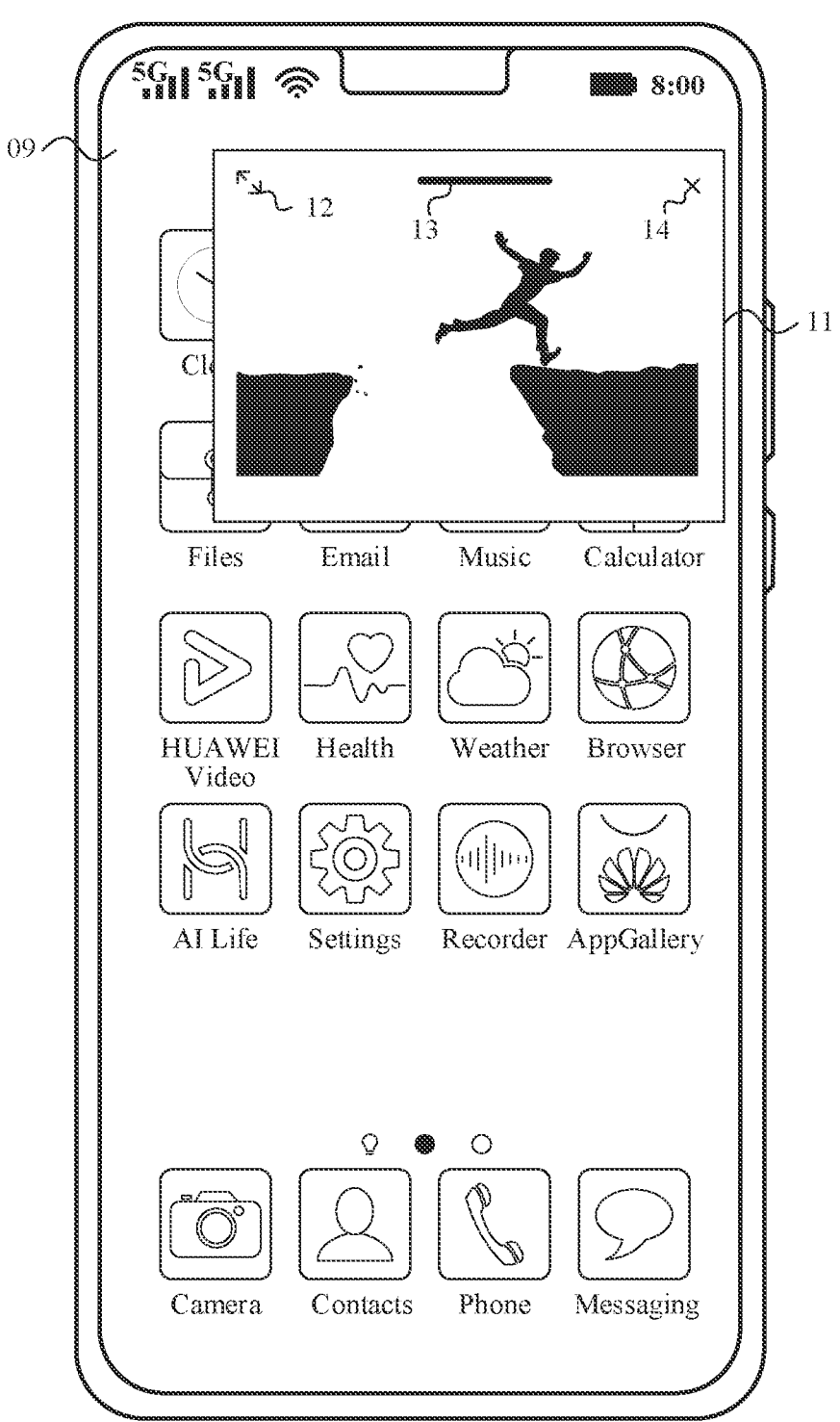

With reference to FIG. 24C(a) to FIG. 24C(e), for example, when the live window in the small window form is double-tapped, the mobile phone displays the live window in the medium window form. As shown in FIG. 24C(a), the mobile phone displays a desktop 09, and displays a live window 10 in a small window form on the desktop 09. The mobile phone receives a double-tap operation performed by the user on the live window in the small window form. In response to the double-tap operation, as shown in FIG. 24C(b), the mobile phone displays a live window 11 in a medium window form on the desktop 09. The live window 11 in the medium window form includes a close button 14, an enlarge button 12, and a move button 13. The live window 11 in the medium window form further includes an operation prompt 15, to prompt the user that an upward sliding operation, a downward sliding operation, a leftward sliding operation, or a rightward sliding operation may be performed on the live window 11, to operate the live window 11. Then, if the user does not perform any operation for a preset time period, for example, 3s, the close button 14, the enlarge button 12, and the move button 13 in the live window 11 in the medium window form disappear and are not displayed, the operation prompt 15 is not displayed, and as shown in FIG. 24C(c), the mobile phone displays an operation prompt 16 on the live window 11 in the medium window form. The operation prompt 16 is used to prompt the user that an outer layer of the live window 11 may be double-tapped to trigger the mobile phone to display the live window in the small window form. In addition, an area in which the outer layer is located is displayed. After the mobile phone displays the live window 11 in the medium window form shown in FIG. 24C(c), if the user does not perform any operation for a preset time period, for example, 3s, as shown in FIG. 24C(d), the mobile phone only plays a video in the live window 11 in the medium window form. After the mobile phone only plays the video in the live window 11 in the medium window form, if the user performs a tap operation on the live window 11 in the medium window form, as shown in FIG. 24C(e), the mobile phone may display the close button 14, the enlarge button 12, and the move button 13 in the live window 11 in the medium window form on the desktop 09 again. When the mobile phone displays the live window 11 shown in FIG. 24C(e), if no user operation is received within a preset time period, for example, 3s, the mobile phone may only play the video in the live window 11 in the medium window form, as shown in FIG. 24C(d). When the mobile phone displays the live window 11 shown in FIG. 24C(e) or FIG. 24C(d), after the mobile phone receives a double-tap operation (the operation may a fourth operation in embodiments of this application) performed by the user on the outer layer of the live window 11 in the medium window form, as shown in FIG. 24C(a), the mobile phone may display the live window 10 in the small window form again. It should be noted that the operation prompt 15 and the operation prompt 16 that are included in the live window in the medium window form may be displayed only when the live window in the medium window form is displayed for the first time, and are not displayed when the live window in the medium window form is not displayed for the first time.

S706: The mobile phone receives a user operation of dragging the live window, and moves the live window.

After the mobile phone displays the live window in the small window form or the live window in the medium window form, after receiving a user operation of dragging the live window by the user, the mobile phone may display, on the display screen of the mobile phone, an animation in which the live window moves. The user operation of dragging the live window may be a touchscreen gesture operation. For example, the touchscreen gesture operation may be an operation of pressing and moving the live window. In other words, the user may drag the live window on the display screen of the mobile phone by pressing the live window and moving the finger.

In some embodiments, after the user presses the live window and moves the finger so that the live window moves on the display screen, if the user releases the finger, the mobile phone may automatically attach and display the live window on an edge of the display screen based on a position of the live window on the display screen after the user releases the finger. For example, with reference to FIG. 17, the live window is the live window in the small window form, and the user operation of dragging the live window is an operation of pressing and moving the live window. As shown in FIG. 17, after the user performs the user operation in S701, the mobile phone may display the live window 1701 at an upper right corner of the display screen of the mobile phone. Then, after the mobile phone receives an operation of pressing and moving the live window 1701 by the user, the mobile phone may display, on the display screen of the mobile phone, an animation in which the live window moves. After the live window is dragged, if the user releases the finger within a range close to a movable position 1 shown in FIG. 17, the mobile phone may automatically attach and display the live window 1701 at a position shown by the movable position 1. Similarly, after the live window is dragged, if the user releases the finger within a range close to a movable position 2 shown in FIG. 17, the mobile phone may automatically attach and display the live window 1701 at a position shown by the movable position 2. If the user releases the finger within a range close to a movable position 3 shown in FIG. 17, the mobile phone may automatically attach and display the live window 1701 at a position shown by the movable position 3. Similarly, the live window in the medium window form may also move on the display screen of the mobile phone in response to a drag operation of the user. For example, the user may press a move button in the live window in the medium window form, for example, the move button 1909 shown in FIG. 19(b), and move the finger, to trigger the live window in the medium window form to move on the display screen of the mobile phone. After the user releases the finger, the mobile phone may also attach the live window in the medium window form to an edge of the display screen based on a position of the live window in the medium window form on the display screen when the user releases the finger.

In some other embodiments, after the mobile phone displays the live window (for example, the live window in the small window form or the live window in the medium window form), the user may perform a corresponding operation, to trigger the mobile phone to display the multi-task interface or a split-screen interface. In the multi-task interface or the split-screen interface, after the user presses the live window and moves the finger so that the live window moves on the display screen, if the user stops moving the finger on an application window (the application window may be an application window of a second application in embodiments of this application) in the multi-task interface or the split-screen interface so that the live window hovers over the application window, the mobile phone may enlarge the application window and display the application window on the display screen of the mobile phone.

Further, if the application window displayed in this case is a window of an application such as Notepad, a document editor, Files, or an instant messaging application, the mobile phone may further display a prompt to prompt the user whether to insert the live window into the application window. If an operation of choosing to insert (for example, the operation may be a drag release operation in embodiments of this application) is received from the user, the live window may be converted into a resource file (for example, a picture, a video, or a link), and then inserted into the application window. After the live window is converted into the resource file and inserted into the application window, the live window may continue to be displayed on the display screen of the mobile phone in a floating manner, or may be automatically closed. If an operation of choosing not to insert is received from the user, the live window may continue to be displayed on the display screen of the mobile phone in a floating manner. If the displayed application window is not the window of the application, after the user releases the finger, the live window may continue to be displayed on the display screen of the mobile phone in a floating manner.

Figures 25A, 25B:
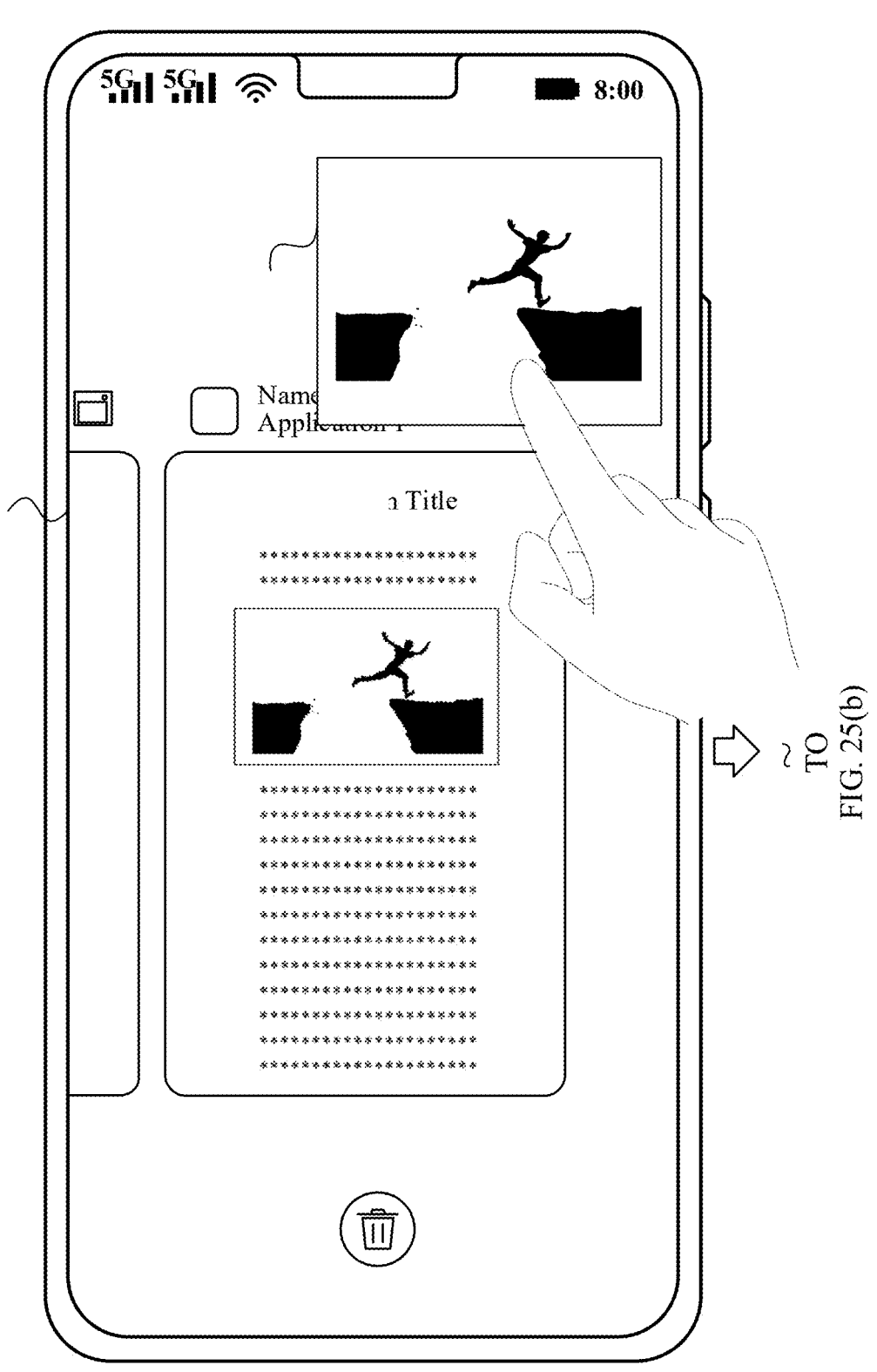
FIG. 25(a) to FIG. 25(e) are schematic diagrams of still another display interface according to an embodiment of this application.
Figure 25B:
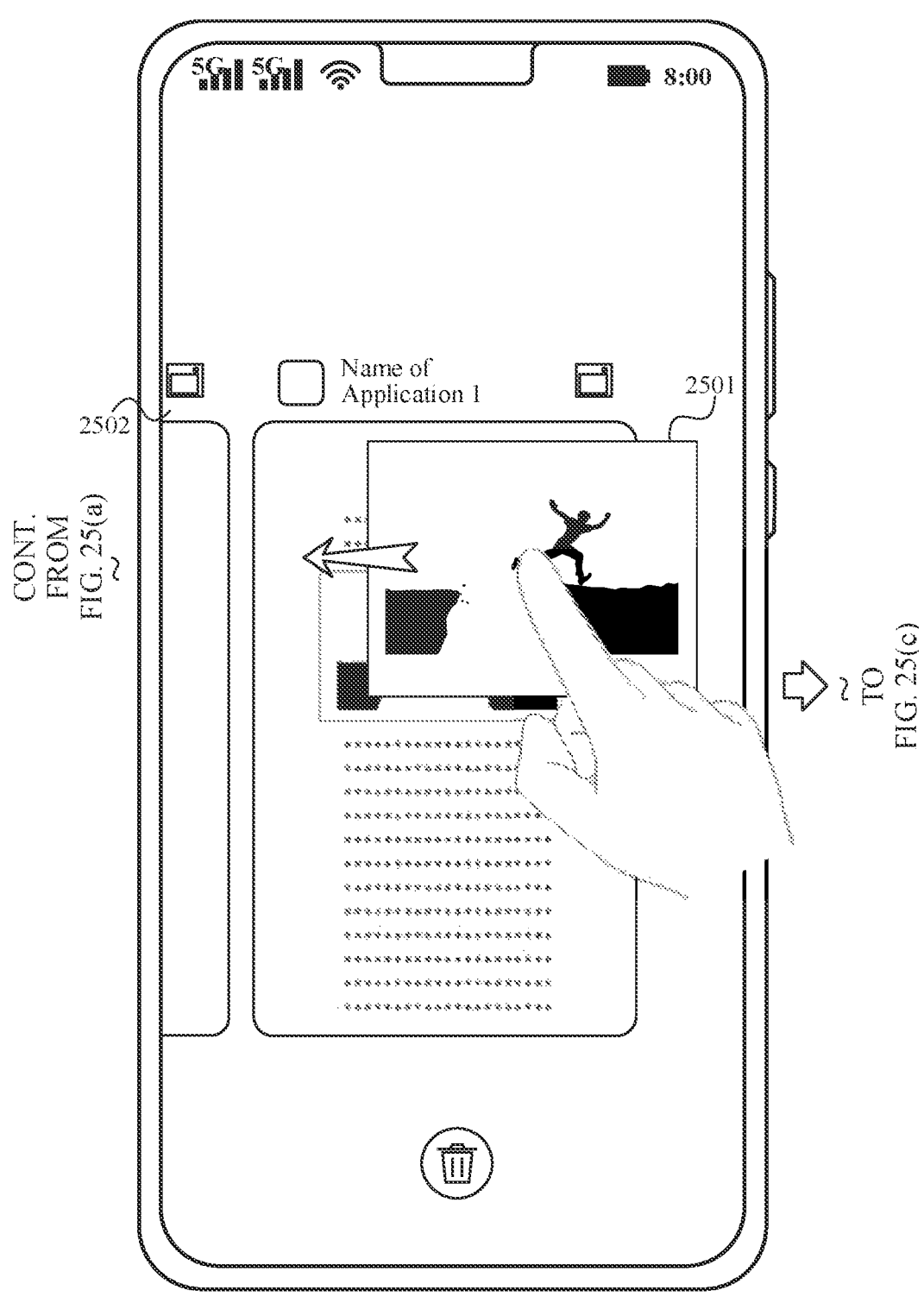
Figure 25C:
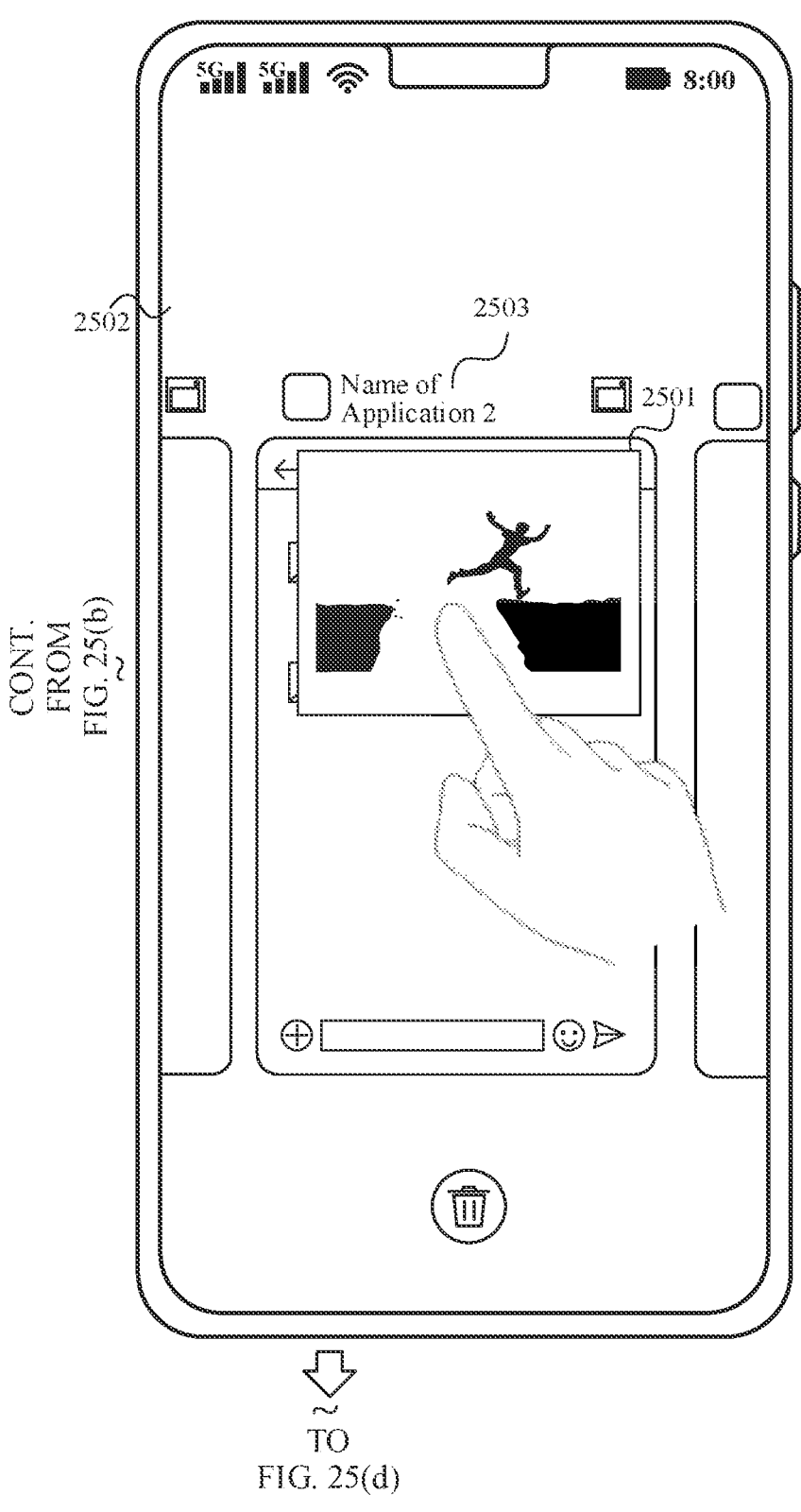
Figure 25D:
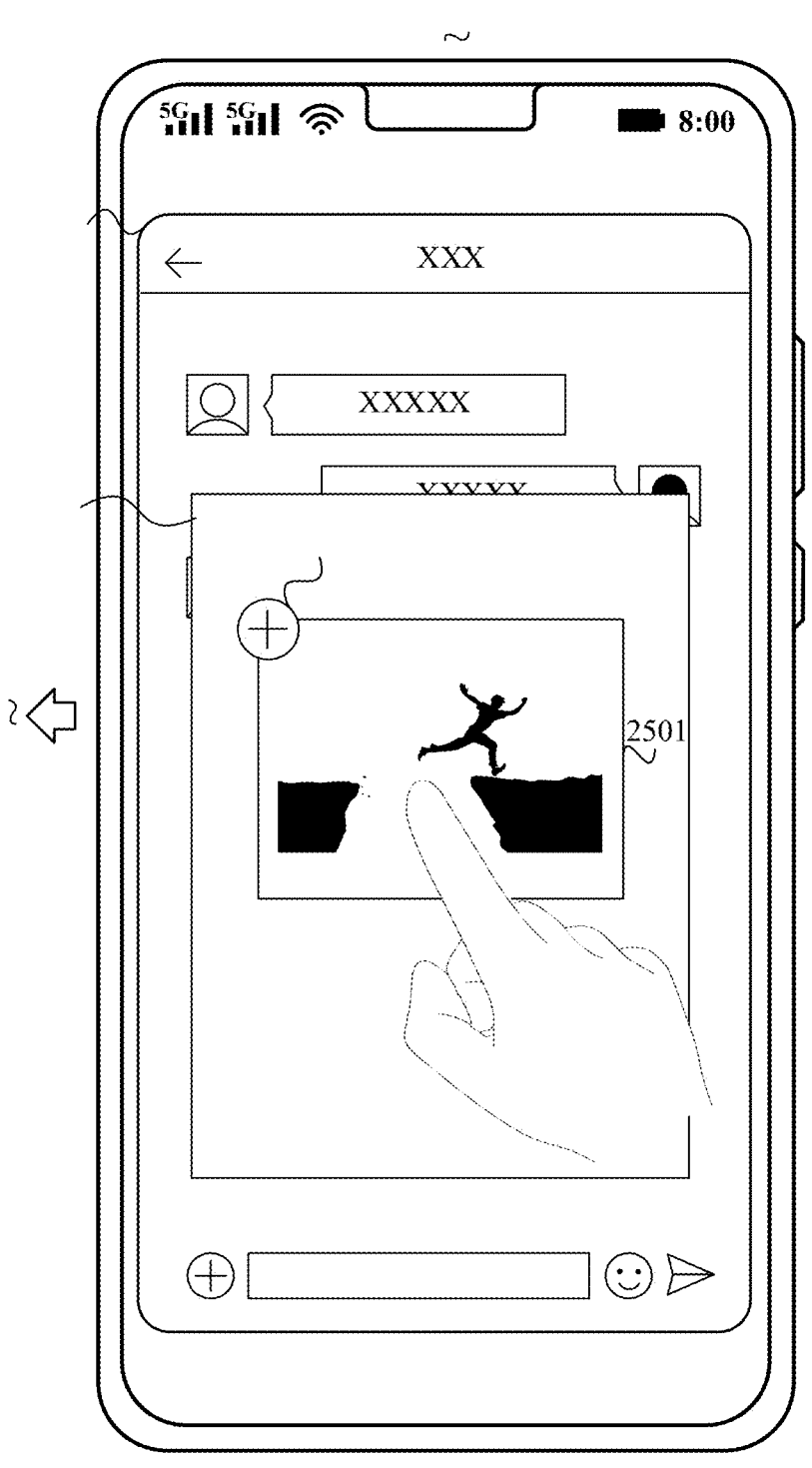
Figures 25D, 25E:
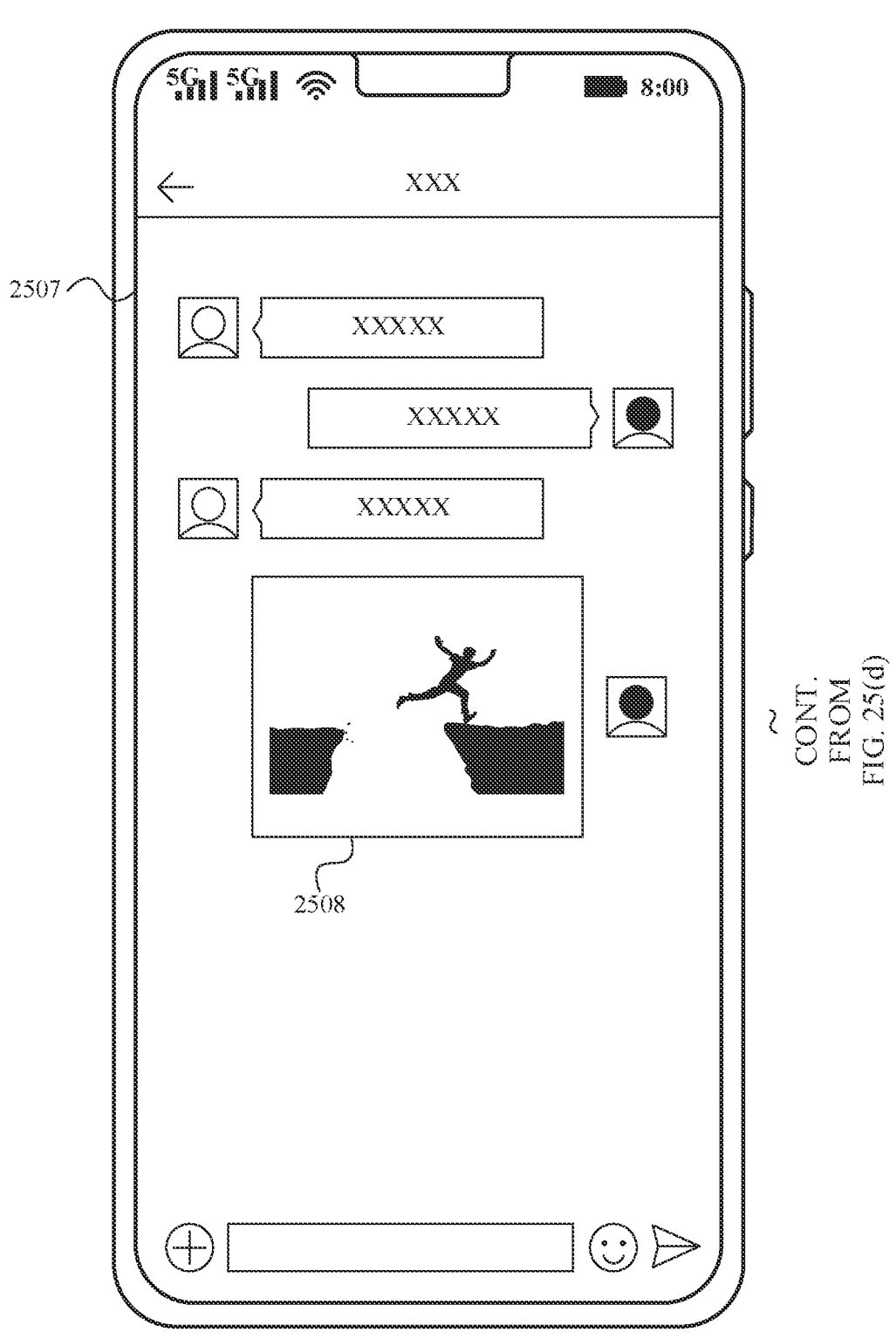
Figure 26A:
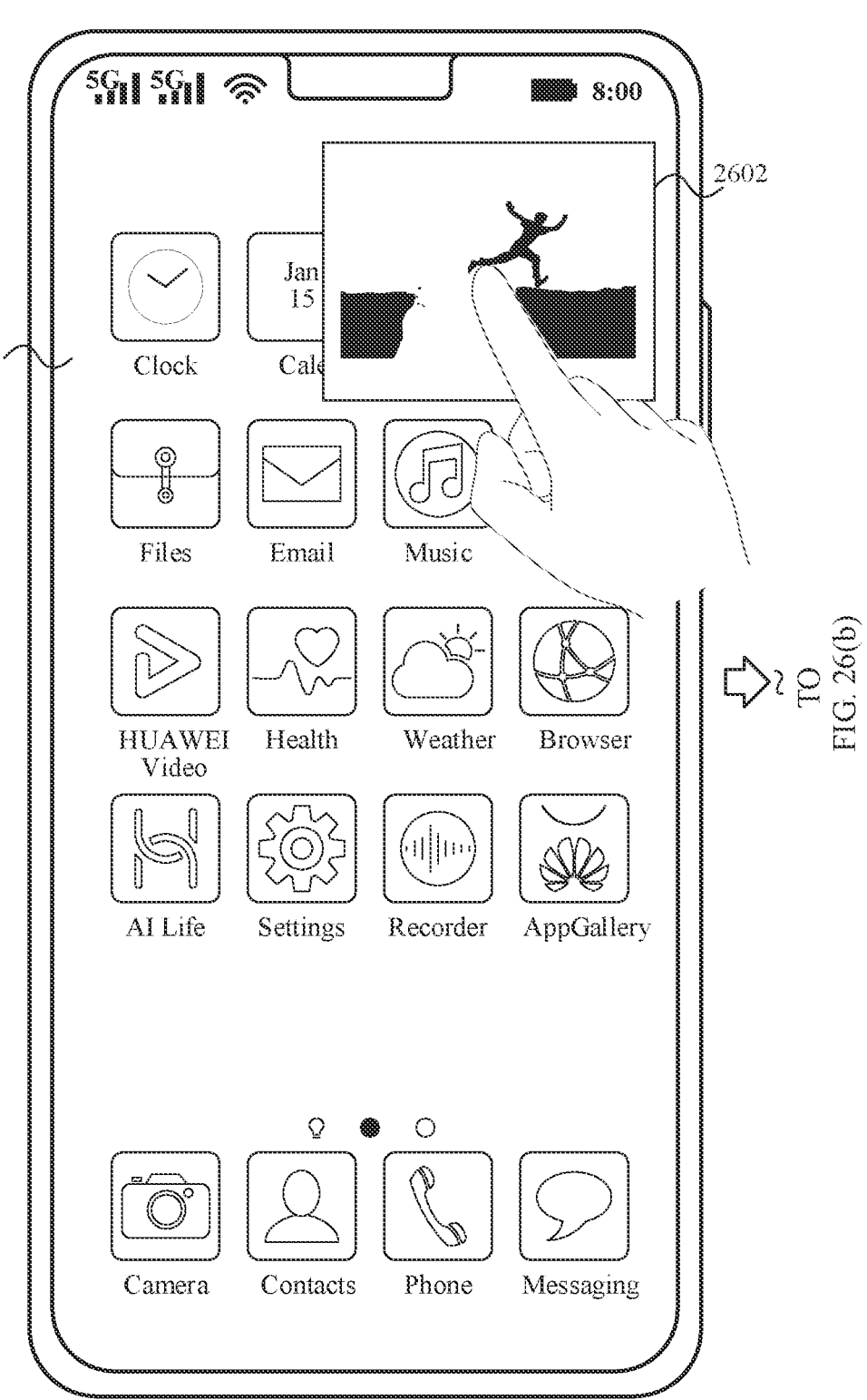
FIG. 26(a) to FIG. 26(d) are schematic diagrams of still another display interface according to an embodiment of this application.
Figure 26B:
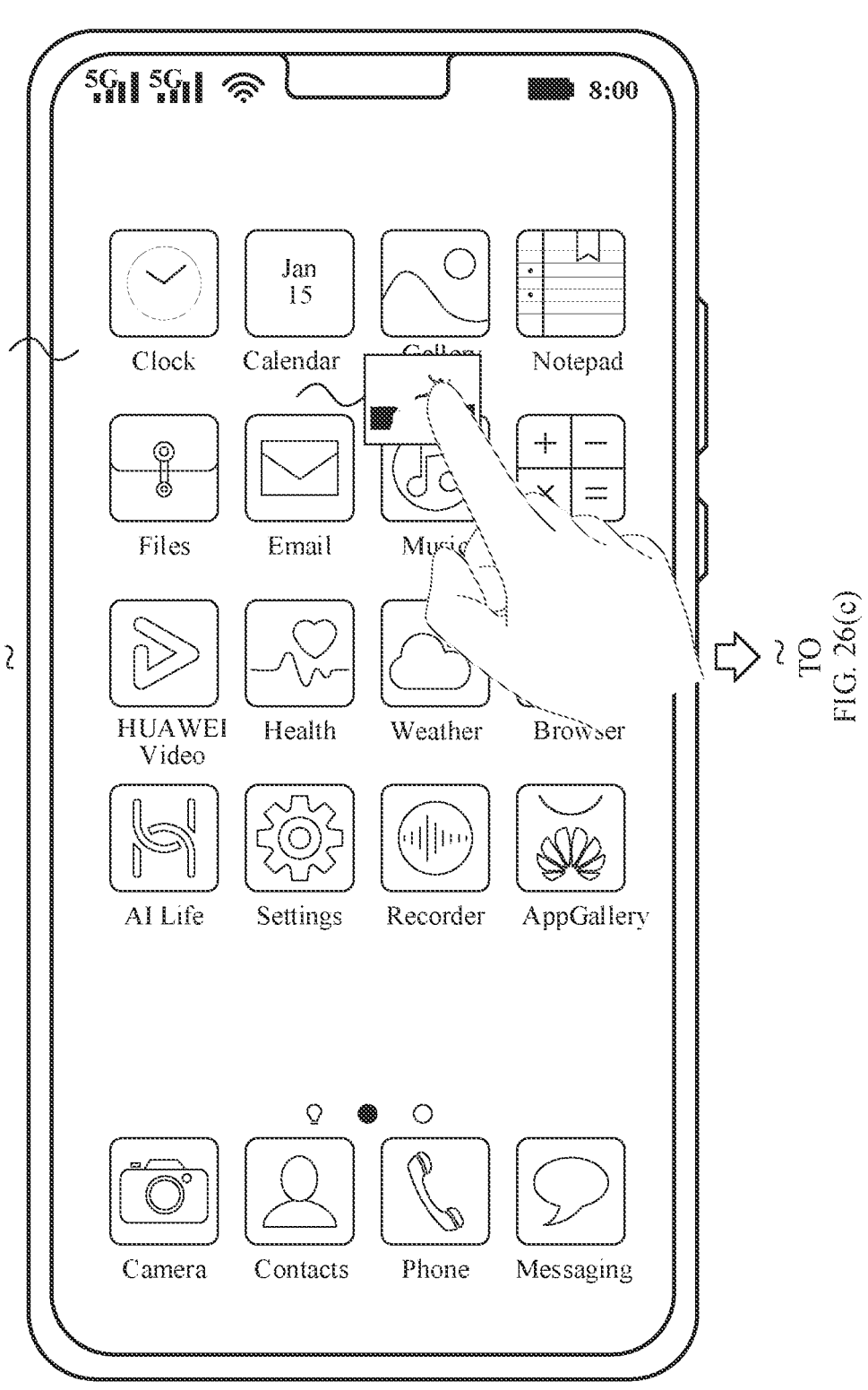
Figure 26C:
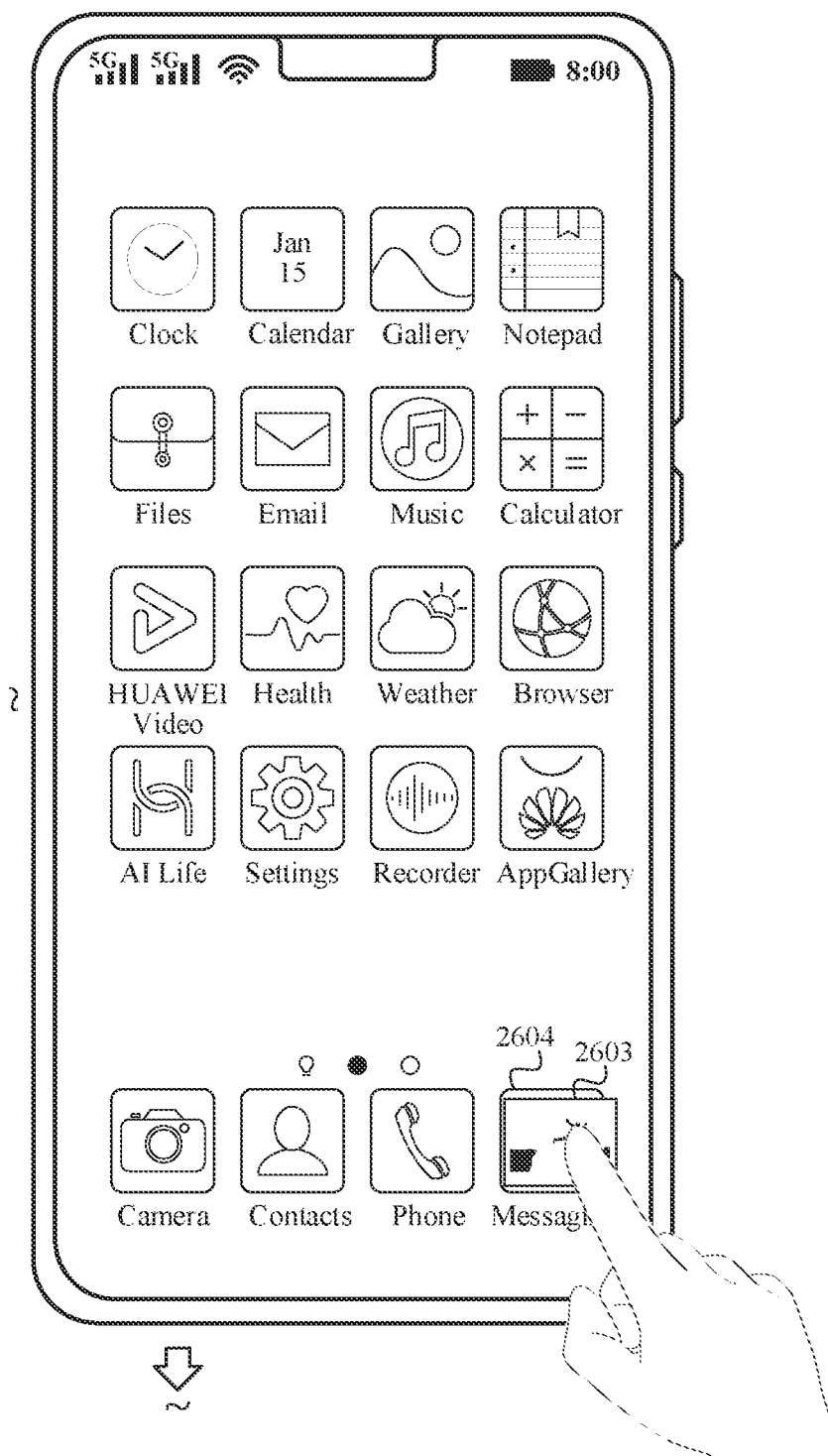
Figure 26D:
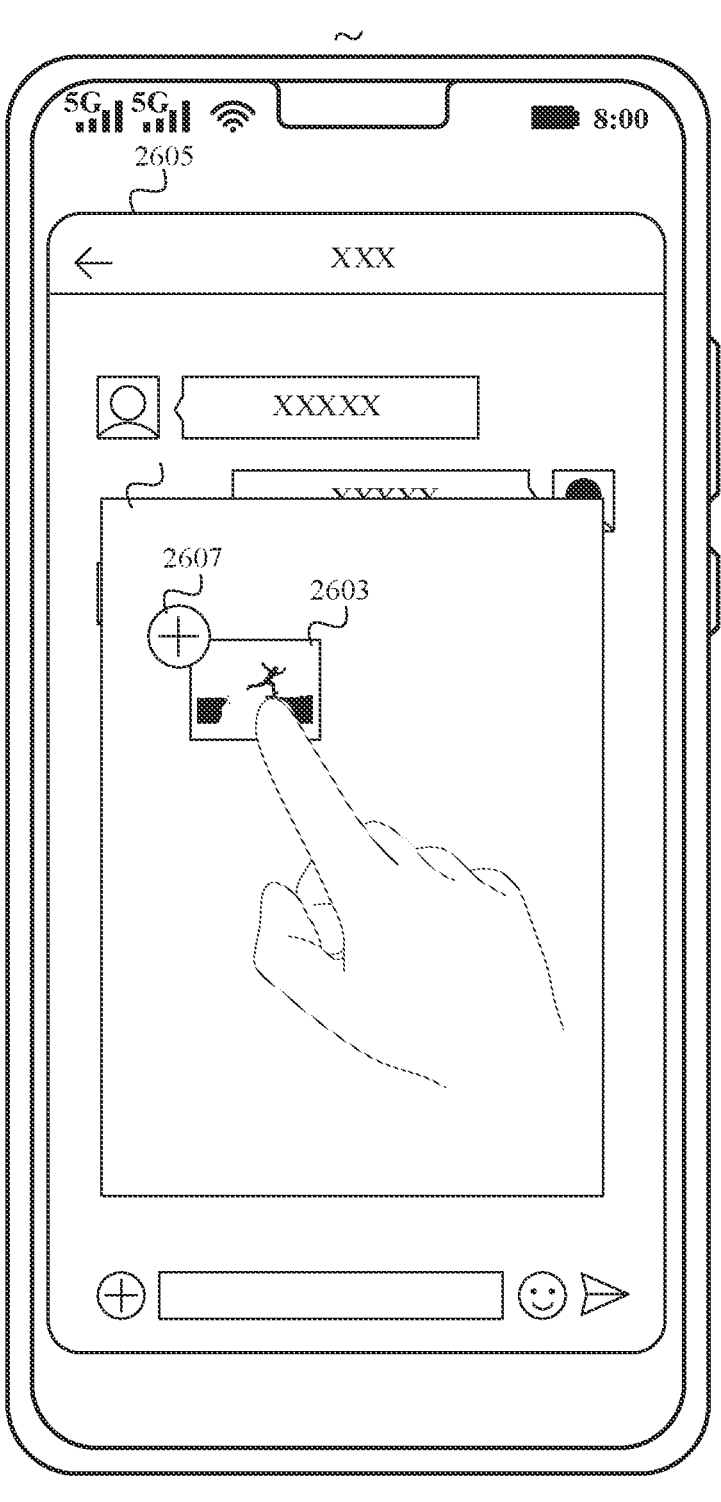

For example, with reference to FIG. 25(a) to FIG. 25(e), the live window is the live window in the small window form. As shown in FIG. 25(a), the display screen of the mobile phone displays a live window 2501. The user performs a corresponding operation, for example, a sliding operation starting from the lower edge of the display screen of the mobile phone and pointing to the upper edge of the display screen of the mobile phone with the finger or the stylus temporarily not lifted after the sliding, to trigger the mobile phone to display a multi-task interface 2502 on the display screen of the mobile phone. The mobile phone receives an operation of pressing the live window 2501 and moving the finger by the user. In response to the operation, the mobile phone may display an animation in which the live window 2501 moves with the user finger. After the live window 2501 moves to a position of an application window thumbnail in the multi-task interface 2502, if the user continues to move the finger so that the live window 2501 continues to move, as the live window 2501 moves, the mobile phone may switch between application window thumbnails in the multi-task interface 2502 that are displayed on the display screen of the mobile phone. As shown in FIG. 25(*b*), when the live window 2501 moves to a position of an application window thumbnail in the multi-task interface 2502, the user finger slides leftward. As the user finger slides, as shown in FIG. 25(*c*), the mobile phone switches from an application window thumbnail of an application 1 displayed in the multi-task interface 2502 to an application window thumbnail 2503 of an application 2. If the user stops moving the finger in this case so that the live window 2501 hovers over the application window thumbnail 2503 of the application 2, as shown in FIG. 25(*d*), the mobile phone may display an application window 2504 of the application 2. In FIG. 25(*d*), for example, the application window 2504 of the application 2 is enlarged but not displayed in full screen. In some other embodiments, the application window 2504 of the application 2 may alternatively be displayed in full screen.

Further, for example, the application window 2504 is an application window of an instant messaging application. As shown in FIG. 25(*d*), the mobile phone may further display a prompt area 2505, to prompt the user whether to insert the live window 2501 into the application window 2504. If an operation of choosing to insert, for example, an operation of dragging the live window 2501 into the prompt area 2505 and lifting the finger, is received from the user, the mobile phone may convert the live window 2501 into a resource file, and then insert the resource file into the application window. As shown in FIG. 25(*e*), after the user lifts the finger, the mobile phone displays an application window 2507 in full screen, converts the live window 2501 into a resource file, and then sends the resource file. The mobile phone may further display a prompt 2508 of a sent message. In addition, after the live window 2501 is converted into the resource file and inserted into the application window, live window 2501 is automatically closed and is not displayed on the display screen of the mobile phone. After the live window 2501 is dragged to the prompt area 2505, the mobile phone may further display a prompt indicating that the live window 2501 is releasable, for example, a plus sign 2506, on the live window 2501 (for example, at an upper left corner), to prompt the user that after the user releases the hand, the live window 2501 is triggered to be converted into a resource file and inserted into the application window. After the live window 2501 is dragged out of the prompt area 2505, the prompt indicating that the live window 2501 is releasable may disappear. In this case, if the user lifts the finger, the live window 2501 is automatically attached to an edge of the display screen of the mobile phone.

Similarly, in a scenario in which the mobile phone displays the live window (for example, the live window in the small window form or the live window in the medium window form) on the desktop, after the user presses the live window and moves the finger so that the live window moves on the display screen, if the user stops moving the finger on an icon of an application on the desktop so that the live window hovers over the icon of the application, the mobile phone may open the application, and display a corresponding application window. If the displayed application window is a window of an application such as Notepad, a document editor, Files, or an instant messaging application, the user may also choose to convert the live window into a resource file and insert the resource file into the application window.

For example, with reference to FIG. 26(*a*) to FIG. 26(*d*), the live window is the live window in the small window form. As shown in FIG. 26(*a*), the display screen of the mobile phone displays a desktop 2601, and a live window 2602 is displayed on the desktop 2601. The mobile phone receives an operation of pressing the live window 2602 and moving the finger by the user. As shown in FIG. 26(*b*), in response to the operation, the mobile phone may display a shrunk live window 2603, and display an animation in which the live window 2603 moves. As shown in FIG. 26(*c*), when the live window 2603 moves to a position of an icon of an application on the desktop, for example, an icon 2604 of Messaging, if the user stops moving the finger so that the live window 2603 hovers over the icon 2604 of Messaging, as shown in FIG. 26(*d*), the mobile phone may display an application window 2605 of Messaging. Further, as shown in FIG. 26(*d*), the mobile phone may further display a prompt area 2606, to prompt the user whether to insert the live window 2603 into the application window 2605. If an operation of dragging the live window 2603 into the prompt area 2606 and lifting the finger by the user is received, the mobile phone may convert the live window 2603 into a resource file, and then insert the resource file into the application window. In addition, after the live window 2603 is dragged to the prompt area 2606, the mobile phone may further display a prompt indicating that the live window 2603 is releasable, for example, a plus sign 2607, on the live window 2603 (for example, at an upper left corner), to prompt the user that after the user releases the hand, the live window 2603 is triggered to be converted into a resource file and inserted into the application window. If the user does not want to insert the live window 2603 into the application window 2605, the user may drag the live window 2603 to another area outside the prompt area 2606 and lift the finger. In response to the operation of the user, the mobile phone may enlarge the shrunk live window 2603 and then display the live window on the display screen again, as shown in FIG. 26(*a*). For other descriptions, refer to descriptions of corresponding content in FIG. 25(*a*) to FIG. 25(*e*). Details are not described herein again. The foregoing is described by using an example in which an application corresponding to the application window 2605 supports insertion. In some other embodiments, for an application that does not support insertion, when the user drags the shrunk live window to an icon of the application and hovers, the mobile phone may display prompt information that insertion is not supported. Then, if the user lifts the finger, the mobile phone may enlarge the shrunk live window and display the live window on the display screen again, as shown in FIG. 26(*a*).

In some other embodiments, when the mobile phone establishes a connection to another terminal (the another terminal may be a second terminal in embodiments of this application), the user may further drag the live window (for example, the live window in the small window form or the live window in a medium window form), to drag the live window across devices to the another terminal connected to the mobile phone. For example, after receiving an operation of pressing and moving the live window by the user, the mobile phone may perform drag listening to determine whether a cross-device drag is triggered. For example, after determining that the live window is dragged to a cross-device drag sensing area, the mobile phone may determine that a cross-device drag is triggered. After determining that a cross-device drag is triggered, the mobile phone may send data of the live window to a target device of the cross-device drag, so that the target device follows the drag. Then, after receiving an operation of releasing the drag by the user, the target device may display the live window (for example, the live window in the small window form or the live window in the medium window form) on a display screen of the target device. In this way, the live window is dragged across devices to the another device. Alternatively, after receiving the operation of releasing the drag by the user, the target device may display the live window in full screen on the display screen of the target device.

In addition, after the mobile phone displays the live window (for example, the live window in the small window form or the live window in the medium window form), if an operation that the user presses the live window and quickly slides toward the upper edge direction of the display screen of the mobile phone is received, the mobile phone may close the live window, and does not continue to display the live window on the display screen of the mobile phone. It may be understood that, in the solutions described in the foregoing embodiments, closing of the live window is triggered by the user. In some other embodiments, alternatively, the live window may be automatically closed, for example, when playing of the video in the live window ends, or navigation ends.

Figure 27A:
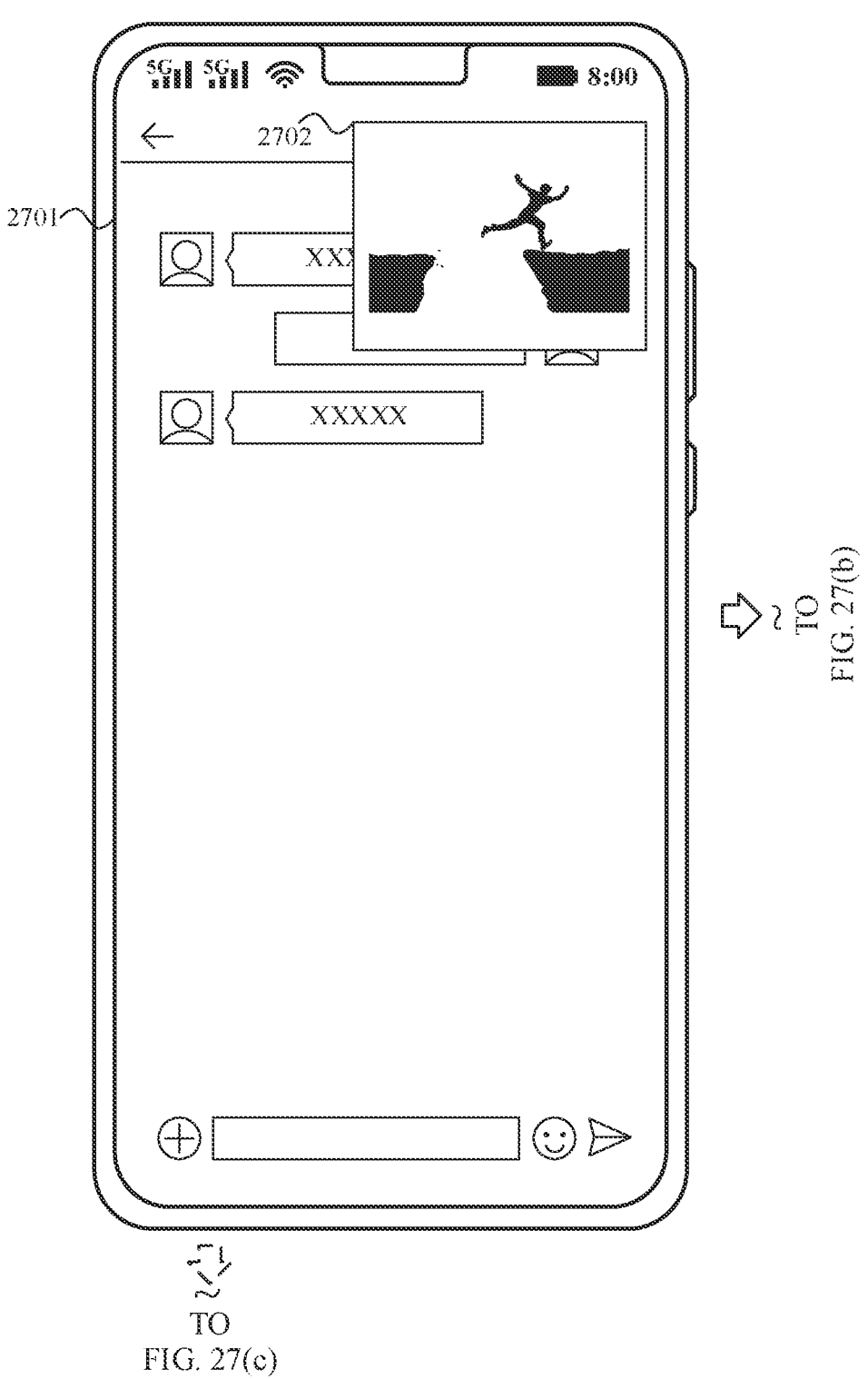
FIG. 27(a) to FIG. 27(c) are schematic diagrams of still another display interface according to an embodiment of this application.
Figure 27B:
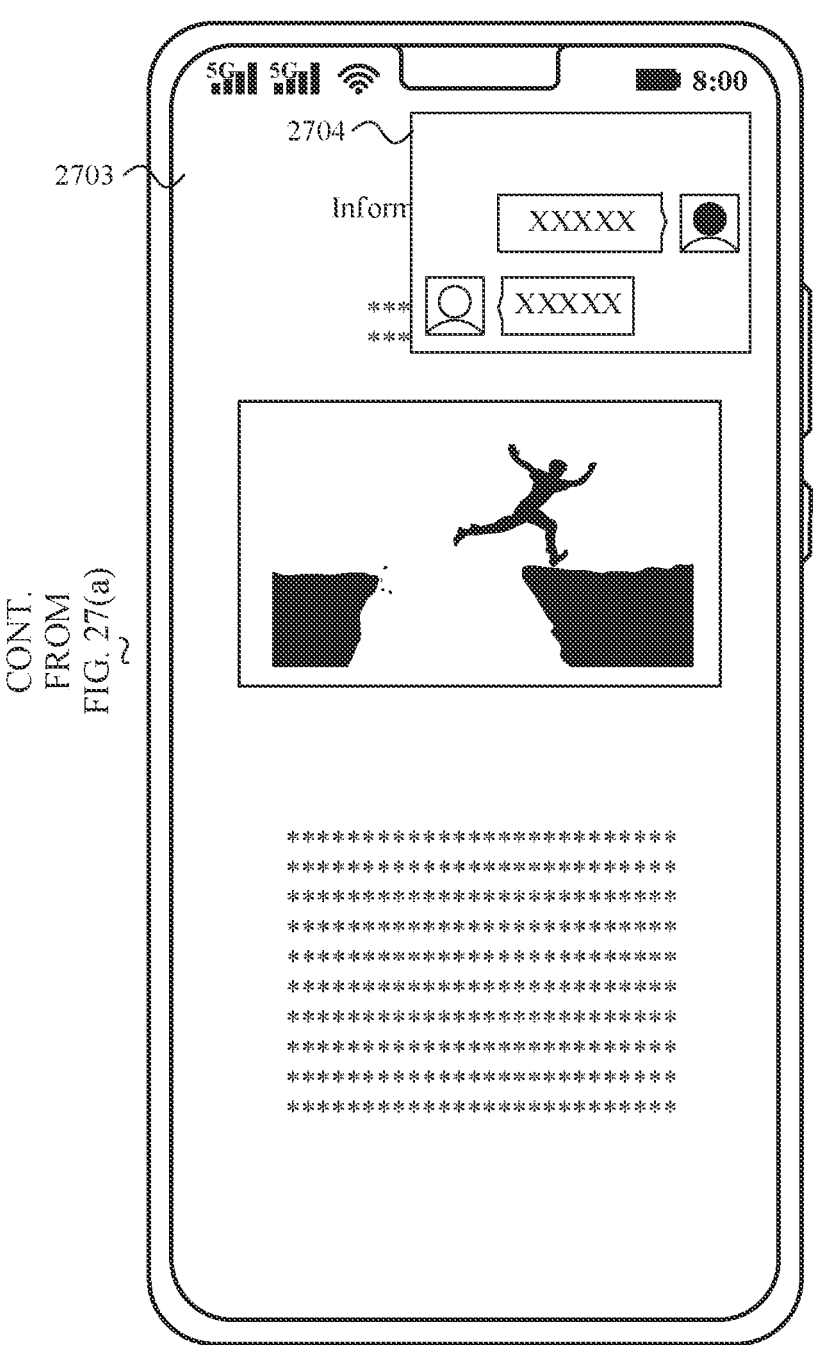
Figures 27A, 27C:
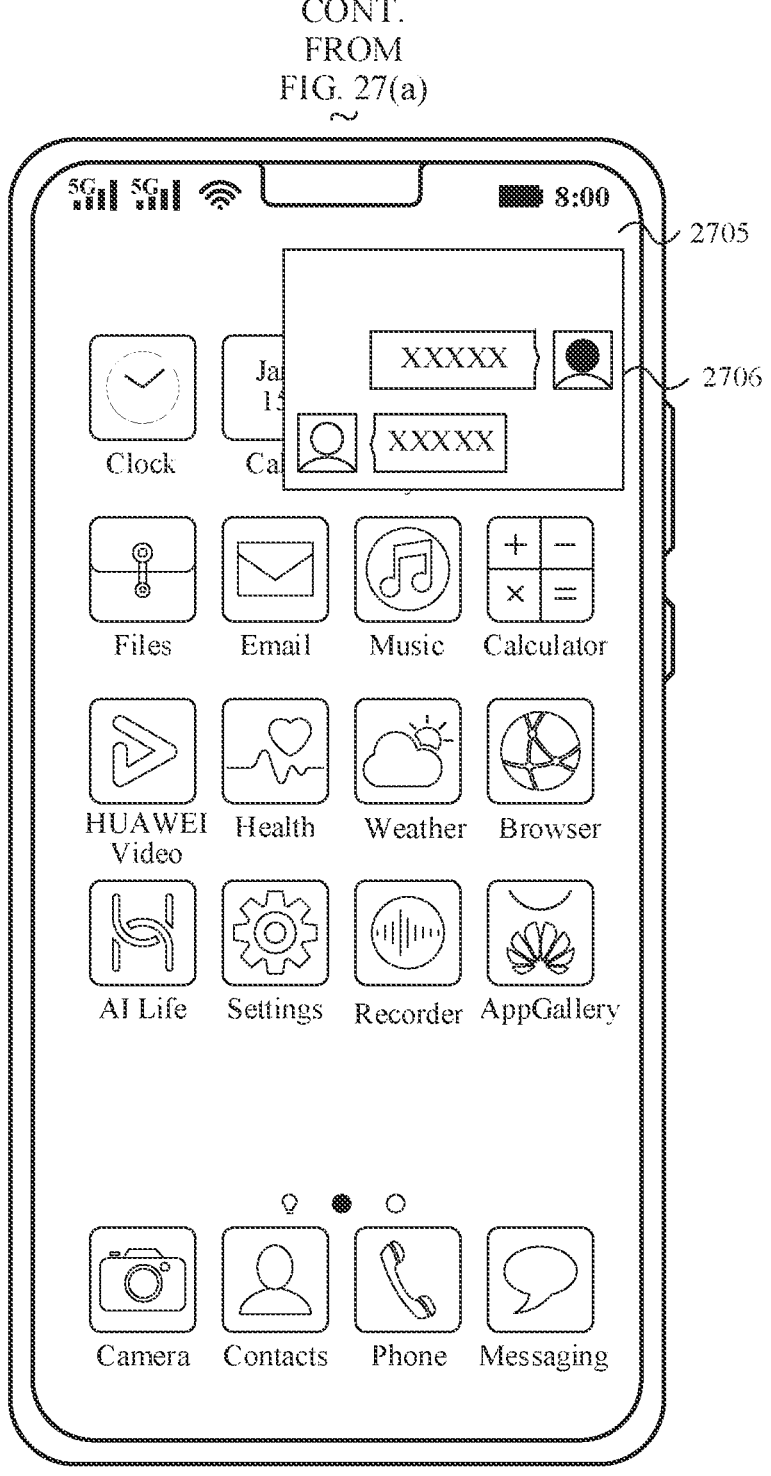

In some other embodiments, in a scenario in which the mobile phone displays the live window (for example, the live window in the small window form or the live window in the medium window form) on an application window of another application, the user may perform a corresponding operation, to trigger the mobile phone to replace the live window. For example, with reference to FIG. 27(*a*) to FIG. 27(*c*), as shown in FIG. 27(*a*), the mobile phone displays a chat details page 2701 of an instant messaging application, and a live window 2702 of an application 1 is displayed on the chat details page 2701. For example, the mobile phone receives a pinch operation performed by two fingers of the user with one finger on the chat details page 2701 and the other finger on the live window 2702. In response to the operation, as shown in FIG. 27(*b*), the mobile phone displays an application window 2703 of the application 1 (the application window 2703 includes information details), and displays a live window 2704 of the instant messaging application on the application window 2703. For another example, the mobile phone receives an operation of switching the instant messaging application to background by the user, for example, a sliding operation starting from the lower edge of the display screen of the mobile phone and pointing to the upper edge of the display screen of the mobile phone. In response to the operation, the mobile phone closes (or does not display) the live window 2702. In addition, as shown in FIG. 27(*c*), the mobile phone displays a desktop 2705, and displays a live window 2706 of the instant messaging application on the desktop 2705. For a specific implementation of displaying the live window 2704 of the instant messaging application by the mobile phone, refer to a specific description of corresponding content in the foregoing embodiment. Details are not described herein again.

Figure 28A:
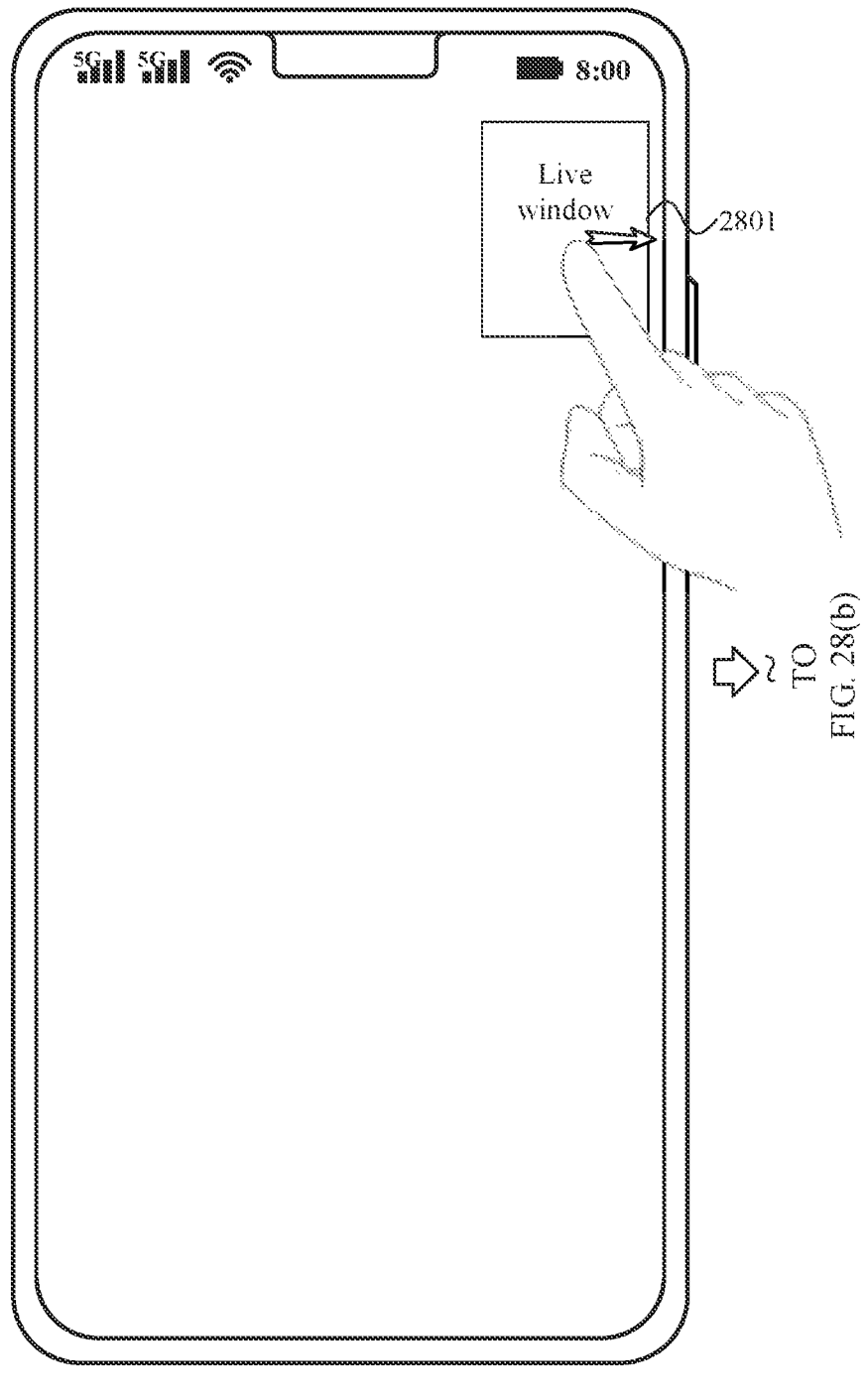
FIG. 28(a) and FIG. 28(b) are schematic diagrams of still another display interface according to an embodiment of this application.
Figures 28A, 28B:
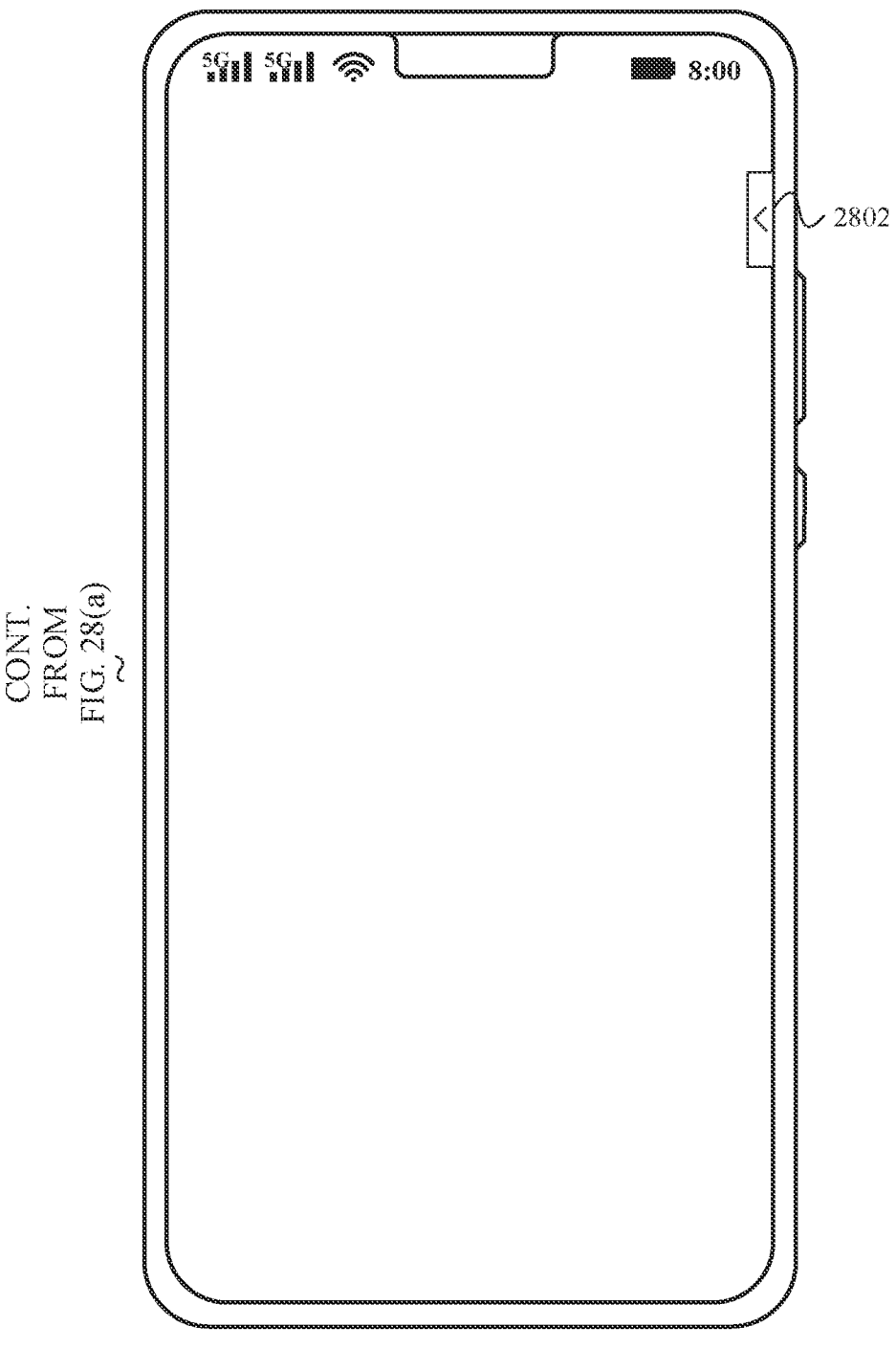

In the foregoing embodiments, for example, a background color of the live window is shown with a light color, for example, white. In some other embodiments, the background color of the live window may alternatively be a dark color (for example, black), or background may be transparent. This is not limited in embodiments. In addition, the live window in the small window form may alternatively be automatically collapsed and hidden on the mobile phone, and is displayed on the display screen of the mobile phone again after an operation of the user is received. In an example, after the live window in the small window form is displayed, if the mobile phone receives a drag operation of dragging the live window out of an edge of the display screen of the mobile phone by the user, the mobile phone hides the live window. For example, with reference to FIG. 28(*a*) and FIG. 28(*b*), the live window in the small window form is attached to the upper right corner of the display screen of the mobile phone. As shown in FIG. 28(*a*), the mobile phone displays a live window 2801 at the upper right corner of the display screen of the mobile phone. When the mobile phone receives an operation of dragging the live window 2801 (for example, pressing the live window 2801 and moving the finger) toward the right edge of the display screen of the mobile phone by the user, the mobile phone hides the live window 2801. As shown in FIG. 28(*b*), the mobile phone may further display a call-out button 2802 at a corresponding position (for example, a position at which the live window 2801 is dragged out of the display screen) on the display screen of the mobile phone. If the mobile phone receives an operation, for example, a tap operation, performed by the user on the button 2802, the mobile phone may display the live window 2801 on the display screen of the mobile phone again. Similarly, after the live window in the medium window form is displayed, if the mobile phone receives a drag operation of dragging the live window out of an edge of the display screen of the mobile phone by the user, the mobile phone hides the live window in the medium window form. The mobile phone may further display a call-out button. If an operation performed by the user on the call-out button is received, the live window is displayed again. It may be understood that, if the live window in the small window form is hidden, after the operation on the call-out button is received, the live window in the small window form is displayed again. If the live window in the medium window form is hidden, after the operation on the call-out button is received, the live window in the medium window form is displayed again.

According to the technical solution provided in this embodiment, the terminal may extract a key element in a display interface of the terminal, and display the key element in the live window form on the terminal screen. Key content in the application window is displayed by using a limited small-window display resource, which does not affect user experience due to display of excessive content, and can meet a processing requirement of a user. For example, the user can be helped to obtain and quickly process multi-task information by using the live window. In addition, after a live window trigger condition is met, for example, actively triggered by the user or automatically triggered by the system, the live window may be displayed, so that the user can wake up the live window in any interface, thereby meeting a processing requirement on a small window during multi-task processing. This achieves features of supporting triggering in an application or by the system, flexible display, and simple operations.

The live window supports page-level, application-level, and system-level presentation. In addition, content and a layout effect that are presented in the live window support automatic recommendation by the system based on different application types or customization by a third-party application developer, so that the user can more flexibly complete multi-task processing, and requirements for flexible display and layout of the live window can be met. This conforms to a system-level small window triggering gesture (for example, sliding the application window upward in the multi-task interface), and supports a dynamic effect of an upward sliding gesture in a natural process, for example, the application window rotates and changes to a live window (that is, a rotation mode), which may cooperate with a dynamic effect that the application window fades out and the live window fades in, thereby improving user experience.

Figure 29:
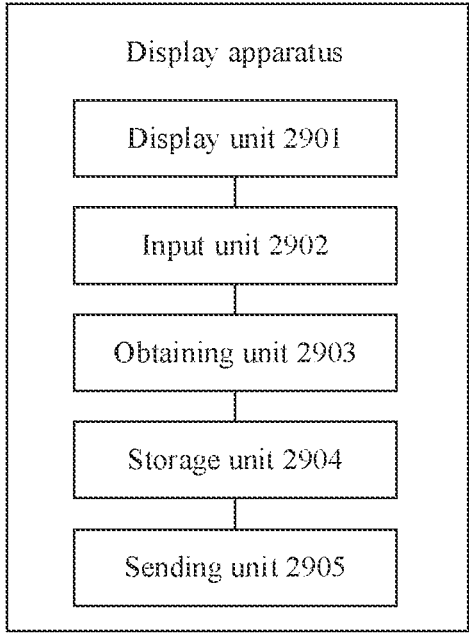
FIG. 29 is a schematic diagram of composition of a display apparatus according to an embodiment of this application.

FIG. 29 is a schematic diagram of composition of a display apparatus according to an embodiment of this application. As shown in FIG. 29, the apparatus may be applied to a terminal (for example, the foregoing mobile phone), and the apparatus may include a display unit 2901 and an input unit 2902.

The display unit 2901 is configured to display an application window of a first application on a display screen of the terminal. The application window of the first application includes a plurality of elements.

The input unit 2902 is configured to receive a first operation.

The display unit 2901 is further configured to: after the first operation is received, display a first window on the display screen of the terminal. The first window includes some elements in the application window of the first application.

Further, the first operation may include a drag operation on the application window of the first application in a multi-task interface.

The display unit 2901 is specifically configured to: after a second operation is received, display the multi-task interface. The multi-task interface includes the application window of the first application.

The display unit 2901 is specifically configured to: display an animation in which the application window of the first application moves; and when it is determined that the application window of the first application moves to a specified area of the display screen of the terminal, display the first window on the display screen of the terminal.

Further, the application window of the first application may be a freeform window. The first operation may include a drag operation on the application window of the first application, that is, the freeform window of the first application.

The display unit 2901 is specifically configured to: display an animation in which the application window of the first application moves; and when it is determined that the application window of the first application moves to a specified area of the display screen of the terminal, display the first window on the display screen of the terminal.

Further, the first operation may be an operation that triggers the first application to switch to background.

Further, the display unit 2901 is further configured to display a notification message on the display screen of the terminal. The first operation is a selection operation on the notification message.

Further, the apparatus may further include: an obtaining unit 2903, configured to extract the some elements from the plurality of elements of the application window of the first application.

Further, the some elements may be predetermined. For example, the some elements may be a video element.

Further, the obtaining unit 2903 is specifically configured to: obtain a first identifier, and obtain, from stored configuration files corresponding to different identifiers, a configuration file corresponding to the first identifier, where the configuration file corresponding to the first identifier includes identifiers of the some elements; and extract the some elements from the plurality of elements of the application window of the first application based on the configuration file corresponding to the first identifier. The first identifier may include an identifier of the first application, or the first identifier may include an identifier of the first application and an identifier of an interface in the application window.

Further, the obtaining unit 2903 is specifically configured to: obtain a type of the first application, and obtain, from stored recommendation models corresponding to different types of applications, a recommendation model corresponding to the type of the first application, where the recommendation model has a function of extracting, based on a type corresponding to an application, an element that needs to be displayed in the first window; and extract the some elements from the plurality of elements in the application window of the first application based on the recommendation model corresponding to the type of the first application.

Further, a layout of the some elements in the first window is different from a layout, in the application window, of elements corresponding to the some elements.

Further, the layout of the some elements in the first window is predetermined.

Further, the obtaining unit 2903 is further configured to obtain, from a stored layout file based on the first identifier, a layout file corresponding to the first identifier, and lay the some extracted elements based on the obtained layout file.

Further, the obtaining unit 2903 is further configured to obtain, from a stored layout file based on the type of the first application, a layout file corresponding to the type of the first application, and lay the some extracted elements based on the obtained layout file.

Further, the input unit 2902 is further configured to receive a third operation on the first window.

The display unit 2901 is further configured to: after the third operation on the first window is received, change the first window to a second window and display the second window on the display screen of the terminal. The second window includes some elements in the application window of the first application, and the second window includes more elements than the first window.

Further, the obtaining unit 2903 is further configured to extract, from the plurality of elements in the application window of the first application, an element that needs to be presented in the second window.

For example, the element that needs to be presented in the second window may be predetermined.

For another example, the obtaining unit 2903 is specifically configured to obtain, based on the first identifier and from stored configuration files corresponding to different identifiers (the configuration files are configuration files for the second window), a configuration file corresponding to the first identifier, and then extract, based on the obtained configuration file and from the plurality of elements in the application window of the first application, the element that needs to be presented in the second window.

For another example, the obtaining unit 2903 is specifically configured to obtain, based on the type of the first application and from stored recommendation models corresponding to different types of applications (the recommendation models are recommendation models for the second window), a recommendation model corresponding to the type of the first application, and then extract, based on the obtained recommendation model and from the plurality of elements in the application window of the first application, the element that needs to be presented in the second window.

A layout, in the window in the medium window form, of the extracted element that needs to be presented in the window in the medium window form may be different from a layout of a corresponding element in the application window of the first application.

Further, the second window further includes a close button and an enlarge button.

The input unit 2902 is further configured to receive an operation on the close button. The display unit 2901 is further configured to: after the operation on the close button is received, skip displaying the second window.

The input unit 2902 is further configured to receive an operation on the enlarge button. The display unit 2901 is further configured to: after the operation on the enlarge button is received, display the application window of the first application, and skip displaying the second window.

Further, the display unit 2901 is further configured to; after it is determined that no user operation is received within a preset time period or a fourth operation on the second window is received, change the second window to the first window and display the first window on the display screen of the terminal.

Further, that the display unit 2901 displays a first window may include: displaying a desktop on the display screen of the terminal, and displaying the first window on the desktop. The desktop may include an icon of a second application.

The input unit 2902 is further configured to receive an operation of dragging the first window.

The display unit 2901 is further configured to: after the operation of dragging the first window is received, display an animation in which the first window moves; and when the first window is dragged to a position of the icon of the second application, display an application window of the second application on the display screen of the terminal.

Further, the display unit 2901 is further configured to: after the second operation is received, display the multi-task interface, where the multi-task interface includes the application window of the second application; after an operation of dragging the first window is received, display an animation in which the first window moves; and when the first window is dragged to a position of the application window of the second application, display the application window of the second application on the display screen of the terminal.

Further, the input unit 2902 is further configured to receive a drag release operation.

The apparatus may further include: a storage unit 2904, configured to: after the drag release operation is received, convert the first window into a resource file and store the resource file. Alternatively, the apparatus may further include: a sending unit 2905, configured to: after the drag release operation is received, convert the first window into a resource file, and send the resource file to a second terminal by using the second application.

Further, the terminal is connected to the second terminal. The input unit 2902 is further configured to receive an operation of dragging the first window.

The display unit 2901 is further configured to: after the operation of dragging the first window is received, display an animation in which the first window moves.

The sending unit 2905 is further configured to: after it is determined that a drag intent of a user is to perform a cross-device drag, send data of the first window to the second terminal. The data of the first window is used by the second terminal to display the first window on a display screen of the second terminal.

An embodiment of this application further provides a display apparatus. The apparatus may be applied to an electronic device, for example, the terminal (for example, the mobile phone) in the foregoing embodiment. The apparatus may include a processor and a memory configured to store instructions executable by the processor. When the processor is configured to execute the instructions, the display apparatus is enabled to implement functions or steps performed by the terminal (for example, the mobile phone) in the foregoing method embodiment.

An embodiment of this application further provides an electronic device (the electronic device may be a terminal, for example, may be the mobile phone in the foregoing embodiment). The electronic device may include a display screen, a memory, and one or more processors. The display screen, the memory, and the processor are coupled. The memory is configured to store computer program code, and the computer program code includes computer instructions. When the processor executes the computer instructions, the electronic device may perform functions or steps performed by the terminal (for example, the mobile phone) in the foregoing method embodiment. Certainly, the electronic device includes but is not limited to the display screen, the memory, and the one or more processors. For example, for a structure of the electronic device, refer to the structure of the mobile phone shown in FIG. 5.

Figure 30:
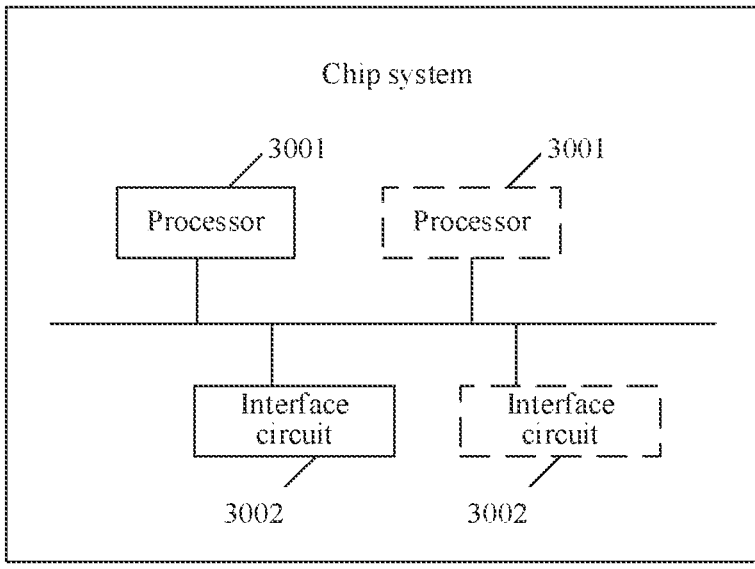
FIG. 30 is a schematic diagram of composition of a chip system according to an embodiment of this application.

An embodiment of this application further provides a chip system. The chip system may be applied to an electronic device, for example, the terminal (for example, the mobile phone) in the foregoing embodiment. As shown in FIG. 30, the chip system includes at least one processor 3001 and at least one interface circuit 3002. The processor 3001 may be a processor in the foregoing electronic device. The processor 3001 and the interface circuit 3002 may be interconnected by using a line. The processor 3001 may receive computer instructions from a memory of the electronic device by using the interface circuit 3002, and execute the computer instructions. When the computer instructions are executed by the processor 3001, the electronic device may be enabled to perform steps performed by the mobile phone in the foregoing embodiment. Certainly, the chip system may further include another discrete component. This is not specifically limited in this embodiment of this application.

An embodiment of this application further provides a computer-readable storage medium, configured to store computer instructions run by an electronic device, such as the foregoing terminal (for example, the mobile phone).

An embodiment of this application further provides a computer program product, including computer instructions run by an electronic device, such as the foregoing terminal (for example, the mobile phone).

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve objectives of solutions in embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented by a software function unit and sold or used as an independent product, the integrated unit may be stored in a readable storage medium. Based on such an understanding, the technical solutions in embodiments of this application essentially, or the part contributing to existing technologies, or all or some of the technical solutions may be implemented in a form of a software product. The software product is stored in a storage medium and includes several instructions for instructing a device (which may be a single-chip microcomputer, a chip, or the like) or a processor (processor) to perform all or some steps of methods in embodiments of this application. The storage medium includes various media that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first terminal and comprising:

displaying, on a display screen of the first terminal in response to receiving a second operation, a multi-task interface comprising a first application window of a first application, wherein the first application window comprises a plurality of elements, and wherein the first application window is in a full-screen freeform window form;

displaying, in response to a first operation, an animation in which the first application window moves, wherein the first operation is a drag operation on the first application window in the multi-task interface;

extracting, in response to the first operation, a first subset of elements from the plurality of elements;

determining that the first application window moves to a specified area of the display screen;

displaying, on the display screen when determining that the first application window moves to the specified area of the display screen, a first window as a small window floating on the first application window, wherein the first window comprises the first subset of elements;

displaying, in response to receiving the second operation, the multi-task interface, wherein the multi-task interface comprises a second application window of a second application;

displaying, in response to receiving an operation of dragging the first window, the animation in which the first window moves; and displaying, when the first window is dragged to a position of the second application window, the second application window on the display screen of the first terminal.

2. The method of claim 1, wherein a layout of the first subset of elements in the first window is different from a layout, in the first application window, of elements corresponding to the first subset of elements.

3. The method of claim 2, wherein before displaying the first window on the display screen, the method further comprises:

obtaining, by the first terminal from a stored layout file based on a first identifier or a type of the first application, a layout file corresponding to the first identifier or the type of the first application; and laying, by the first terminal, the first subset of elements based on the layout file, wherein the first identifier comprises an identifier of the first application, or wherein the first identifier comprises the identifier of the first application and an interface identifier of an interface in the first application window.

4. The method of claim 2, wherein the layout of the first subset of elements in the first window is predetermined.

5. The method of claim 1, wherein after displaying the first window on the display screen, the method further comprises:

changing, by the first terminal in response to receiving a third operation on the first window, the first window to a second window; and displaying the second window on the display screen, wherein the second window comprises a second subset of elements in the first application window, and wherein the second window comprises more elements than the first window.

6. The method of claim 5, wherein the second window further comprises a close button and an enlarge button, and wherein the method further comprises:

skipping, by the first terminal after the first terminal receives an operation on the close button, displaying the second window;

displaying, by the first terminal after the first terminal receives an operation on the enlarge button, the first application window; and skipping, by the first terminal after the first terminal receives an operation on the enlarge button, displaying the second window.

7. The method of claim 5, wherein after changing the first window to the second window and displaying the second window on the display screen of the first terminal, the method further comprises:

changing, by the first terminal after determining that no user operation is received within a preset time period or after receiving a fourth operation on the second window, the second window to the first window; and displaying the first window on the display screen of the first terminal.

8. The method of claim 1, further comprising:

converting, by the first terminal in response to receiving a drag release operation, the first window into a resource file; and sending, by the first terminal, the resource file to a second terminal using the second application.

9. The method of claim 8, further comprising connecting the first terminal to the second terminal, wherein after displaying the first window on the display screen of the first terminal, the method further comprises:

sending, after determining that a drag intent of a user is to perform a cross-device drag, data of the first window to the second terminal for displaying the first window on a second display screen of the second terminal.

10. The method of claim 1, wherein extracting the first subset of elements comprises:

obtaining, by the first terminal, a first identifier;

obtaining, by the first terminal and from stored configuration files corresponding to different identifiers, a configuration file corresponding to the first identifier, wherein the configuration file corresponding to the first identifier comprises identifiers of the first subset of elements; and extracting, by the first terminal, the first subset of elements based on the configuration file corresponding to the first identifier, wherein the first identifier comprises an identifier of the first application, or wherein the first identifier comprises the identifier of the first application and an interface identifier of an interface in the first application window.

11. The method of claim 1, wherein extracting the first subset of elements comprises:

obtaining, by the first terminal, a type of the first application;

obtaining, by the first terminal and from stored recommendation models corresponding to different types of applications, a recommendation model corresponding to the type of the first application, wherein the recommendation model comprises a function of extracting, based on a type corresponding to an application, an element that needs to be displayed in the first window; and extracting, by the first terminal, the first subset of elements based on the recommendation model corresponding to the type of the first application.

12. The method of claim 1, wherein the first subset of elements is predetermined.

13. The method of claim 1, further comprising:

receiving a third operation on the first window;

changing, by the first terminal after receiving the third operation, the first window to a second window; and displaying the second window in a medium window form on the display screen of the first terminal, wherein the second window comprises some elements of the first application window, and wherein the second window comprises more elements than the first subset of elements.

14. A first terminal, comprising:

a display screen;

a memory that is configured to store executable instructions; and a processor coupled to the memory and the display screen, wherein the processor is configured to execute the instructions and cause the first terminal to:

display, in response to receiving a second operation, a multi-task interface comprising a first application window of a first application on the display screen, wherein the first application window comprises a plurality of elements, and wherein the first application window is in a full-screen freeform window form;

display, in response to receiving a first operation, an animation in which the first application window moves, wherein the first operation is a drag operation on the first application window in the multi-task interface;

extract a first subset of elements from the plurality of elements;

determine that the first application window moves to a specified area of the display screen;

display, on the display screen when determining that the first application window moves to the specified area of the display screen, a first window as a small window floating on the first application window, wherein the first window comprises the first subset of elements;

display, in response to receiving the second operation, multi-task interface, wherein the multi-task interface comprises a second application window of a second application;

display, in response to receiving an operation of dragging the first window, the animation in which the first window moves; and display, when the first window is dragged to a position of the second application window, the second application window on the display screen of the first terminal.

15. The first terminal of claim 14, wherein the first subset of elements is predetermined.

16. The first terminal of claim 14, wherein a layout of the first subset of elements in the first window is different from a layout, in the first application window, of elements corresponding to the first subset of elements.

17. The first terminal of claim 16, wherein the layout of the first subset of elements in the first window is predetermined.

18. The first terminal of claim 14, wherein the processor is further configured to execute the instructions and cause the first terminal to:

change, in response to receiving a third operation on the first window, the first window to a second window; and display the second window on the display screen, wherein the second window comprises a second subset elements in the first application window, and wherein the second window comprises more elements than the first window.

19. The first terminal of claim 14, wherein extracting the first subset of elements comprises:

obtaining a first identifier;

obtaining a configuration file corresponding to the first identifier from stored configuration files corresponding to different identifiers, wherein the configuration file corresponding to the first identifier comprises identifiers of the first subset of elements; and extracting the first subset of elements based on the configuration file corresponding to the first identifier, wherein the first identifier comprises an identifier of the first application, or wherein the first identifier comprises the identifier of the first application and an interface identifier of an interface in the first application window.

20. The first terminal of claim 14, wherein extracting the first subset of elements comprises:

obtaining a type of the first application;

obtaining a recommendation model corresponding to the type of the first application from stored recommendation models corresponding to different types of applications, wherein the recommendation model comprises a function of extracting, based on a type corresponding to an application, an element that needs to be displayed in the first window; and extracting the first subset of elements based on the recommendation model corresponding to the type of the first application.

21. The first terminal of claim 16, wherein the processor is further configured to execute the instructions to cause the first terminal to:

obtain, before displaying the first window on the display screen, from a stored layout file based on a first identifier or a type of the first application, a layout file corresponding to the first identifier or the type of the first application; and lay the first subset of elements based on the layout file, wherein the first identifier comprises an identifier of the first application, or wherein the first identifier comprises the identifier of the first application and an interface identifier of an interface in the first application window.

22. A non-transitory computer-readable medium comprising instructions, which when executed by one or more processors of a first terminal, cause the first terminal to:

display, on a display screen of the first terminal in response to receiving a second operation, a multi-task interface comprising a first application window of a first application, wherein the first application window comprises a plurality of elements, and wherein the first application window is in a full-screen freeform window form;

display, in response to a first operation, an animation in which the first application window moves, wherein the first operation is a drag operation on the first application window in the multi-task interface;

extract, in response to the first operation, a first subset of elements from the plurality of elements;

determine, by the first terminal, that the first application window moves to a specified area of the display screen;

display, on the display screen when determining that the first application window moves to the specified area of the display screen, a first window as a small window floating on the first application window, wherein the first window comprises the first subset of elements;

display, in response to receiving the second operation, the multi-task interface, wherein the multi-task interface comprises a second application window of a second application;

display, in response to receiving an operation of dragging the first window, the animation in which the first window moves; and display, when the first window is dragged to a position of the second application window, the second application window on the display screen of the first terminal.

* * * * *